United States Patent
Sonoda

(10) Patent No.: US 8,238,357 B2
(45) Date of Patent: Aug. 7, 2012

(54) VLAN COMMUNICATION INSPECTION SYSTEM, METHOD AND PROGRAM

(75) Inventor: Kentaro Sonoda, Tokyo (JP)

(73) Assignee: NEC Corporation, Tokyo (JP)

( * ) Notice: Subject to any disclaimer, the term of this patent is extended or adjusted under 35 U.S.C. 154(b) by 474 days.

(21) Appl. No.: 12/596,212

(22) PCT Filed: Apr. 21, 2008

(86) PCT No.: PCT/JP2008/057683
§ 371 (c)(1),
(2), (4) Date: Oct. 16, 2009

(87) PCT Pub. No.: WO2008/133231
PCT Pub. Date: Nov. 6, 2008

(65) Prior Publication Data
US 2010/0091681 A1    Apr. 15, 2010

(30) Foreign Application Priority Data
Apr. 23, 2007    (JP) .................................. 2007-113311

(51) Int. Cl.
H04L 12/28    (2006.01)
H04L 12/26    (2006.01)

(52) U.S. Cl. ........................................ 370/401; 370/252

(58) Field of Classification Search .......... 370/229–231, 370/235–236, 248, 252, 328, 338, 389, 359.3, 370/400, 401; 709/220–242
See application file for complete search history.

(56) References Cited

U.S. PATENT DOCUMENTS
7,774,461 B2 * 8/2010 Tanaka et al. ................. 709/224

FOREIGN PATENT DOCUMENTS
| JP | 2002185512 A | 6/2002 |
|---|---|---|
| JP | 3676713 B | 5/2005 |
| JP | 2005218038 A | 8/2005 |
| JP | 2005328318 A | 11/2005 |
| JP | 2005348051 A | 12/2005 |
| JP | 2008060958 A | 3/2008 |

OTHER PUBLICATIONS

International Search Report for PCT/JP2008/057683 mailed Jul. 29, 2008.

E. M. Clarke, Jr., et al., "Model Checking", The MIT Press, U.S.A., 1999, 35-49 pages. 109-120 pages.

* cited by examiner

Primary Examiner — Chi Pham
Assistant Examiner — Feben M Haile

(57) ABSTRACT

It is possible to identify a communication range even for a communication across a plurality of VLAN in a network having a plurality of communication paths because of a redundant switch configuration when managing switch VLAN setting information. A device having a predetermined VLAN-ID is made to be a KEY and a device having a predetermined VLAN-ID which can perform communication from the device is made to be a VALUE. A VLAN communication enabled/disabled hash table is created for expressing each of KEYs and VALUEs as a set of a device name and a VLAN-ID. By referencing a redundant configuration table indicating a redundant configuration and a routing table indicating whether routing is enabled, form a KEY specified as a start point for a network administrator, a VALUE which can be communicated from the KEY is identified and the VALUE is used as a KEY to follow a path.

13 Claims, 32 Drawing Sheets

F I G. 1
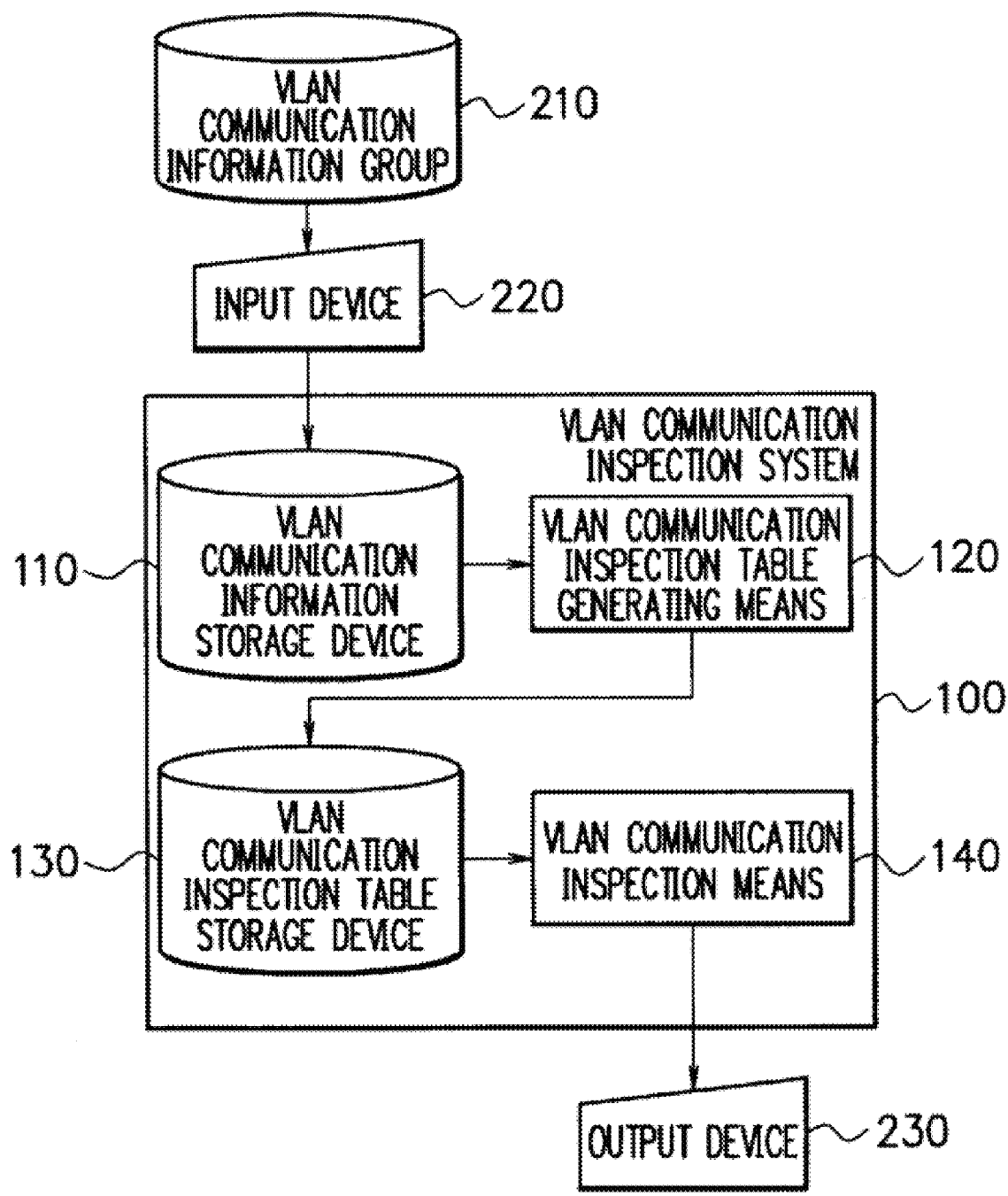

FIG. 2

AN EXAMPLE OF THE CONFIG FILE OF THE L2 SWITCH

```
set system name "AAAA"

set VLAN name 10 vid 10
set VLAN name 20 vid 20
set VLAN portbase 1/1 10
set VLAN portbase 1/2 vid20
set VLAN tagbase 1/8 10.20
set VLAN tagbase 2/8 10.20
set VLAN portbase 4/1 10
set VLAN portbase 5/1 20 set filter profile 1 block src-ip 10.10.10.1 255.255.255.0
set filter profile 2 permit dest-mac 00:11:22:33:44:55:66 set filter in-port fe 4/1 10 1
set filter out-port fe 5/1 20 2 set port admin fe 3/1 disable
```

FIG. 3

AN EXAMPLE OF THE CONFIG FILE OF THE L3 SWITCH

```
snmp-server name "BBBB"

access-list 1 permit 10.10.10.1/24
access-list 2 deny 20.20.20.1/24 bridge-group 1 VLAN-type port
bridge 1 acquire
bridge-group 10 VLAN-type port
bridge 10 acquire
bridge-group 20 VLAN-type port
bridge 20 acquire gsrp 100
  gsrp-vlan 100
  vlan-group 1 vlan 10
  vlan-group 1 priority 120
  vlan-group 2 vlan 20
  vlan-group 2 priority 80 interface VLAN 1
  description "Default VLAN"

interface VLAN 10
  ip address 192.168.10.1/24 interface VLAN 20
  ip address 192.168.20.1/24 interface ethernet 1/1
  bridge-group 10 port interface ethernet 1/2
  bridge-group 10 tag
  bridge-group 20 tag interface ethernet 1/3
  bridge-group 10 port
  access-group 1 in router rip
```

FIG. 4

SWITCH CONNECTION CONSTITUTION INFORMATION

| CONSTITUTION NUMBER | TRANSMISSION SOURCE APPARATUS NAME | TRANSMISSION SOURCE CONNECTION PORT | DESTINATION APPARATUS NAME | DESTINATION CONNECTION PORT |
|---|---|---|---|---|
| 1 | A | 1/1 | B | 1/1 |
| 2 | A | 1/2 | C | 1/2 |

F I G. 5

ROUTING TABLE (310)

| APPARATUS | ROUTING |
|---|---|
| A | IMPOSSIBLE |
| B | POSSIBLE |
| C | POSSIBLE |
| D | IMPOSSIBLE |

SUBNET ADDRESS TABLE (320)

| VLAN-ID | SUBNET ADDRESS |
|---|---|
| 10 | 10.10.10.0/24 |
| 20 | 20.20.20.0/24 |

VLAN-ID TABLE (330)

| APPARATUS | VLAN-ID |
|---|---|
| A | 10,20 |
| B | 10,20 |
| C | 10,20 |
| D | 10,20 |

CONNECTION PORT TABLE (340)

| CONNECTION PORT | VLAN10 | VLAN20 |
|---|---|---|
| A:1/1−B:1/1 | ○ | ○ |
| A:1/2−C:1/2 | × | ○ |
| B:1/8−C:1/8 | ○ | ○ |
| B:1/2−D:1/2 | ○ | ○ |
| C:1/1−D:1/1 | × | ○ |

REDUNDANT APPARATUS TABLE (350)

| REDUNDANT APPARATUS | MASTER OF VLAN 10 | MASTER OF VLAN 20 |
|---|---|---|
| B,C | B | C |

VLAN COMMUNICATION ENABLED / DISABLED HASH TABLE (360)

| KEY | VALUE |
|---|---|
| A:10 | B:10 |
| A:20 | B:20, C:20 |
| B:10 | A:10, C:10, D:10, B:20 |
| B:20 | A:20, C:20, D:20, B:10 |
| C:10 | B:10, C:20 |
| C:20 | A:20, B:20, D:20, C:10 |
| D:10 | B:10 |
| D:20 | B:20, C:20 |

FIG. 12

| KEY | VALUE |
|---|---|
| A:10 | B:10 |
| A:20 | B:20,C:20 |
| B:10 | A:10,C:10,D:10,B:20 |
| B:20 | A:20,C:20,D:20,B:10 |
| C:10 | B:10,C:20 |
| C:20 | A:20,B:20,D:20,C:10 |
| D:10 | B:10 |
| D:20 | B:20,C:20 |

(a)

| KEY | VALUE |
|---|---|
| A:10 | B:10 |
| A:20 | B:20,C:20 |
| B:10 | A:10,C:10,C:20 |
| B:20 | A:20,C:20,D:20,B:10 |
| C:10 | B:10,C:20 |
| C:20 | A:20,B:20,D:20,C:10 |
| D:10 | B:10 |
| D:20 | B:20,C:20 |

(b)

| KEY | VALUE |
|---|---|
| A:10 | B:10 |
| A:20 | B:20,C:20 |
| B:10 | A:10,C:10,C:20,B:20 |
| B:20 | A:20,C:20,D:20,B:10 |
| C:10 | B:10,C:20 |
| C:20 | A:20,B:20,D:20,C:10 |
| D:10 | B:10 |
| D:20 | B:20,C:20 |

(c)

| KEY | VALUE |
|---|---|
| A:10 | B:10 |
| A:20 | B:20,C:20 |
| B:10 | A:10,C:10,D:10,B:20 |
| B:20 | A:20,D:20,B:10 |
| C:10 | B:10,C:20 |
| C:20 | A:20,B:20,D:20,C:10 |
| D:10 | B:10 |
| D:20 | B:20,C:20 |

| KEY | VALUE |
|---|---|
| A:10 | B:10 |
| A:20 | A:20,C:20 |
| B:10 | A:10,C:10,D:10,B:20 |
| B:20 | A:20,C:20,D:20,B:10 |
| C:10 | B:10,C:20 |
| C:20 | A:20,B:20,D:20,C:10 |
| D:10 | B:10 |
| D:20 | B:20,C:20 |

FROM FIG. 12(d)

(f)

| KEY | VALUE |
|---|---|
| A:10 | B:10 |
| A:20 | A:20,C:20 |
| B:10 | A:10,C:10,D:10,B:20 |
| B:20 | A:20,C:20,D:20,B:10 |
| C:10 | B:10,C:20 |
| C:20 | A:20,B:20,D:20,C:10 |
| D:10 | B:10 |
| D:20 | B:20,C:20 |

(g)

| KEY | VALUE |
|---|---|
| A:10 | B:10 |
| A:20 | A:20,C:20 |
| B:10 | A:10,C:10,D:10,B:20 |
| B:20 | A:20,C:20,D:20,B:10 |
| C:10 | B:10,C:20 |
| C:20 | A:20,B:20,D:20,C:10 |
| D:10 | B:10 |
| D:20 | B:20,C:20 |

FIG. 14

[RESULT] COMMUNICATABLE VLAN AND COMMUNICATION PATH OF A:10
A:10→B:10→D:10
A:10→B:10→B:20→C:20→A:20
A:10→B:10→B:20→C:20→D:20

FIG. 18

[RESULT] COMMUNICATABLE VLAN AND COMMUNICATION PATH OF A : 20 WHEN FAILURE OCCURS ON APPARATUS B
A: 20→C: 20→D: 20
A: 20→C: 20→C: 10

CONNECTION PORT LIST TABLE

| CONNECTION PORT OF APPARATUS | VLAN-ID |
|---|---|
| A : 1/1 | 10, 20 |
| A : 1/2 | 10 |
| A : 1/3 | 20 |
| B : 1/1 | 10, 20, 30 |
| B : 2/1 | 30 |
| ... | ... |

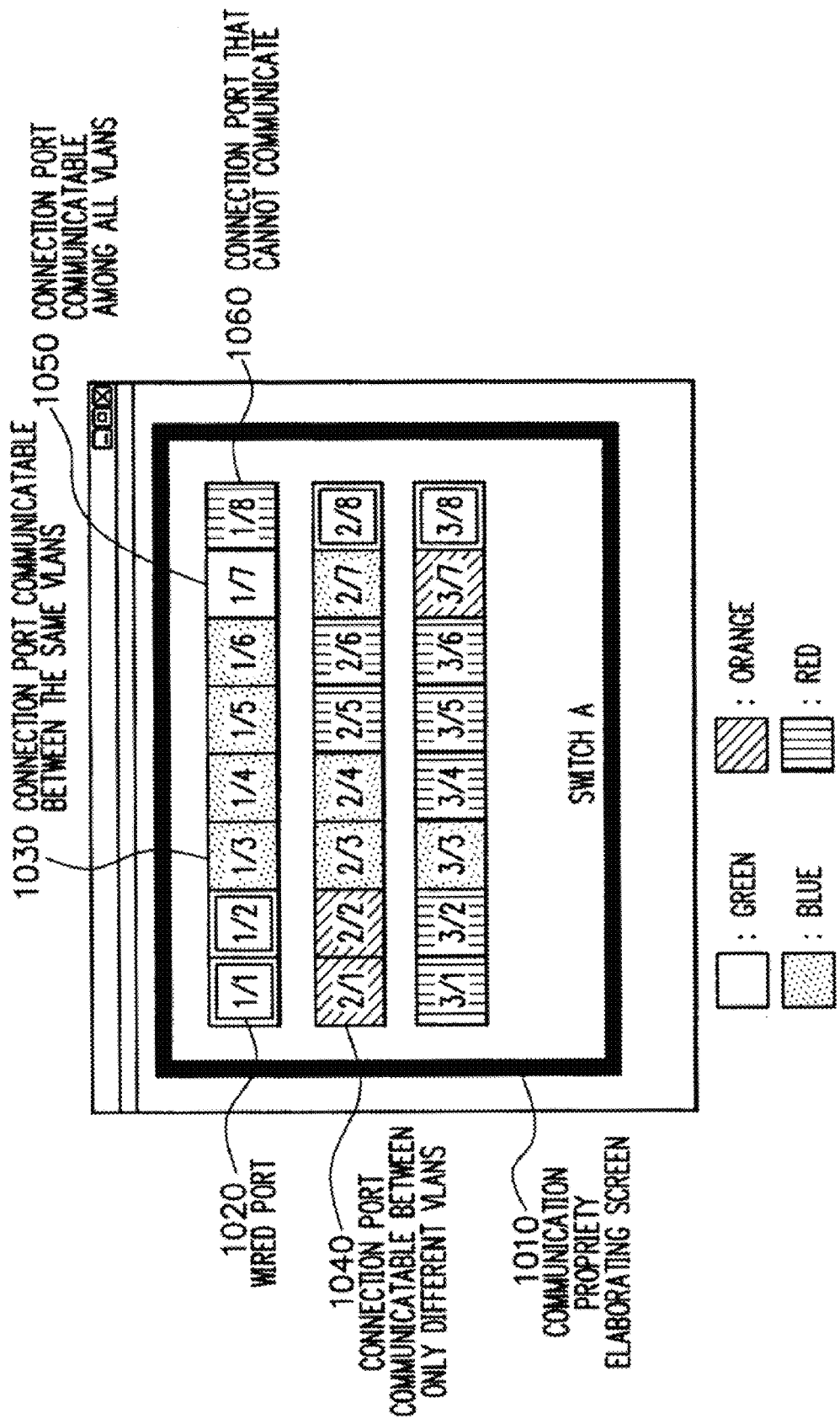

FIG. 24

1090 COMMUNICATION PROPRIETY ELABORATING TABLE

| CONNECTION PORT OF APPARATUS | COMMUNICATABLE BETWEEN THE SAME VLANS | COMMUNICATABLE BETWEEN DIFFERENT VLANS |
|---|---|---|
| A:1/1 | O | X |
| A:1/2 | O | X |
| B:1/1 | O | O |
| B:1/2 | O | O |
| C:1/1 | X | O |
| C:1/2 | X | X |
| D:1/1 | O | X |
| D:1/2 | X | X |

FIG. 25

COMMUNICATION PORT LIST TABLE (a)

| CONNECTION PORT OF APPARATUS | VLAN-ID |
|---|---|
| A:1/1 | 10, 20 |
| A:1/2 | 10 |
| B:1/1 | 10, 20 |
| B:1/2 | 10, 20 |
| C:1/1 | 20 |
| C:1/2 | 30 |
| D:1/1 | 10 |
| D:1/2 | 20 |

COMMUNICATION RANGE RESULT (b)
```
APPARATUS A: COMMUNICATION RANGE RESULT OF VLAN 10
  A:10→B:10→D:10
  A:10→B:10→B:20→C:20
```

F I G. 28
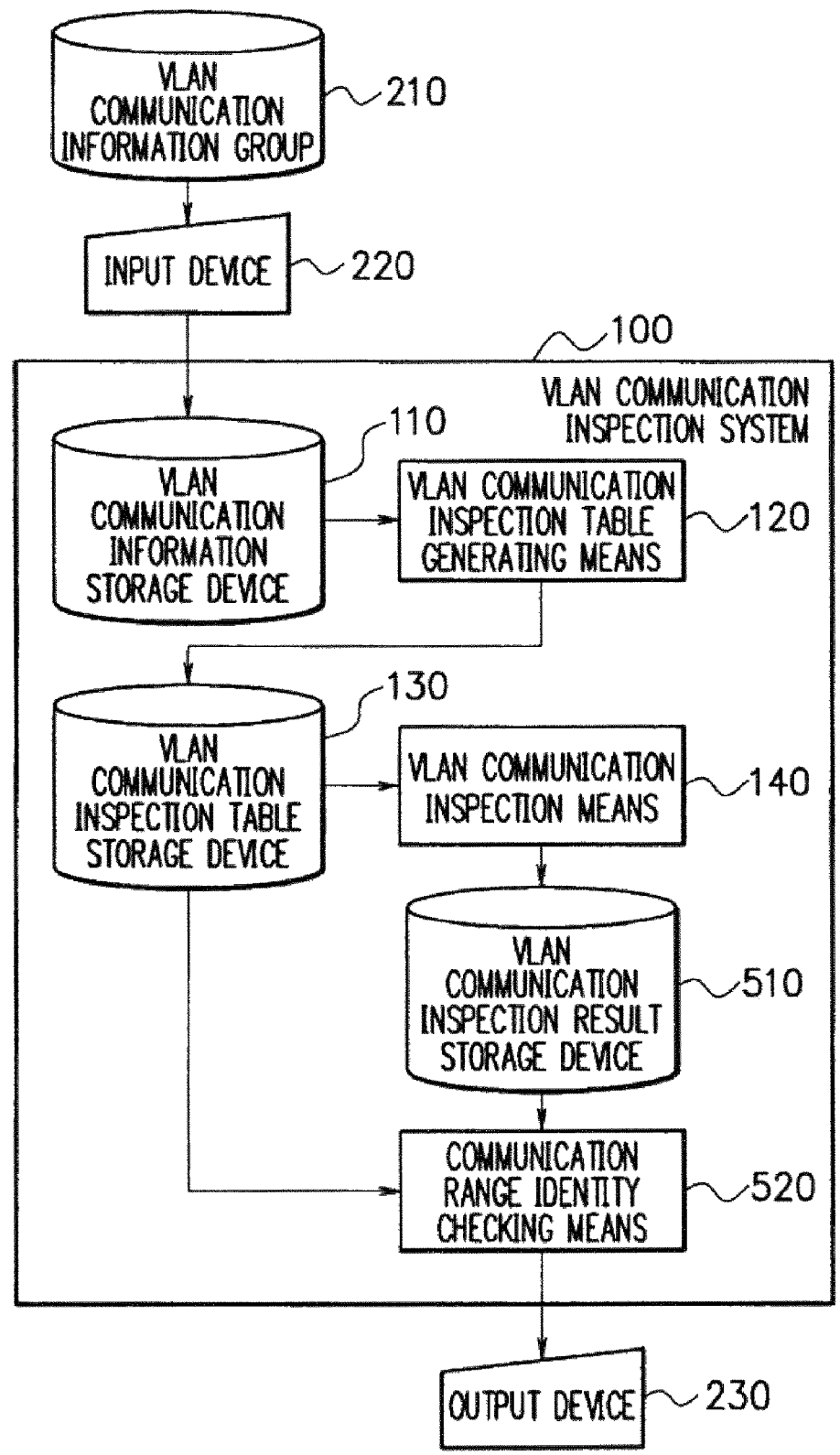

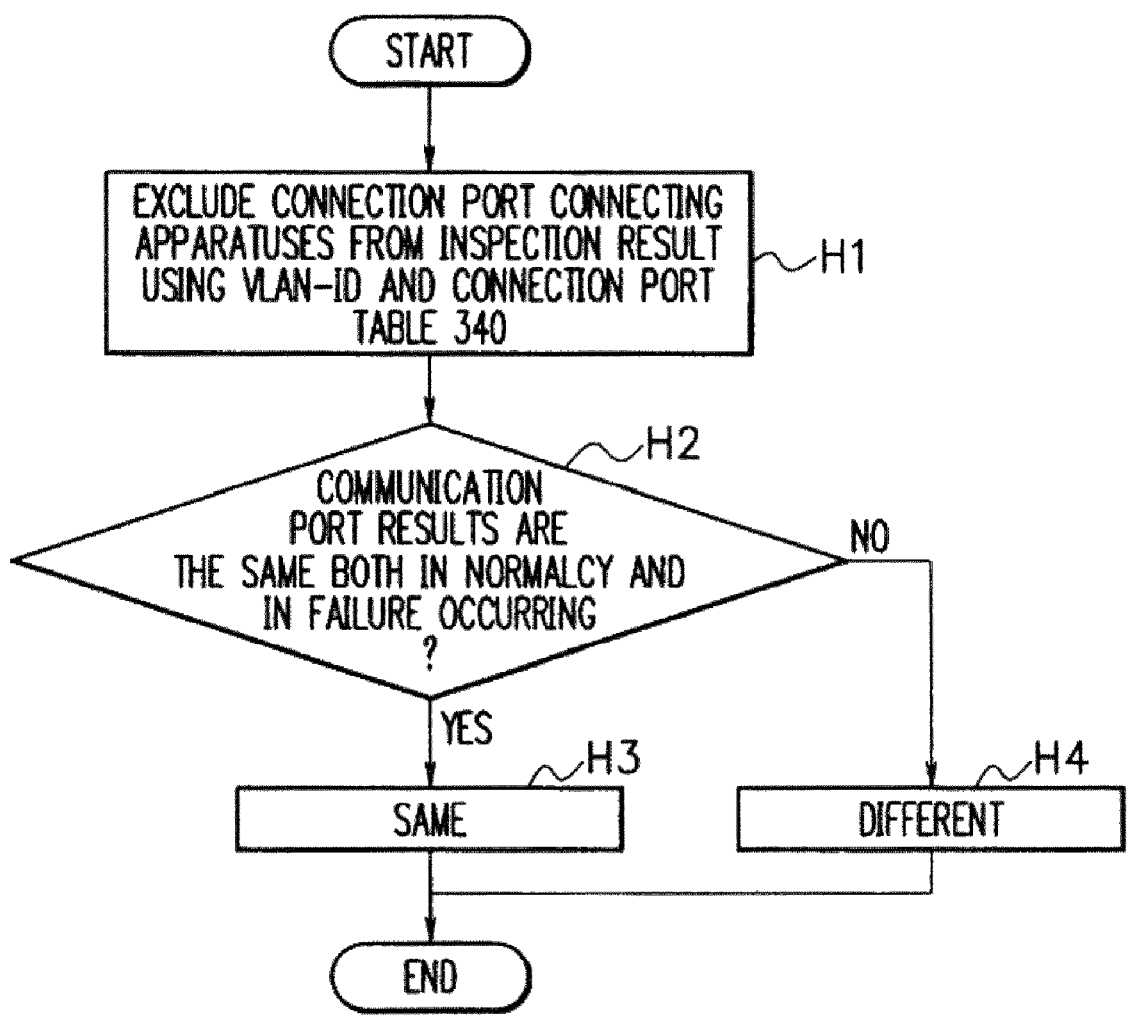
F I G. 32

FILTERING TABLE

| APPARATUS NAME | CONNECTION PORT | TRANSMISSION SOURCE IP ADDRESS | DESTINATION IP ADDRESS | ACCESS |
|---|---|---|---|---|
| B | 1/2 | 10.10.10.0/24 | 20.20.20.0/24 | REFUSAL |

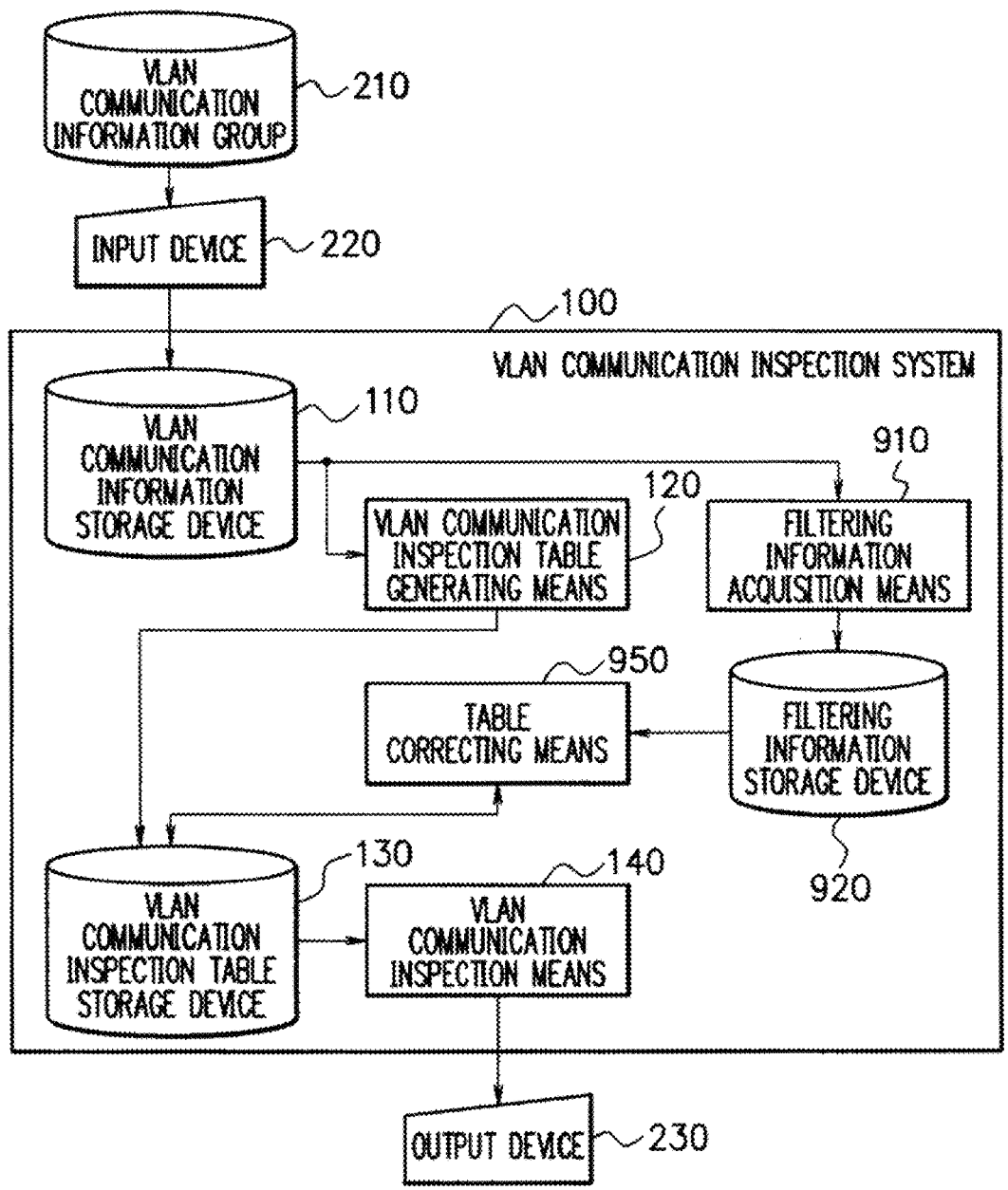

VLAN COMMUNICATION INSPECTION SYSTEM, METHOD AND PROGRAM

This application is the National Phase of PCT/JP2008/057683, filed Apr. 21, 2008, which is based upon and claims the benefit of priority from Japanese patent application No. 2007-113311, filed on Apr. 23, 2007, the disclosure of which is incorporated herein in its entirety by reference.

TECHNICAL FIELD

The present invention relates to a VLAN communication inspection system for performing an inspection about a communication range of a VLAN, a VLAN communication inspection method, and a VLAN communication inspection program.

BACKGROUND ART

By the current development of a information communication technology, a network of a company or an organization is developing more and more. Above all, a LAN (Local Area Network) is widely used as a base of the network to connect a personal computer or a server. One of the representative network apparatuses comprising the LAN is a switch. The switch is a device for connecting networks, and, by the switch, the communication between the terminals in the LAN is enabled. Recently, many switch products comprise a VLAN (Virtual Local Area Network) function, and by such a switch having the VLAN function, more complicated communication control becomes possible. The VLAN is also called a virtual LAN. The VLAN is a function to group terminals connected to a switch. The LAN can be built logically without being restricted to a physical connection of the LAN. The terminals that belong to different VLANs, even which are connected to the same switch, cannot communicate directly. When it makes terminals belonging to the different VLANs communicate, routing using an IP address with a network apparatus having a routing function such as a router or a L3 switch is necessary. A packet can be transferred to only particular terminals in the same network by using the VLAN, and there is a merit such as reduction of unnecessary traffic and security.

On the other hand, in a recent network construction technique, a redundancy of the network becomes the mainstream. The redundancy of the network means that, even if a failure occurs in a part of the network facilities, spare network facilities are incorporated to be able to continue services working on the network. For example, the network facilities refer to a network apparatus or a line. By making a network redundant, there is a merit such as improvement of stability or reliability.

The VLAN technology and the redundancy dramatically improve flexibility and reliability of the communication control. On the other hand, in a large-scale network including a network or a communication carrier where communication paths are complicated, a failure that, for example, a packet is not transferred intentionally due to an unexpected setting mistake of a network administrator or a designer is easy to occur. At the time of failure occurrence, it is difficult for the network administrator or the designer to grasp a logical network constitution of the VLAN, and it is also difficult to confirm quickly whether the VLAN communication state is in a state for which the network administrator or the designer intended. As for the reason, the VLAN on the network made redundant includes different communication paths for every VLAN-ID.

A technique about a communication inspection method of the VLAN in such an environment is described in Patent Document 1, Patent Document 2, Patent Document 3 and Non-Patent Document 1.

This kind of network inspection method and apparatus are used to inspect propriety of packet transferring and the network constitution. An example of the network inspection method and apparatus related to the present invention is described in Patent Document 1. The network inspection method and apparatus described in Patent Document 1 are to reduce load of the packet communication inspection operation of the network administrator and the designer by inspecting, without using the network, the communication propriety of the packet in a connection port of each switch on the network to be inspected.

At that time, config files of each switch are collected, and a network model for inspection is generated. The network model is a table that specifies a connection port of each switch and a forwarding address of a packet sent out from the connection port. Using this network model and an inspection request of the network administrator or the designer, the propriety of packet transferring is checked. The inspection request is a communication state of the packet that the network administrator or the designer wishes for. For example, it is exemplified that "a connection port 1/1 of a switch A and a connection port 1/2 of a switch B are available for packet communication". The network model and the inspection request are described using a CTL (Computation Tree Logic) that is one of the modal logic, for example. It is inspected whether the network model matches to the inspection request, and a result is outputted. Software to use for this matching inspection includes a SMV (Symbolic Model Verifier). About the modal logic and the SMV, it is described in Non-Patent Document 1.

A method for grasping a net constitution of the virtual LAN in a node network and a program are used to grasp an actual connection state of the virtual LAN in the Ethernet (a registered trademark). The node used herein is synonymous with a switch. An example of a method for grasping the net constitution of the virtual LAN in the node network and a program related to the present invention are described in Patent Document 2. The method for grasping the net constitution of the virtual LAN in the node network and the program described in Patent Document 2 are to send out a packet for inspection to a network to be inspected, and count the range where the packet reaches and the number of times that the packet passes the node, whereby, even if the constitution node of the virtual LAN is unidentified, the propriety of packet communication between the constitution nodes, the communication range and the net constitution of the virtual LAN can be ensured. At that time, reply packets returned to the node that sent out the packet for inspection by other nodes are collected, and information necessary for grasping the connection state of the virtual LAN is extracted. The information includes, for example, an IP address or a connection port number of the node that sent out the reply packet, or the node passage number of times from the packet for inspection. Using this information, the net constitution of the virtual LAN is outputted.

A path finding device related to the present invention is used to detect a communication path between any nodes on the network. The node used herein is synonymous with a switch. An example of the path finding device related to the present invention is described in Patent Document 3. The path finding device described in Patent Document 3 can detect a plurality of communication paths between a initial point of node and a terminal point of node fast by detecting a loop constructed between the initial point of node and the terminal point of node. At this time, node branch connection information including a branch on the network to be inspected and two nodes connected each other by the branch, which are joined together to make a pair, is generated. The loop refers to a network constitution in which a packet sent out from an initial point node returns to the initial point node again using the different communication path. Also, the branch is synonymous with a line that connects two nodes (switches). And, using the node branch connection information and a loop constitution detection algorithm, the loop constitution is detected. A procedure of the loop constitution detection algorithm is as follows.

Procedure 1: All nodes on the network to be inspected are assumed non-checked first.
Procedure 2: An initial point node is accounted checked.
Procedure 3: A certain branch is picked up.
Procedure 4: If the node of the both ends of the branch of procedure 3 is already checked, the branch belongs to a loop: if either is not checked, the node is accounted checked: and if both of them are not checked, it makes them as it is, and the next branch is picked up.
Procedure 5: Processing of procedure 4 is repeated until the number of the nodes that are already checked does not change.

Finally, all paths can be detected by extracting the path to the terminal point node from the initial point node at the time when each branch in the detected loop constitution is interrupted.

Also, a method for checking a communication range is described in Patent Document 4.

Patent Document 1: Japanese Patent Application Laid-Open No. 2005-218038 (FIG. 1, FIG. 2, paragraph 0012-0099)
Patent Document 2: Japanese Patent Application Laid-Open No. 2005-328318 (FIG. 1, FIG. 9, paragraph 0006-0036)
Patent Document 3: Japanese Patent Document 3676713 (FIG. 1, FIG. 7, paragraph 0005-0040)
Patent Document 4: Japanese Patent Application Laid-Open No. 2002-185512 (paragraph 0010)
Non-Patent Document 1: Edmund M. Clarke, Jr., et al. "Model Checking". MIT Press, U.S.A., 1999, 35-49 pages, 109-120 pages

DISCLOSURE OF THE INVENTION

Problem to be Solved by the Invention

The method described in Patent Document 1 can only know a communication path and communication propriety of the packet in a tree type network that the communication path between the switches is always one. However, a path selection method for a packet is not considered in such a network constitution making redundancy where a plurality of communication paths exists between the switches. Therefore, it is not met a request of the network administrator or the designer to want to know the communication path and the propriety of the communication.

Also, the method of Patent Document 1 can only knows the propriety of the packet communication in the same VLAN, and does not consider the propriety between the different VLANs. Therefore, it is not met a request of the network administrator or the designer to want to know the propriety of the communication in all VLANs which extended to the layer 3.

The method described in Patent Document 2 can only know the communication path and the communication propriety of the packet in the same VLAN on the network where there are plural communication paths between the switches, however, does not consider the propriety between the different VLANs. Therefore, it is not met the request of the network administrator or the designer to want to know the propriety of the communication in all VLANs which extended to the layer 3.

Also, in order check the communication path and the communication propriety of the packet, a packet for inspection must be actually transmitted to each switch of the currently operated network to be inspected, and it is not met a request of the network administrator and the designer to want to know the correctness of the communication propriety of the packet in each switch in the config setting.

The method described in Patent Document 3 can only know a candidate of the communication path of the packet on the network where there is the communication path between the switches, and cannot identify uniquely the communication path of the packet in any VLAN. Moreover, the method cannot know the communication propriety of the packet on the communication path, therefore, it is not met the request of the network administrator or the designer to want to know the communication path and the propriety of the communication of the VLAN.

Also, the communication path and the communication propriety of the packet between the different VLANs on the network to be inspected are not understood, and it is not met the request of the network administrator or the designer to want to know the communication propriety in all VLANs which extended to the layer 3.

Thus, an exemplary object of the present invention is to identify a communication range even for a communication across a plurality of VLANs in a network having a plurality of communication paths because of a redundant switch configuration in managing VLAN setting information of the switch.

Means for Solving the Problem

An exemplary aspect of the invention is a VLAN communication inspection system for checking a range that can communicate from a transmission source when an apparatus and a VLAN becoming the transmission source are specified, comprising: inputting means to which an apparatus name and a VLAN-ID that is identification information for identifying the VLAN of the apparatus becoming the transmission source are inputted; VLAN communication inspection table storing means (e.g. VLAN communication inspection table storage device 130) for storing a routing table showing a correspondence with an apparatus name of an apparatus and a routing propriety of the apparatus, a redundant apparatus table showing apparatus names of two apparatuses making redundancy and one of the two apparatus becoming a master device every VLAN-ID, and a VLAN communication propriety table (e.g., VLAN communication propriety table 360) in which an apparatus having a VLAN-ID is set as a key and an apparatus having a VLAN-ID which can communicate from the apparatus is set as a value and, each key and each value are shown as a group of an apparatus name and a VLAN-ID; and VLAN communication inspecting means (e.g., VLAN communication inspecting means 140) for generating communication path information having the groups of an apparatus name and a VLAN-ID in order, the communication path information is information showing a range that can communicate from the apparatus represented by the VLAN-ID and the apparatus name inputted to the inputting means, wherein the VLAN communication inspecting means comprises value selecting means (e.g., step C1) for determining a VLAN-ID and an apparatus name as a key and selecting one value from values corresponding to the key; passage path judging means (e.g., step C2) for judging whether the communication path information has already included the value selected by the value selecting means; routing propriety judging means (e.g., step C4) for judging whether the apparatus represented by the key is capable of routing with reference to the routing table when it is judged that the communication path information does not include the selected value (e.g., No of step C2); key judging means (e.g., step C5) for judging whether the apparatus represented by the key is either of a master device or an apparatus not making redundancy of the VLAN-ID represented by the key with reference to the redundant apparatus table when it is judged that the apparatus represented by the key is capable of routing by the routing propriety judging means (e.g., Yes of step C4); routing of VLANs judging means (e.g., step C6) for judging whether there is a point corresponding to routing between the VLANs in the communication path information that is being made when it is judged that the apparatus represented by the key is either of a master device or an apparatus not making redundancy (e.g., Yes of step C5); value judging means (e.g., step C7) for judging whether the apparatus represented by the selected value is either of a master device or an apparatus not making redundancy of the VLAN-ID represented by the key when it is judged that the apparatus represented by the key is neither a master device nor an apparatus not making redundancy by the key judging means (e.g., No of step C5); redundancy judging means (e.g., step C8) for judging whether the apparatus represented by the selected value is an apparatus making redundancy with reference to the redundant apparatus table when it is judged that the apparatus represented by the key is not capable of routing by the routing propriety judging means (e.g., No of step C4), or when it is judged that there is not a point corresponding to routing between the VLANs by the routing of VLANs judging means (e.g., No of step C6); VLAN-ID identity judging means (e.g., step C9) for judging whether the VLAN-ID represented by the key agrees with the VLAN-ID represented by the value when it is judged that there is a point corresponding to routing between the VLANs by the routing of VLANs judging means (e.g., Yes of step C6); master judging means (e.g., step C11) for judging whether the apparatus represented by the selected value is a master device of the VLAN-ID represented by the key when it is judged that the apparatus represented by the selected value is an apparatus making redundancy by the redundancy judging means (e.g., Yes of step C8); path adding means (e.g., step C10) for adding the selected value to the communication path information when it is judged that the apparatus represented by the selected value is either of a master device or an apparatus not making redundancy by the value judging means (e.g., Yes of step C7), or when it is judged that the VLAN-IDs agree with each other by the VLAN-ID identity judging means (e.g., Yes of step C9), or when it is judged that the apparatus represented by the selected value is not an apparatus making redundancy by the redundancy judging means (e.g., No of step C8), or when it is judged that the apparatus represented by the selected value is a master device by the master judging means (e.g., Yes of step C11); and setting a predetermined flag to a state showing that there is a point corresponding to routing between the VLANs when the apparatus name represented by the key is the same with the apparatus name represented by the value and the VLAN-ID represented by the key is different from the VLAN-ID represented by the value; and non-selected value presence judging means for judging whether there is a non-selected value in values corresponding to the key when it is judged that the communication path information includes the selected value by the passage path judging means (e.g., Yes of step C2), or when it is judged that the apparatus represented by the selected value is neither a master device nor an apparatus not making redundancy by the value judging means (e.g., No of step C7), or when it is judges that the VLAN-IDs do not agree with each other by the VLAN-ID identity judging means (e.g., No of step C9), or when it is judged that the apparatus represented by the selected value is not a master device by the master judging means (e.g., No of step C11), wherein the value selecting means selects one value from non-selected values when there is non-selected values in values corresponding to the key, and the value selecting means sets the VLAN-ID and the apparatus name inputted to the inputting means as a key; when selecting all values corresponding to the key, sets a value added to the communication path information among time values corresponding to the key as a new key and selects one value from values corresponding to the new key.

The VLAN communication inspection system preferably comprises failure occurring apparatus inputting means for inputting an apparatus name of a failure occurring apparatus supposed to have a failure, wherein the VLAN communication inspecting means comprises failure occurring apparatus name judging means (e.g., step D11) for judging whether the apparatus name represented by the value selected by the value selecting means is the apparatus name of the failure occurring apparatus when the apparatus name of the failure occurring apparatus is inputted to the failure occurring apparatus inputting means; and backup device failure judging means (e.g., step E1) for judging, when the apparatus name of the failure occurring apparatus is inputted to the failure occurring apparatus inputting means and it is judged that the apparatus represented by the selected value is an apparatus making redundancy by the redundancy judging means (e.g., Yes of step C8), whether an apparatus making redundancy with the apparatus represented by the selected value is a failure occurring apparatus, the passage path judging means judges, when it is judged that the apparatus name represented by the value selected by the value selecting means is not the apparatus name of the failure occurring apparatus by the failure occurring apparatus name judging means (e.g., No of step D1), whether the communication path information has already included the value selected by the value selecting means, the master judging means judges, when it is judged that the apparatus making redundancy with the apparatus represented by the selected value is not the failure occurring apparatus by the backup device failure judging means (e.g., No of step E1), whether the apparatus represented by the selected value is a master device of the VLAN-ID represented by the key, the path adding means adds the selected value to the communication path information when it is judged that the apparatus making redundancy with the apparatus represented by the selected value is not the failure occurring apparatus by the backup device failure judging means; and sets a predetermined flag to a state showing that there is a point corresponding to routing between the VLANs when the apparatus name represented by the key is the same with the apparatus name represented by the value and the VLAN-ID represented by the key is different from the VLAN-ID represented by the value, the non-selected value presence judging means judges whether there is a non-selected value in values corresponding to the key when it is judged that the apparatus name represented by the value selected by the value selecting means is the apparatus name of the failure occurring apparatus by the failure occurring apparatus name judging means.

The VLAN communication inspection system preferable comprises connection port table storing means (e.g., connection port table storage device 420) for storing a connection port table showing a VLAN-ID set in each connection port of each apparatus; and connection port identification means (e.g., connection port identification means 430) for selecting groups of an apparatus name and a VLAN-ID included in the communication path information sequentially, and identifying connection port information of an apparatus corresponding to the apparatus name and the VLAN-ID of the selected group with reference to the connection port table.

The VLAN communication inspection system is preferably a VLAN communication inspection system wherein the VLAN communication inspecting means does not perform judgments by the failure occurring apparatus name judging means and by the backup device failure judging means assuming that the apparatus name of the failure occurring apparatus is not inputted to the failure occurring apparatus inputting means and generates communication path information in the normalcy; and performs judgments by the failure occurring apparatus name judging means and by the backup device failure judging means using the apparatus name of the failure occurring apparatus inputted to the failure occurring apparatus inputting means and generates communication path information in the failure occurring; and the VLAN communication inspecting means comprises communication range identity inspecting means (e.g., communication range identity inspecting means 520) for judging an identity of the communication path information in the normalcy and the communication path information in the failure occurring.

The VLAN communication inspection system is preferably a VLAN communication inspection system wherein the VLAN communication inspecting means does not perform judgments by the failure occurring apparatus name judging means and by the backup device failure judging means assuming that the apparatus name of the failure occurring apparatus is not inputted to the failure occurring apparatus inputting means and generates communication path information in the normalcy; and performs judgments by the failure occurring apparatus name judging means and by the backup device failure judging means using the apparatus name of the failure occurring apparatus inputted to the failure occurring apparatus inputting means and generates communication path information in the failure occurring; the connection port identification means identifies connection port information based on the communication path information in the normalcy and the communication path information in the failure occurring; and the connection port identification means comprises connection port identity inspecting means (e.g., connection port identity inspecting means 720) for judging an identity of the connection port information identified based on the communication path information in the normalcy and the connection port information identified based on the communication path information in the failure occurring.

The VLAN communication inspection system preferably comprises screen displaying means (e.g., it is implemented by VLAN communication inspecting means 140 or output device 230) for displaying each apparatus name included in the communication path information; and outputting a screen displaying an arrow pointing from an apparatus name to other apparatus name in order of a path indicated by the communication path information.

The VLAN communication inspection system preferably comprises screen displaying means (e.g., it is implemented by connection port identification means 430 or output device 230) for displaying connection port information every each apparatus; and outputting a screen establishing a displaying aspect of the connection port information depending on possibility or impossibility of communication with the transmission source.

The VLAN communication inspection system is preferably a VLAN communication inspection system, wherein the VLAN communication inspection table storing means stores a subnet address table showing a correspondence with a VLAN-ID and a subnet address set in the VLAN-ID and comprises filtering information storing means (e.g., filtering information storage device 920) for storing a filtering table showing a correspondence with an apparatus name of an apparatus, a connection port of the apparatus, and a filtering rule set in the connection port; and communication path correcting means (e.g., filtering communication propriety checking means 930) for deleting a path after a point where communication is interrupted from the communication path information generated by the VLAN communication inspecting means, the filtering rule specifies a transmission source address and a destination address as a condition and determines whether packet communication matching with the condition is permitted, the communication path correcting means comprises extracting means (e.g., step I1) for extracting a filtering rule and an apparatus name corresponding to the filtering rule from the filtering table; converting means (e.g., step I3) for converting an transmission source address and a destination address of the condition specified by the filtering rule to a VLAN-ID corresponding to the subnet address respectively with reference to the subnet address table when the extracted filtering rule determines refusal of the communication; and deleting means (e.g., steps I4 to I6) for deleting, when a path from the group of the VLAN-ID converted from the transmission source address and the apparatus name extracted by the extracting means to the group of the VLAN-ID converted from the destination address and the apparatus name is shown in the communication path information, a path after the corresponding path from the communication path information.

The VLAN communication inspection system is preferable a VLAN communication inspection system, wherein the VLAN communication inspection table storing means stores the subnet address table showing a correspondence with a VLAN-ID and a subnet address set in the VLAN-ID and comprises the filtering information storing means (e.g., filtering information storage device 920) for storing the filtering table showing a correspondence with an apparatus name of an apparatus, a connection port of the apparatus, and a filtering rule set in the connection port; and table correcting means (e.g., table correcting means 950) for deleting a value representing an apparatus that cannot communicate with the apparatus represented by the key from values of the VLAN communication propriety table, the filtering rule specifies a transmission source address and a destination address as a condition and determines whether packet communication matching with the condition is permitted, the table correcting means comprises extracting means (e.g., step J1) for extracting a filtering rule and an apparatus name corresponding to the filtering rule from the filtering table; converting means (e.g., step J3) for converting an transmission source address and a destination address of the condition specified by the filtering rule to a VLAN-ID corresponding to the subnet address respectively with reference to the subnet address table when the extracted filtering rule determines refusal of the communication; and value deleting means (e.g., steps J4 to J6) for determining the group of the VLAN-ID converted from the transmission source address and the apparatus name extracted by the extracting means as a key; and deleting, when a value matching with the group of the VLAN-ID converted from the destination address and the apparatus name is included in values corresponding to the key, the value.

The VLAN communication inspection system is preferable a VLAN communication inspection system, wherein the VLAN communication inspection table storing means stores the subnet address table showing a correspondence with a VLAN-ID and a subnet address set in the VLAN-ID; a VLAN-ID table showing a correspondence with an apparatus name of each apparatus and a VLAN-ID set in the apparatus; and the connection port table showing VLAN communication propriety between connection ports connecting each apparatus every VLAN-ID; and comprises VLAN communication propriety table generating means (e.g. VLAN communication inspection table generating means 120) for generating the VLAN communication propriety table using information stored to the VLAN communication inspection table storing means.

An exemplary aspect of the invention is a VLAN communication inspection method applied to a VLAN communication inspection system that comprises inputting means to which an apparatus name and a VLAN-ID that is identification information for identifying the VLAN of the apparatus becoming the transmission source are inputted and VLAN communication inspection table storing means for storing a routing table showing a correspondence with an apparatus name of an apparatus and a routing propriety of the apparatus, a redundant apparatus table showing apparatus names of two apparatuses making redundancy and one of the two apparatus becoming a master device every VLAN-ID, and a VLAN communication propriety table in which an apparatus having a VLAN-ID is set as a key and an apparatus having a VLAN-ID which can communicate from the apparatus is set as a value and, each key and each value are shown as a group of an apparatus name and a VLAN-ID and generates communication path information having the groups of an apparatus name and a VLAN-ID in order, the communication path information is information showing a range that can communicate from the apparatus represented by the VLAN-ID and the apparatus name inputted to the inputting means, the method comprising: a value selecting step of determining a VLAN-ID and an apparatus name as a key and selecting one value from values corresponding to the key; a passage path judging step of judging whether the communication path information has already included the value selected by the value selecting step; a routing propriety judging step of judging whether the apparatus represented by the key is capable of routing with reference to the routing table when it is judged that the communication path information does not include the selected value; a key judging step of judging whether the apparatus represented by the key is either of a master device or an apparatus not making redundancy of the VLAN-ID represented by the key with reference to the redundant apparatus table when it is judged that the apparatus represented by the key is capable of routing by the routing propriety judging step: a routing of VLANs judging step of judging whether there is a point corresponding to routing between the VLANs in the communication path information that is being made when it is judged that the apparatus represented by the key is either of a master device or an apparatus not making redundancy; a value judging step of judging whether the apparatus represented by the selected value is either of a master device or an apparatus not making redundancy of the VLAN-ID represented by the key when it is judged that the apparatus represented by the key is neither a master device nor an apparatus not making redundancy by the key judging step; a redundancy judging step of judging whether the apparatus represented by the selected value is an apparatus making redundancy with reference to the redundant apparatus table when it is judged that the apparatus represented by the key is not capable of routing by the routing propriety judging step, or when it is judged that there is not a point corresponding to routing between the VLANs by the routing of VLANs judging step; a VLAN-ID identity judging step of judging whether the VLAN-ID represented by the key agrees with the VLAN-ID represented by the value when it is judged that there is a point corresponding to routing between the VLANs by the routing of VLANs judging step; a master judging step of judging whether the apparatus represented by the selected value is a master device of the VLAN-ID represented by the key when it is judged that the apparatus represented by the selected value is an apparatus making redundancy by the redundancy judging step; a path adding step of adding the selected value to the communication path information when it is judged that the apparatus represented by the selected value is either of a master device or an apparatus not making redundancy by the value judging step, or when it is judged that the VLAN-IDs agree with each other by the VLAN-ID identity judging step, or when it is judged that the apparatus represented by the selected value is not an apparatus making redundancy by the redundancy judging step, or when it is judged that the apparatus represented by the selected value is a master device by the master judging step; and setting a predetermined flag to a state showing that there is a point corresponding to routing between the VLANs when the apparatus name represented by the key is the same with the apparatus name represented by the value and the VLAN-ID represented by the key is different from the VLAN-ID represented by the value; and a non-selected value presence judging step of judging whether there is a non-selected value in values corresponding to the key when it is judged that the communication path information includes the selected value by the passage path judging step, or when it is judged that the apparatus represented by the selected value is neither a master device nor an apparatus not making redundancy by the value judging step, or when it is judges that the VLAN-IDs do not agree with each other by the VLAN-ID identity judging step, or when it is judged that the apparatus represented by the selected value is not a master device by the master judging step, wherein the value selecting step selects one value from non-selected values when there is non-selected values in values corresponding to the key, and the value selecting step sets the VLAN-ID and the apparatus name inputted to the inputting means as a key; when selecting all values corresponding to the key, sets a value added to the communication path information among the values corresponding to the key as a new key and selects one value from values corresponding to the new key.

An exemplary aspect of the invention is a VLAN communication inspection program mounted on a computer that comprises inputting means to which an apparatus name and a VLAN-ID that is identification information for identifying the VLAN of the apparatus becoming the transmission source are inputted and VLAN communication inspection table storing means for storing a routing table showing a correspondence with an apparatus name of an apparatus and a routing propriety of the apparatus, a redundant apparatus table showing apparatus names of two apparatuses making redundancy and one of the two apparatus becoming a master device every VLAN-ID, and a VLAN communication propriety table in which an apparatus having a VLAN-ID is set as a key and an apparatus having a VLAN-ID which can communicate from the apparatus is set as a value and, each key and each value are shown as a group of an apparatus name and a VLAN-ID and generates communication path information having the groups of an apparatus name and a VLAN-ID in order, the communication path information is information showing a range that can communicate from the apparatus represented by the VLAN-ID and the apparatus name inputted to the inputting means, the program causes the computer to execute process comprising: value selecting processing for determining a VLAN-ID and an apparatus name as a key and selecting one value from values corresponding to the key; passage path judging processing for judging whether the communication path information has already included the value selected by the value selecting processing; routing propriety judging processing for judging whether the apparatus represented by the key is capable of routing with reference to the routing table when it is judged that the communication path information does not include the selected value; key judging processing for judging whether the apparatus represented by the key is either of a master device or an apparatus not making redundancy of the VLAN-ID represented by the key with reference to the redundant apparatus table when it is judged that the apparatus represented by the key is capable of routing by the routing propriety judging processing; routing of VLANs judging processing for judging whether there is a point corresponding to routing between the VLANs in the communication path information that is being made when it is judged that the apparatus represented by the key is either of a master device or an apparatus not making redundancy; value judging processing for judging whether the apparatus represented by the selected value is either of a master device or an apparatus not making redundancy of the VLAN-ID represented by the key when it is judged that the apparatus represented by the key is neither a master device nor an apparatus not making redundancy by the key judging processing; redundancy judging processing for judging whether the apparatus represented by the selected value is an apparatus making redundancy with reference to the redundant apparatus table when it is judged that the apparatus represented by the key is not capable of routing by the routing propriety judging processing, or when it is judged that there is not a point corresponding to routing between the VLANs by the routing of VLANs judging processing; VLAN-ID identity judging processing for judging whether the VLAN-ID represented by the key agrees with the VLAN-ID represented by the value when it is judged that there is a point corresponding to routing between the VLANs by the routing of VLANs judging processing; master judging processing for judging whether the apparatus represented by the selected value is a master device of the VLAN-ID represented by the key when it is judged that the apparatus represented by the selected value is an apparatus making redundancy by the redundancy judging processing; path adding processing for adding the selected value to the communication path information when it is judged that the apparatus represented by the selected value is either of a master device or an apparatus not making redundancy by the value judging processing, or when it is judged that the VLAN-IDs agree with each other by the VLAN-ID identity judging processing, or when it is judged that the apparatus represented by the selected value is not an apparatus making redundancy by the redundancy judging processing, or when it is judged that the apparatus represented by the selected value is a master device by the master judging processing; and setting a predetermined flag to a state showing that there is a point corresponding to routing between the VLANs when the apparatus name represented by the key is the same with the apparatus name represented by the value and the VLAN-ID represented by the key is different from the VLAN-ID represented by the value; non-selected value presence judging processing for judging whether there is a non-selected value in values corresponding to the key when it is judged that the communication path information includes the selected value by the passage path judging processing, or when it is judged that the apparatus represented by the selected value is neither a master device nor an apparatus not making redundancy by the value judging processing, or when it is judges that the VLAN-IDs do not agree with each other by the VLAN-ID identity judging processing, or when it is judged that the apparatus represented by the selected value is not a master device by the master judging processing, wherein the value selecting processing selects one value from non-selected values when there is non-selected values in values corresponding to the key, and the value selecting processing sets the VLAN-OD and the apparatus name inputted to the inputting means as a key; when selecting all values corresponding to the key, sets a value added to the communication path information among the values corresponding to the key as a new key and selects one value from values corresponding to the new key.

Effect of the Invention

According to the present invention, even for a communication across a plurality of VLANs in a network having a plurality of communication paths because of a redundant switch configuration, a communication range can be identified.

BEST MODE FOR CARRYING OUT THE INVENTION

Exemplary embodiments of the present invention will be described with reference to drawings.

First Exemplary Embodiment

FIG. 1 is a block diagram showing a constitution example of a first exemplary embodiment of the present invention. As shown in FIG. 1, a VLAN communication inspection system 100 of the present invention is provided with input means 220 and output means 230. The VLAN communication inspection system 100 comprises a VLAN communication information storage device 110, VLAN communication inspection table generating means 120, a VLAN communication inspection table storage device 130 and VLAN communication inspection means 140. Note that, the VLAN communication inspection system 100 itself may include input means 220 and output means 230.

In the outside of the VLAN communication inspection system 100, a VLAN communication information extraction unit (not shown) that extracts information relating to the VLAN communication (referred as VLAN communication information hereinbelow) from a config file of each switch in a communication network to be inspected and a switch connection constitution information extraction device (not shown) which extracts switch connection constitution information that is information showing the physical connection constitution between the switches on the network are provided. As follows, a information group that combined the switch connection constitution information with the VLAN communication information is expressed as a VLAN communication information group. Here, a switch is not only a switching device such as an L2 switch or an L3 switch, and a router having a VLAN function may be included.

The input device 220 inputs a VLAN communication information group 210 into the VLAN communication inspection system 100. That is, the input device 220 makes the VLAN communication information storage device 110 store the VLAN communication information outputted by the VLAN communication information extraction unit (not shown) and the switch connection constitution information outputted by the switch connection constitution information extraction device (not shown).

The VLAN communication information storage device 110 is a storage device that records the VLAN communication information group 210 (i.e., the VLAN communication information extracted from the config file of each switch and the switch connection constitution information showing the physical connection constitution of switches) inputted by the input device 220.

The VLAN communication inspection table generating means 120 generates information for inspection necessary for identifying a communication range or a communication path of the VLAN using the VLAN communication information and the switch connection constitution information of a config file recorded in the VLAN communication information storage device 110. It is described below about the information for inspection and a generating operation of the information for inspection. The VLAN communication inspection table storage device 130 is a storage device that records the information for inspection generated by the VLAN communication inspection table generating means 120. The VLAN communication inspection means 140 checks a range or a communication path of the VLAN communication (packet communication) using the information for inspection recorded in the VLAN communication inspection table storage device 130. It is described below about an operation of the VLAN communication inspection means 140.

The output device 230 outputs a result checked by the VLAN communication inspection means 140. For example, the output device 230 is a display unit.

For example, the VLAN communication inspection table generating means 120 and the VLAN communication inspection means 140 are implemented by a CPU working by a program. The VLAN communication inspection table generating means 120 and the VLAN communication inspection means 140 may be implemented by the same CPU. Note that, for example, the program is stored to a program storage (not shown) included in the VLAN communication inspection system 100. The CPU reads the program, and it works as the VLAN communication inspection table generating means 120 and the VLAN communication inspection means 140 according to the program.

For example, the VLAN communication information storage device 110 and the VLAN communication inspection table storage device 130 are implemented by a storage device such as a hard disk.

For example, the input device 220 is an interface of the VLAN communication information extraction unit (not shown) that extracts the VLAN communication information described in a switch-independent form from a config file of each maker described in a switch-dependent form, the switch connection constitution information extraction device (not shown) that extracts the switch connection constitution information, and the VLAN communication inspection system 100.

Also, while an illustration is omitted, but the VLAN communication inspection system 100 comprises an input device (not shown) to which an apparatus name and a VLAN-ID are inputted by a network administrator or a designer. The VLAN communication inspection means 140 identifies a communication available range from a switch to which the VLAN-ID inputted by the input device (not shown) is set (a switch to which the apparatus name is inputted).

The VLAN communication information extraction unit (not shown) and the switch connection constitution information extraction device (not shown) are, for example, a computer working according to a program.

A program to operate the switch connection constitution information extraction device may be implemented using an SNMP (Simple Network Management Protocol) management function or MIB (Management Information Base) information mounted on various network apparatuses. The SNMP is a network management protocol, and one of techniques to manage the information about the constitution or the operation of the network apparatus. Also, the MIB refers to a group of the information about the constitution or the operation of the network apparatus. Using network management software having a function to collect the switch connection constitution information through the SNMP or the MIB, the VLAN communication inspection system 100 may perform the operation to extract the switch connection constitution information. Also, the switch connection constitution information may be generated and utilized by a manual operation.

FIG. 2 and FIG. 3 show an example of a config file of the switch. FIG. 2 is an example of the config file of the L2 switch, and FIG. 3 is an example of the config file of the L3 switch. The VLAN communication information extraction unit (not shown) collects the config file from each switch, and extracts the information about the communication setting of the VLAN (VLAN communication information) from the config file. The VLAN communication information includes at least an apparatus name of the switch and information indicating the correspondency between a VLAN-ID and a connection port; the VLAN communication information further includes information showing the routing function of the switch being made effectively, when the routing function of the switch is made effectively; and includes, when a subnet address is set in the VLAN-ID, information that can identify the subnet address. Also, the VLAN communication information extracted from the config file of the L3 switch includes information that can identify other switches making redundancy and information showing which switch making redundancy is used preferentially. Because the redundancy is not taken, as for the L2 switch, the information about this redundancy is not described in the config file of the L2 switch. The VLAN-ID is an ID number to identify each VLAN, and it may be referred to as a VID.

Note that, the VLAN communication information may include other information. For example, in the presence of a filtering rule corresponding to the connection port, information that can identify the filtering rule may be included.

For example, the first line of the config file shown in FIG. 2 is VLAN communication information showing an apparatus name of the switch "AAAA". Note that, the apparatus name is also described in header information described in the leading portion of the config file. The apparatus name described in the header information of the config file is a predetermined apparatus name, and not an apparatus name that the network administrator or the designer established conveniently. According to the apparatus name, a type of the apparatus (the L2 switch, the L3 switch, or a router) can be identified.

The line beginning with a character string "set vlan portbase" or a character string "set vlan tagbase" of the config file shown in FIG. 2 are the VLAN communication information that establishes the correspondency of the connection port and the VLAN-ID. For example, "set vlan portbase 1/1 10" means that "VLAN-ID=10 is set in the connection port 1/1". Also,
"set vlan tagbase 1/8 10, 20" represents that "VLAN-ID=10 and 20 are set in the connection port 1/1". Also, "set vlan portbase 10 vid10" means that "a name of "vid10" which the network administrator and the designer established originally is set to VLAN-ID=10". Note that, "port" means a connection port to which only one VLAN-ID is set, and "tag" means a connection port that can set plural VLAN-IDs. This is similar about an example shown in FIG. 3.

Also, the line beginning with a character string "set filter profile" shown in FIG. 2 shows a filtering rule, and the lines beginning with a character string "set filter in-port" or "set filter out-port" are the VLAN communication information showing the filtering rule corresponding to the connection port. For example, "set filter in-port fe 4/1 10 1" shown in FIG. 2 shows that "the filtering rule corresponding to the connection port 4/1 (VLAN-ID=10) is the first filtering rule (in the example shown in FIG. 2, it is "set filter profile 1 block src-ip 10. 10. 10. 1 255. 255. 255. 0")". Note that, in each detailed description of the first to fifth exemplary embodiments, the VLAN communication information does not need to include the information about such a filtering rule.

The first line of the config file shown in FIG. 3 is the VLAN communication information showing an apparatus name of the switch "BBBB". Note that, the apparatus name is also described in the header information described in the leading portion of the config file. The apparatus name described in the header information of the config file is a predetermined apparatus name, and not an apparatus name that the network administrator or the designer established conveniently. According to the apparatus name, a type of the apparatus (the L2 switch, the L3 switch, or a router) can be identified.

The second line and the third line shown in FIG. 3 are the filtering rule associated with the connection port. In each detailed description of the first to fifth exemplary embodiments, the VLAN communication information does not need to include the information about such a filtering rule.

Also, the combination with the line beginning with "interface vlan" and the line beginning with "ip address" shown in FIG. 3 is the VLAN communication information which shows an address corresponding to the connection port. For example, "interface vlan 10" and the following line "ip address 192. 168. 10. 1/24" show that "the subnet address of VLAN-ID=10 is "192. 168. 10. 1/24"". The description of "interface vlan" is a command to specify the VLAN-ID, and, for example, the command "interface vlan 10" specifics "VLAN-ID=10". Also, "ip address" is a subnet address setting command to set an address (subnet address) to the specified VLAN-ID.

Also, the combination of the line beginning with "interface ethernet" and the line beginning with "bridge-group" shown in FIG. 3 is the VLAN communication information that establishes the correspondency of the connection port and the VLAN-ID. For example, "interface ethernet 1/1" and the following line "bridge-group 10 port" means "set VLAN-ID=10 to the connection port 1/1".

Also, "router rip" shown in FIG. 3 is the VLAN communication information showing the routing function of the switch (in this example "BBBB") being effective.

Also, the description of "gsrp, numerical value" shown in FIG. 3 is the VLAN communication information to identify the other switch making redundancy. In the config file of a switch making redundancy, information of "gsrp, numerical value" is described using the same numerical value. The switches making redundancy refer to two switches in which one switch operates in the normalcy, and the other switch operates when a failure occurs on the switch. Because the description of "gsrp 100" is included in the config file shown in FIG. 3, it is acknowledged that the redundancy is made with the other switch having the "gsrp 100" in its config file. Also, the description of "vlan-group, group number, vlan, numerical value" is information to set a group number to the VLAN of a switch making redundancy. For example, "vlan-group 1 vlan 10" means "set a group number of "1" to the VLAN-ID of "10"". The description of "vlan-group, group number, priority, numerical value" is information to establish a switch becoming a master device in the switches making redundancy. Every group number, a switch having a larger numerical value following "priority" becomes the master device.

Here, the "master device" is an apparatus which is usually used for transferring a packet among two redundant apparatuses. Also, another apparatus (a switch) that operates when the packet cannot be transferred due to a trouble of the switch as the master device is referred to as a backup device. Other than a name called the "master/backup", "master/slave" or "primary/secondary" may be used.

The above information is extracted from the config file as the VLAN communication information. In the following description, it is described with a case that the VLAN communication information is extracted as information described in the formats shown in FIG. 2 and FIG. 3 as an example.

Also, in addition, the description of the number of the connection ports of the switch in the config file corresponds to the VLAN communication information, and such VLAN communication information may be included in the VLAN communication information group 210.

FIG. 4 is an illustration which shows an example of the switch connection constitution information. As shown in FIG. 4, each switch connection constitution information includes a constitution number, a transmission source apparatus name, a transmission source connection port, a destination apparatus name, and a destination connection port. The constitution number is a unique value allocated to each switch connection constitution information. The constitution number may be a character string that is unique every switch connection constitution information. Also, the transmission source connection port and the destination connection port are represented by the description of "slot number/connection port number" in FIG. 4 and the following discussion. The slot is a board mounting plural connection ports. For example, the switch connection constitution information of the constitution number 1 shown in FIG. 4 represents the physical connection constitution between the switches that "a transmission source connection port represented by 1/1 having a transmission source apparatus name of A connects to a destination connection port represented by 1/1 having a destination apparatus name of B".

Then, an operation is described.

The input device 220 inputs the VLAN communication information group 210 (the VLAN communication information and the switch connection constitution information) into the VLAN communication inspection system 100, and stores the information to the VLAN communication information storage device 110.

Here, the information for inspection and a generating operation of the information for inspection will be described. FIG. 5 is an illustration which shows an example of various tables (information for inspection) generated by the VLAN communication inspection table generating means 120. The VLAN communication inspection table generating means 120 generates a routing table 310, a subnet address table 320, a VLAN-ID table 330, a connection port table 340 and a redundant apparatus table 350 using the VLAN communication information and the switch connection constitution information stored in the VLAN communication information storage device 110. Moreover, using these tables, the VLAN communication inspection table generating means 120 generates a VLAN communication enabled/disabled hash table 360. The VLAN communication inspection table generating means 120 stores the generated VLAN communication enabled/disabled hash table 360 or the like to the VLAN communication inspection table storage device 130.

The routing table 310 is a table to represent whether a switch described in the VLAN communication information stored in the VLAN communication information storage device 110 is available for routing. The routing table 310 is generated using the VLAN communication information of each switch, and it has enabled/disabled information of the routing corresponding to the switch. In the routing table 310, an apparatus name (a switch name) is associated with propriety of the routing (whether the routing can be performed or not). For example, as for the first line of the routing table 310 of FIG. 5, it is shown "a switch of an apparatus name of A is impossible of routing". Here, because the L2 switch does not have the routing function, enabled/disabled states of the routing always describe "impossible" when the switch is the L2 switch. The distinction whether a switch is the L2 switch or the other than is possible easily by referring to the config file of each switch.

FIG. 6 is a flow chart showing processing to generate the routing table 310. At first, the VLAN communication inspection table generating means 120 extracts an apparatus name of each switch from the VLAN communication information (step S1). Since an apparatus name is described with a predetermined character string as exemplified in FIGS. 2 and 3, a character string described with the predetermined character string should be extracted as the apparatus name. The VLAN communication inspection table generating means 120 determines whether information showing the routing function being made effectively (e.g., "router rip" shown in FIG. 3) is described within the VLAN communication information (step S2). If the information showing the routing function being made effectively is described within the VLAN setting information, the fact that the switch is available for routing is associated with the apparatus name and described in the routing table 310 (step S3).

On the other hand, if the information showing the routing function being made effectively is not described within the VLAN setting information, the fact that the network apparatus is impossible of routing (the routing function is not made effectively or the routing function is not provided) is associated with the apparatus name and described in the routing table 310 (step S4).

"Impossible" should be always described as an enabled/disabled state of the routing when a switch is the L2 switch.

The subnet address table 320 is a table showing a subnet address corresponding to the VLAN-ID. The VLAN-ID and the subnet address to be set in the VLAN-ID are associated to the subnet address table 320. The subnet address table 320 is generated using the VLAN communication information of each switch, and it has subnet address information corresponding to the VLAN-ID. For example, the first line of the subnet address table 320 in FIG. 5 represents that "the subnet address corresponding to VLAN-ID=10 is 10. 10. 10. 0/24".

Here, when the subnet address corresponding to the VLAN-ID does not exist, a character string to represent that the subnet address does not exist is associated with the VLAN-ID and described. For example, the character string such as "X" is described. A character string to represent that the subnet address does not exist may be any kind of character string. Furthermore, a notation of the subnet address may use the common notation to represent the subnet mask of the network. For example, it may be such as "255. 255. 255. 0", and it may be a description by a prefix value such as "/24".

FIG. 7 is a flow chart showing processing to generate the subnet address table 320. At first, the VLAN communication inspection table generating means 120 extracts a command to specify the VLAN-ID of each network from the VLAN communication information (step S11). For example, a command including a predetermined character string "interface vlan" shown in FIG. 3 is extracted. Next, the VLAN communication inspection table generating means 120 determines whether there is a subnet address setting command corresponding to the command (step S12). When it is determined that there is the subnet address setting command, the VLAN-ID specified by the command that specifies the VLAN-ID and the subnet address indicated by the subnet address setting command are associated with each other and described in the subnet address table 320 (step S13). When it is determined that there is not the subnet address setting command, the VLAN-ID specified by the command that specifies the VLAN-ID and a character string showing that the subnet address does not exist (for example, "X") are associated with each other and described in the subnet address table 320 (step S14).

The VLAN-ID table 330 is a table showing the VLAN-ID registered with each switch. In the VLAN-ID table 330, the apparatus name of each switch and the VLAN-ID registered with each switch are associated with each other. For example, the first line of the VLAN-ID table 330 in FIG. 5 shows that "in a switch having an apparatus name of A, VLAN-ID=10, 20 are registered".

The VLAN communication inspection table generating means 120 generates the VLAN-ID table 330 using the VLAN communication information of each switch as follows. The VLAN communication inspection table generating means 120 extracts an apparatus name from the VLAN communication information, and a command that specifies the VLAN-ID of each network is further extracted from the VLAN communication information. For example, "bridge-group, numerical value, VLAN-type port" in FIG. 3 is a command for specifying the VLAN-ID, and a numerical value showing the VLAN-ID is extracted from a command described by such a predetermined character string. Note that, the VLAN-ID may be extracted from the other commands from which the VLAN-ID can be extracted. And, the VLAN communication inspection table generating means 120 makes the apparatus name associate with the VLAN-ID and stores them to the VLAN-ID table.

The connection port table 340 is a table which shows, in every VLAN-ID, communication propriety of the VLAN between the connection ports connecting each switch. In the example of FIG. 5, information to show which connection port of which switch is connected to is shown longitudinally, and each VLAN-ID is shown laterally. In the connection port table 340 in FIG. 5, the state of possible communication is represented with "○", and the state of impossible communication is represented with "X". For example, in the connection port table 340 in FIG. 5, it is shown that, between the connection port 1/2 of the switch A and the connection port 1/2 of the switch C, the communication of VLAN-ID 10 is impossible, but the communication of VLAN-ID 20 is possible. The VLAN communication inspection table generating means 120 generates the connection port table 340 using the VLAN communication information and the switch connection constitution information of each switch. As follows, a generating procedure of the connection port table 340 will be described.

FIG. 8 is a flow chart showing an example of processing that the VLAN communication inspection table generating means 120 generates the connection port table 340. At first, the VLAN communication inspection table generating means 120 generates information to show which connection port of which switch is connected using the switch connection constitution information (step A1). The VLAN communication inspection table generating means 120 should extract respective switch connection constitution information every constitution number (see FIG. 4), and the information showing which connection port of which switch is connected should be described in the connection port table 340 based on the switch connection constitution information. For example, since the switch connection constitution information of the constitution number 1 in FIG. 4 "transmission source apparatus name=A, transmission source connection port=1/1, destination apparatus name=B, destination connection port=1/1" shows that the connection port 1/1 of the switch A is connected to the connection port 1/1 of the switch B, "A: 1/1-B: 1/1" is described as the first line of the connection port table 340 in FIG. 5. The VLAN communication inspection table generating means 120 repeats similar processing every individual switch connection constitution information. Note that, as shown in the connection port table 340 in FIG. 5, the VLAN communication inspection table generating means 120 may describe the information showing which connection port of which switch is connected (hereinafter, it is noted as adjacent port information) longitudinally.

Then, the VLAN communication inspection table generating means 120 extracts all VLAN-IDs registered to the VLAN-ID table 330 (step A2). For example, two kinds of VLAN numbers of "VLAN-ID=10, 20" are described in the VLAN-ID table 330 in FIG. 5. In this case, the VLAN communication inspection table generating means 120 describes "VLAN 10" and "VLAN 20" in the connection port table 340. Note that, the VLAN communication inspection table generating means 120 may arrange individual VLAN-ID laterally as shown in the connection port table 340 in FIG. 5.

In the following processing, information to show whether it is possible for communicating is associated with individual information showing which connection port of which switch is connected and individual VLAN-ID, and described.

After step A2, the VLAN communication inspection table generating means 120 extracts the VLAN-ID, which is to be set in two connection ports indicated by respective adjacent port information in every individual adjacent port information, front the VLAN communication information (step A3). For example, as for the adjacent port information of "A: 1/1-B: 1/1" in the connection port table 340 in FIG. 5, the VLAN-ID to be set in the connection port 1/1 of the switch A and the connection port 1/1 of the switch B is extracted from the VLAN communication information. For example, since the combination of the line beginning with "interface ethernet" and the line beginning with "bridge-group" in FIG. 3 establishes correspondency of the connection port and the VLAN-ID, a value following "bridge-group" should be extracted as the VLAN-ID. Herein, it is assumed that values of 10 and 20 are set in the connection port 1/1 of the switch A as the VLAN-ID, respectively, and values of 10 and 20 are also set in the connection port 1/1 of the switch B as the VLAN-ID, respectively.

After step A3, the VLAN communication inspection table generating means 120 selects one of extracted VLAN-ID in step A2 and judges whether the VLAN-ID is a VLAN-ID set commonly in the connection port of two switches described for adjacent port information (step A4). That is, it is judged whether a VLAN-ID selected from the VLAN-ID extracted in step A2 is extracted from the VLAN communication information of respective two switches in step A3. If the selected VLAN-ID is commonly set in the connection port of two switches described for adjacent port information, information showing that a packet having the selected VLAN-ID can be communicated (in this example, it is noted as "○") is associated with the adjacent port information and the selected VLAN-ID and described in the connection port table 340 (step A5). If the selected VLAN-ID is not commonly set in the connection port of two switches described for adjacent port information, information showing that a packet having the selected VLAN-ID cannot be communicated (in this example, it is noted as "X") is associated with the adjacent port information and the selected VLAN-ID and described in the connection port table 340 (step A6). The VLAN communication inspection table generating means 120 selects one VLAN-ID, and performs processing of step A4 and step A5 or A6 every adjacent port information.

The VLAN communication inspection table generating means 120 performs the processing from step A4 downward every all VLAN-ID extracted in step A2 (step A7).

For example, it is assumed that the VLAN-ID of 10 is selected. As for the adjacent port information of "A: 1/1-B: 1/1", it is assumed that the VLAN-IDs of 10 and 20 are extracted as the VLAN-ID set in the connection port 1/1 of the switch A, and the VLAN-IDs of 10 and 20 are extracted as the VLAN-ID set in the connection port 1/1 of the switch B. In this case, since the VLAN-ID "10" is included in the VLAN-ID extracted for "the connection port 1/1 of the switch A", also included in the VLAN-ID extracted for "the connection port 1/1 of the switch B", the VLAN communication inspection table generating means 120 describes "○" by associating it with the adjacent port information of "A: 1/1-B: 1/1" and the VLAN-ID "10". Similar processing is repeated for the other adjacent port information. Then, the other VLAN-ID (in this example, it is 20) is selected, and it is processed equally.

The redundant apparatus table 350 is a table showing the two switches making redundancy and master registration information of every VLAN-ID. That is, it is information to show apparatus names of two switches making redundancy and to indicate which of the two switches to be a master device. Depending on the function of the switch, a transferring apparatus of the packet can be specified by VLAN-ID unit. The redundant apparatus table 350 in FIG. 5 has the apparatus names of two switches making redundancy and the master registration information of every VLAN-ID. That is, a switch becoming a master device between two switches is described every VLAN-ID. For example, the first line of the redundant apparatus table 350 of FIG. 5 shows that "switches having apparatus names of B and C are redundant apparatuses a master device in VLAN-ID=10 is an apparatus B; and a master device in VLAN-ID=20 is an apparatus C". The VLAN communication inspection table generating means 120 generates the redundant apparatus table 350 using the VLAN communication information of each switch as follows.

The VLAN communication inspection table generating means 120 identifies a pair of two switches making redundancy based on the VLAN communication information of each switch, and extracts the apparatus names of the two switches. For example, the pair of two switches making redundancy should identify a pair of the VLAN communication information including the description showing making redundancy, and an apparatus name of the switch should be extracted from the VLAN communication information, respectively. For example, it is assumed that a description of "gsrp, numerical value" using common numerical value is included in each VLAN communication information of two switches, respectively. The VLAN communication inspection table generating means 120 retrieves such VLAN communication information, and extracts an apparatus name from each VLAN communication information. Further, the VLAN communication inspection table generating means 120 identifies a group number of the VLAN-ID every VLAN-ID to be set in each of two switches making redundancy. For example, a group number of the VLAN-ID "10" is specified to be 1 based on the description such as "vlan-group 1 vlan 10" in FIG. 3. This identification is conducted every VLAN-ID. Also, in the VLAN communication information of the two switches making redundancy, information showing the priority of the switch is associated with the group number. For example, in the VLAN communication information of two switches making redundancy, descriptions such as "vlan-group, group number, priority, numerical value" in FIG. 3 are included respectively, and the numerical value showing the priority is described every group. Here, a switch having a larger value described following "priority" becomes a master device. The VLAN communication inspection table generating means 120 compares the numerical values, which are described following "priority" in the group number identified every VLAN-ID, between the VLAN communication information of two switches; determines the switch having a larger value as a master device; associates the master device with the VLAN-ID; and describes it in the redundant apparatus table 350. For example, it is assumed that two switches of B and C make redundancy, and it is also assumed that "vlan-group 1 priority 120" is described in the VLAN communication information of the switch B and "vlan-group 1 priority 80" is described in the VLAN communication information of the switch C. Moreover, when it is further assumed that a group number of the VLAN-ID "10" is 1, the VLAN communication inspection table generating means 120 determines the switch B as a master device as for the VLAN-ID "10" and describes it like the redundant apparatus table 350 in FIG. 5.

If the VLAN communication inspection table generating means 120 specifies plural pairs of the VLAN communication information including the description showing making redundancy, the VLAN communication inspection table generating means 120 performs the above-described processing every each pair.

The VLAN communication inspection table generating means 120 stores the generated routing table 310, the subnet address table 320, the VLAN-ID table 330, the connection port table 340 and the redundant apparatus table 350 to the VLAN communication inspection table storage means 130. The VLAN communication inspection table generating means 120 generates the VLAN communication enabled/disabled hash table 360 shown in FIG. 5 using the VLAN-ID table 330, the connection port table 340 and the redundant apparatus table 350.

The VLAN communication enabled/disabled hash table 360 is a hash table that sets a pair of an apparatus name and a VLAN-ID as a key (hereinafter, it is referred to KEY) and sets the VLAN-ID of the other apparatuses that can communicate with the KEY as a value (hereinafter, it is referred to VALUE). The VLAN communication enabled/disabled hash table 360 includes information of a pair of an apparatus name and its VLAN-ID and also includes a VLAN-ID of the other apparatus that can communicate with the VLAN-ID of the apparatus. For example, in the first line of the KEY of the VLAN communication enabled/disabled hash table 360 in FIG. 5, there is a description of "A: 10", and this represents "VLAN-ID=10 set in an apparatus A". The VALUE of the VLAN communication enabled/disabled hash table 360 is similar expression. Thus, in the first line of the VLAN communication enabled/disabled hash table 360 in FIG. 5, it is shown that the switch A where the VLAN-ID "10" is set can communicate with the switch B where the VLAN-ID "10" is set. The VLAN communication enabled/disabled hash table 360 is used in an inspection of VLAN communication at the VLAN communication inspection means 140 of the VLAN communication inspection system 100. Hereinafter, a generating procedure of the VLAN communication enabled/disabled hash table 360 will be described.

FIG. 9 is a flow chart showing an example of processing for generating the VLAN communication enabled/disabled hash table 360 by the VLAN communication inspection table generating means 120. At first, the VLAN communication inspection table generating means 120 generates, using the VLAN-ID table 330, a pair of an apparatus name of a switch and a VLAN-ID, the pair will be a KEY in the VLAN communication enabled/disabled hash table 360; and enumerates the pairs as the KEY of the VLAN communication enabled/disabled hash table 360 (step B1). For example, according to the information that "VLAN-ID=10, 20 are set in the apparatus A" of the first line of the VLAN-ID table 330 in FIG. 5, a KEY of "A: 10" combining the apparatus A with the VLAN-ID "10" and a KEY of "A: 20" combining the apparatus A with the VLAN-ID "20" are generated and described in the VLAN communication enabled/disabled hash table 360 as the KEYs. The VLAN communication inspection table generating means 120 performs similar processing for all apparatuses (an apparatus name) described in the VLAN-ID table 330 and generates all KEYs of the VLAN communication enabled/disabled hash table 360.

Then, the VLAN communication inspection table generating means 120 selects one KEY where a value of VALUE is not identified from the VLAN communication enabled/disabled hash table 360 (step B2). In step B2, the VLAN communication inspection table generating means 120 calculates a hash value of the selected KEY. The hash function to calculate a hash value is not limited in particular.

Then the VLAN communication inspection table generating means 120 describes, using the connection port table 340, a VLAN-ID of an apparatus which can communicate with the value of KEY selected in B2 in the VLAN communication enabled/disabled hash table 360 as a VALUE corresponding to the selected KEY (step B3). The VLAN communication inspection table generating means 120 extracts adjacent port information including the apparatus name indicated by the KEY from the connection port table 340; and retrieves, from the extracted adjacency port information, the adjacent port information indicating possibility of communication in the VLAN-ID included in the selected KEY. And, among the apparatus names included in the adjacency port information, a pair of an apparatus name of a switch connected to the switch shown in the KEY and the VLAN-ID included in the KEY is described in the VLAN communication enabled/disabled hash table 360 as a VALUE which corresponds to the selected KEY. The VLAN communication inspection table generating means 120 identifies a memory region corresponding to a hash value of the selected KEY, and writes the VALUE at the memory region. If there exists plural pairs (VALUEs) of an apparatus name and a VLAN-ID, each VALUE is to be written.

For example, in step B2, it is assumed that "KEY=A: 10" is selected. In this case, using the connection port table 340, the VLAN communication inspection table generating means 120 retrieves a VLAN-ID of the other apparatus which can communicate with "A: 10". In the connection port table 340 in FIG. 5, descriptions of "A: 1/1-B: 1/1" and "A: 1/2-C: 1/2" are described as the adjacent port information including the apparatus name A in "A: 10". Referring to these adjacent port information and information associated with the VLAN-ID "10" (information showing the propriety of the communication), it is understood that the communication is possible for "A: 1/1-B: 1/1", but impossible for "A: 1/2-C: 1/2". The description of "B: 10" which is a pair of the apparatus name of B of the switch connecting to the switch A shown in the KEY among the apparatus names included in the adjacent port information judged to be possible to communicate, and the VLAN-ID "10" included in the selected KEY is described as a VALUE of "KEY=A: 10".

After step B3, the VLAN communication inspection table generating means 120 checks whether the apparatus represented by the KEY selected in step B2 is capable of routing and whether there is a subnet address corresponding to the VLAN-ID included in the KEY, using the routing table 310 and the subnet address table 320 (step B4). If "possible (information to mean that routing is possible)" is described by associating with the apparatus name included in the KEY selected in step S2 in the routing table 310, the VLAN communication inspection table generating means 120 judges that the switch is capable of routing. Also, if a subnet address is described by associating with the VLAN-ID included in the selected KEY in the subnet address table 320, it is judged that there is a subnet address that corresponds to the VLAN-ID included in the selected KEY.

For example, in a case of "KEY=A: 10", since it is found that the apparatus A is not capable of routing from the routing table 310 in FIG. 5, the processing of step B4 is finished and it shifts to step B6. Also, in a case of "KEY=B: 10", referring to the routing table 310 in FIG. 5, it is found that routing is possible. Furthermore, referring to the subnet address table 320 in FIG. 5, there exists a subnet address corresponding to the VLAN-ID=10. Therefore, the processing shifts to step B5.

When the apparatus represented by the selected KEY is capable of routing and there exists the subnet address corresponding to the VLAN-ID included in the KEY (Yes of step B5), the processing shifts to step B5, and otherwise (No of step B5) it shifts to step B6.

Then, when it is determined that the apparatus of the KEY is capable of routing and the subnet address corresponding to the VLAN-ID of the KEY exists (Yes of step B4), since routing between the VLANs is possible, the VLAN communication inspection table generating means 120 describes other VLAN-ID registered with the apparatus represented by the apparatus name included in the KEY in the VALUE (step B5). The VLAN-ID registered with the apparatus represented by the apparatus name included in the KEY is described in the VLAN-ID table 330 (see FIG. 5). A VALUE including the VLAN-ID that is not included in the KEY among the VLAN-IDs corresponding to the apparatus name included in the KEY in the VLAN-ID table 330 and its apparatus name is described in the VLAN communication enabled/disabled hash table 360 as a VALUE corresponding to the selected KEY. The VLAN communication inspection table generating means 120 identifies a memory region corresponding to a hash value of the selected KEY, and the VALUE should be written in at the memory region.

For example, when "KEY=B: 10" is selected, the VLAN-ID "20" corresponding to the apparatus name "B" is extracted from the VLAN-ID table 330 (see FIG. 5), and "B: 20" is added as the VALUE of "KEY=B: 10".

Finally, it is confirmed whether inspection is completed to all KEYs (i.e., all KEYs which are enumerated in step B1) of the VLAN communication enabled/disabled hash table 360 (step B6). If writing of VALUE to each KEY is completed (Yes of step B6), the generating processing of the VLAN communication enabled/disabled hash table 360 is finished. If there exists a KEY that is not selected (No of step B6), the processing shifts to step B2, and the processing from step B2 downward is repeated.

The routing table 310, the subnet address table 320, the VLAN-ID table 330, the connection port table 340, the redundant apparatus table 350 and the VLAN communication enabled/disabled hash table 360 that are generated by the VLAN communication inspection table generating means 120 are recorded in the VLAN communication inspection table storage device 130.

Then, an operation of the VLAN communication inspection means 140 will be described in detail. The VLAN communication inspection means 140 identifies a communication range and a communication path of the VLAN using the routing table 310, the subnet address table 320, the VLAN-ID table 330, the connection port table 340, the redundant apparatus table 350 and the VLAN communication enabled/disabled hash table 360, which are recorded in the VLAN communication inspection table storage device 130. The communication range and the communication path of the VLAN identified by the VLAN communication inspection means 140 are outputted through the output device 230. As follows, a processing procedure of the VLAN communication inspection means 140 will be described.

FIG. 10 and FIG. 11 are flow charts showing an example of processing for identifying the communication range and the communication path of the VLAN by the VLAN communication inspection means 140. At first, the network administrator or the designer inputs an apparatus name and a VLAN-ID to the VLAN communication inspection means 140 using an input device (not shown) provided with the VLAN communication inspection system 100. The VLAN communication inspection means 140 selects, by setting a pair of the inputted apparatus name and the VLAN-ID as a KEY, one non-selected VALUE corresponding to the KEY from the VLAN communication enabled/disabled hash table 360 (step C1). For example, it is assumed that the apparatus name "A" and the VLAN-ID "10" are inputted by the network administrator or the designer. Also, it is assumed that the VLAN communication enabled/disabled hash table 360 shown in FIG. 5 is generated. In this case, the VLAN communication inspection means 140 selects "VALUE=B: 10" that corresponds to "KEY=A: 10". The VALUE selected in step C1 is noted as a VALUE to be inspected. Also, a KEY corresponding to the VALUE to be inspected is noted as a KEY to be inspected. In the example above, "A: 10" is a KEY to be inspected, and "B: 10" is a VALUE to be inspected.

Also, when step C1 is performed first concerning one KEY, the VLAN communication inspection means 140 calculates a hash value of the KEY to be inspected by a hash function; reads all VALUEs that are recorded in the memory corresponding to the hash value; and selects a non-selected VALUE from the VALUEs. Note that, the hash function used herein is the same as the hash function that is used when the VLAN communication inspection table generating means 120 generates the VLAN communication enabled/disabled hash table 360.

Then, it is confirmed whether the VALUE to be inspected is a path which has been already passed once (step C2). The VLAN communication inspection means 140 saves a path, which can communicate with the apparatus having the VLAN-ID inputted by the network administrator, to a storage device such as a memory sequentially for every time the processing sifts to step C10. This path is represented as, for example, "A: 10→B: 10→B: 20→ . . . " by describing a pair of an apparatus name and a VLAN-ID sequentially. In step C2, if the VALUE to be inspected is already described in this communication path, it is judged to be a path being passed once, and it is judged to be a path being not yet passed if it is not described. When it is judged that the VALUE to be inspected exists on the path that the VALUE has already passed once (Yes of step C2), the processing shifts to step C12. Also, when it is judged that the VALUE to be inspected does not exist on the path that the VALUE has already passed once (No of step C2), the processing shifts to step C4. The processing of C2 is performed to consider the characteristic of the switch that a packet having the same VLAN-ID is not retransmitted to a transmission source apparatus.

Note that, when the network administrator inputs an apparatus name and a VLAN-ID, the VLAN communication inspection means 140 stores a combination of the apparatus name and the VLAN-ID to a storage device such as a memory as a start point of the communication path.

When the processing of step C1 is performed first and "VALUE=B: 10" is selected as in the case with the above, only the start point of "A: 10" is stored as communication path information. Therefore, it is determined that the VALUE to be inspected does not exists on the communication path, and the processing shifts to step C4. The communication path information is information describing sets of an apparatus name and a VLAN-ID sequentially to represent a communication path.

When it is judged that the VALUE to be inspected does not exists on the path where the VALUE has already passed once and the processing shifts to step C4, the VLAN communication inspection means 140 judges whether the KEY to be inspected is an apparatus capable of routing (step C4). The VLAN communication inspection means 140 refers to the routing table 310 stored in the VLAN communication inspection table storage device 130, and judges that the KEY is capable of routing if routing is "possible" for the apparatus name included in the KEY, and judges that the KEY is not capable of routing if routing is "impossible". When the KEY to be inspected is capable of routing (Yes of step C4), the processing shifts to step C5. On the other hand, when the KEY to be inspected is an apparatus that is impossible of routing (No of step C4), the processing shills to step C8. If the routing table 310 shown in FIG. 5 is generated and the KEY to be inspected is "A: 10", as "impossible" is described for the apparatus A, the processing shifts to step C8.

When it is determined that the KEY to be inspected is an apparatus capable of routing (Yes of step C4), the VLAN communication inspection means 140 judges whether the apparatus represented by the KEY to be inspected is either of a master device of the VLAN-ID indicated by the KEY or an apparatus not making redundancy (step C5). If the apparatus name included in the KEY to be inspected is described as an apparatus to be the master device of the VLAN-ID included in the KEY in the redundant apparatus table 350, the VLAN communication inspection means 140 judges that it is the master device of the VLAN-ID indicated by the KEY to be inspected. Also, if the apparatus name included in the KEY to be inspected is not described as an apparatus name of two apparatuses in a pair making redundancy in the redundant apparatus table 350, it is judged to be the apparatus not making redundancy. When the apparatus indicated by the KEY to be inspected is either of the master device of the VLAN-ID indicated by the KEY or the apparatus not making redundancy (Yes of step C5), the processing shifts to step C6.

On the other hand, when the apparatus indicated by the KEY to be inspected is neither the master device of the VLAN-ID indicated by the KEY nor the apparatus lot making redundancy (in other words, it is a backup device of the VLAN-ID: No of step C5), the processing shifts to step C7. For example, it is assumed that the redundant apparatus table 350 shown in FIG. 5 is generated, and the KEY to be inspected is "B: 10". In this case, since it is described that the switch B indicated by the KEY is the master device of the VLAN-ID "10" in the redundant apparatus table 350, the processing shifts to step C6.

When it is judged that the apparatus indicated by the KEY to be inspected is either of the master device of the VLAN-ID indicated by the KEY or the apparatus not making redundancy (Yes of step C5), it is judged whether a point corresponding to routing between the VLANs has already existed on the communication path in the course of searching a communication path (i.e., in the course of processing after firstly performed step C1) which starts, as a start point, with the apparatus name and the VLAN-ID inputted by the network administrator or the designer (step C6). The VLAN communication inspection means 140 refers to flag information representing whether the routing between the VLANs is carried out, and judges that the point corresponding to the routing between the VLANs has already existed on the communication path if the routing between the VLANs is performed. The initial state of the flag information is a state showing the routing between the VLANs not being carried out. When the VLAN communication inspection means 140) saves the communication path information sequentially, at the point where the VLAN-ID of the switch to be the communication path is changed, the flag information will be changed to the state showing the routing between the VLANs having been performed. Thus, changing the flag information will be written as setting flag hereinafter. For example, if the communication path information generated by the VLAN communication inspection means 140 is started with "A: 10" and completed with "D: 20" like "A: 10→B: 10→B: 20→D: 20", the routing between the VLANs occurs at "B: 20". Therefore, when the path from "B: 10" to "B: 20" is detected, the flag is set. Also, the flag information is maintained in a storage device such as a memory included in the VLAN communication inspection system 100. When it is determined that the routing between the VLANs is carried out with reference to the flag information (Yes of the step C6), the processing shifts to step C9. On the other hand, when it is determined that the routing between the VLANs is not carried out (No of the step C6), the processing shifts to step C8.

When the apparatus indicated by the KEY to be inspected is neither a master device of the VLAN-ID indicated by the KEY nor an apparatus not making redundancy (No of step C5), the VLAN communication inspection means 140 judges whether the VALUE to be inspected is either of a master device of the VLAN-ID of the KEY to be inspected or an apparatus not making redundancy (step C7). If the apparatus name included in the VALUE to be inspected is described as an apparatus to be a master device of the VLAN-ID included in the KEY to be inspected in the redundant apparatus table 350, the VALUE to be inspected is judged to be a master device of the VLAN-ID of the KEY to be inspected. Also, if the apparatus name included in the VALUE to be inspected is not described as an apparatus name of two apparatuses in a pair making redundancy in the redundant apparatus table 350, it is judged to be an apparatus not making redundancy. When the VALUE to be inspected is either of the master device of the VLAN-ID of the KEY to be inspected or the apparatus not making redundancy (Yes of step C7), the processing shifts to step C10. When the VALUE to be inspected is neither the master device of the VLAN-ID of the KEY to be inspected nor the apparatus not making redundancy (in other words, it is a backup device of the VLAN-ID: No of step C7), the processing shifts to step C12. For example, it is assumed that the KEY to be inspected is "B: 20" and the VALUE to be inspected is "C: 20" in the VLAN communication enabled/disabled hash table 360 in FIG. 5. Also, it is assumed that the redundant apparatus table 350 shown in FIG. 5 is generated. In this case, since the switch C is the master device of the VLAN-ID "20", the processing shifts to step C10.

Then, if the KEY to be inspected is judged to be the apparatus which is impossible of routing (No of step C4), or if it is judged that the routing between the VLANs is not performed (No of the step C6), the VLAN communication inspection means 140 judges whether the VALUE to be inspected exhibits an apparatus making redundancy (step C8). If the apparatus name included in the VALUE to be inspected is described as an apparatus name of two apparatuses in a pair making redundancy in the redundant apparatus table 350, the VLAN communication inspection means 140 judges it to be an apparatus making redundancy. Also, if the apparatus name included in the VALUE to be inspected is not described as an apparatus name of two apparatuses in a pair making redundancy in the redundant apparatus table 350, it is judged to be an apparatus not making redundancy. When the VALUE to be inspected exhibits an apparatus making redundancy (Yes of step C8), the processing shifts to step C11. When the VALUE to be inspected does not exhibit an apparatus making redundancy (No of step C8), the processing shifts to step C10. For example, in the VLAN communication enabled/disabled hash table 360 shown in FIG. 5, it is assumed that the VALUE to be inspected is "B: 10". Also, it is assumed that the redundant apparatus table 350 in FIG. 5 is generated. Because the apparatus names of the switches B and C are described as apparatus names of an apparatus making redundancy in the redundant apparatus table 350 in FIG. 5, the processing shifts to step C11.

When it is determined that the routing between the VLANs is carried out (Yes of step C6), the VLAN communication inspection means 140 judges whether the VLAN-ID of the VALUE to be inspected is the same as the VLAN-ID of the KEY to be inspected (step C9). When the VLAN-ID of the VALUE to be inspected is the same as the VLAN-ID of the KEY to be inspected (Yes of step C9), the processing shifts to step C10. On the other hand, when the VLAN-ID of the VALUE to be inspected is different from the VLAN-ID of the KEY to be inspected (No of step C9), the processing shifts to step C12. For example, in the VLAN communication enabled/disabled hash table 360 in FIG. 5, when it is assumed that the KEY to be inspected is "A: 10" and the VALUE to be inspected is "B: 10", the processing shifts to step C10 because both VLAN-IDs are the same.

When it is judged to be Yes in step C7 (when the VALUE to be inspected is either of the master device of the VLAN-ID of the KEY to be inspected or the apparatus not making redundancy), or when it is judged to be No in step C8 (when the VALUE to be inspected does not exhibit an apparatus making redundancy), or when it is judged to be Yes in step C9 (when the VLAN-ID of the VALUE to be inspected is the same as the VLAN-ID of the KEY to be inspected), the VLAN communication inspection means 140 judges that the VALUE to be inspected is possible of communicating and adds the VALUE to be inspected to the communication path to save it (step C10). Just before the step C10, the KEY to be inspected is described in the tail of the communication path; therefore, a path from the KEY to be inspected to the VALUE to be inspected is added as a path possible for communication. For example, the VALUE to be inspected (here, it is B: 10) is added to the communication path of the KEY to be inspected (A: 10) as "... →A: 10→B: 10" to update the communication path.

Also, when it is determined that the VALUE to be inspected is a master device in step C11, the processing of step C10 is performed.

Furthermore, when the routing between the VLANs occurs in the VALUE to be inspected, the VLAN communication inspection means 140 sets flag information in step C10. That is, when the apparatus names are the same among the KEY to be inspected and the VALUE to be inspected but the VLAN-IDs are different each other, and when the processing shifts to step C10, the VLAN communication inspection means 140 sets flag information. As in the case with the above, when the KEY to be inspected is "A: 10"; the VALUE to be inspected is "B: 10"; and the processing shifts to step C10, flag information is not set because the routing between the VLANs does not occur.

Then, when it is judged to be Yes in step C8 (when the VALUE to be inspected exhibits an apparatus making redundancy), the VLAN communication inspection means 140 determines whether the VALUE to be inspected is a master device (step C11). If the apparatus name included in the VALUE to be inspected is described as an apparatus to be a master device of the VLAN-ID included in the KEY to be inspected in the redundant apparatus table 350, the VALUE to be inspected is judged to be a master device of the VLAN-ID of the KEY to be inspected. It is judged to be a backup device rather than a master device without such a description in the redundant apparatus table 350. When the VALUE to be inspected is a master device (Yes of step C11), the processing shifts to step C10.

On the other hand, when the VALUE to be inspected is a backup device (No of step C11), the processing shifts to step C12. For example, if the KEY to be inspected is "A: 20"; the VALUE to be inspected is "C: 20"; and the redundant apparatus table 350 in FIG. 5 is generated, the processing shifts to step C10 because the apparatus C is the master device of the VLAN-ID "20".

In step C12, the VLAN communication inspection means 140 determines, for all values of the VALUEs to the KEY to be inspected, whether selection is completed (step C12). That is, the VLAN communication inspection means 140 determines whether the processing from step C1 downward is performed. When it is determined that the selection for all values of the VALUEs to the KEY to be inspected is completed, the processing to the KEY to be inspected is completed; and, by setting each VALUE capable of communicating with the KEY to be inspected as a KEY to be inspected, the processing from step C1 downward is repeated to the each KEY. For example, it is assumed that the KEY to be inspected is "B: 10" and communication to "D: 10" and "B: 20" among the VALUEs of the KEY is possible. Then, using "D: 10" and "B: 20" as the KEYs to be inspected, the processing from step C1 downward is repeated. If a VALUE that can communicate does not exist among the VALUEs to be inspected, the processing finishes because the communication path is to be finished in the KEY corresponding to the VALUE.

Also, if a non-selected VALUE exists among the VALUEs to the KEY to be inspected in step C12, the processing shifts to step C1, and one of the non-selected VALUEs is selected, and the processing from step C1 downward is repeated.

After having generated the communication path, the VLAN communication inspection means 140 makes the output device 230 output the communication path. For example, the VLAN communication inspection means 140 makes the output device 230 which is a display unit display the communication path such as "A: 10→B: 10→ ... ".

Then an example of a series of processing of the VLAN communication inspection means 140 is shown. FIGS. 12 and 13 are illustrations showing examples of the processing for specifying a communication range and a communication path of the VLAN by the VLAN communication inspection means 140, and the tables in FIG. 12 (a) to FIG. 13 (g) show a process to check the communication range and the communication path starting from "VLAN-ID=10 of the apparatus A" when "VLAN-ID=10 of the apparatus A" is designated by the network administrator. Note that, the example will be described with a case that the VLAN communication enabled/disabled hash table 360 in FIG. 5 is generated. In FIGS. 12 and 13, it is shown in halftone dot meshing about the KEY and VALUE that completed the processing from step C1 downward. Also, the KEY and VALUE existing on the communication path are enclosed with a circle.

Also, FIG. 14 is an illustration showing an example of the result of the communication range and the communication path of the VLAN specified by the VLAN communication inspection means 140.

When "VLAN-ID=10 of the apparatus A" is designated by the network administrator, the VLAN communication inspection means 140 performs the processing from step C1 downward shown in FIGS. 10 and 11 with "A: 10" as a KEY to be inspected (see FIG. 12 (a)). In this example, the processing shifts to step C10, it is judged that the communication from "A: 10" to the VALUE "B: 10" is possible and a result of "A: 10→B: 10" is held as the communication path information.

Then, after all VALUEs to the KEY "A: 10" (in this example, it is B: 10 only) are processed, the processing from step C1 downward is performed with "B: 10" that is judged to be capable of communicating as a KEY to be inspected (see FIG. 12 (b)). In this example, when "D: 10" and "B: 20" are selected, the processing shifts to step C10 and it is determined that communication from the KEY "B: 10" to its VALUE is possible. Accordingly, the VLAN communication inspection means 140 generates communication path information in which the VALUE determined that communication is possible is added to the communication path information having the KEY at its tail. The VLAN communication inspection means 140 holds the communication path information for every VALUE. In this example, as the communication path information, the results of "A: 10→B: 10→D: 10" and "A: 10→B: 10→B: 20" are held.

Then, after all VALUEs to the KEY "B: 10" are processed, the processing from step C1 downward is performed with "D: 10" that is judged to be capable of communicating as a KEY to be inspected (see FIG. 12 (c)). There has already existed "B: 10" that is the VALUE of the KEY "D: 10" on the communication path (it is the switch which has been already passed), therefore, the communication beyond "D: 10" is not performed. Thus, the processing in respect of the communication path of "A: 10→B: 10→D: 10" is completed.

Similarly, the processing from step C1 downward is performed with "B: 20" that is judged to be capable of communicating as a KEY to be inspected (see FIG. 12 (d)). In this example, when "C: 20" is selected, the processing shifts to step C10 and it is determined that communication from the KEY "B: 20" to its VALUE "C: 20" is possible. Thus, "C: 20" is added to the communication path information of "A: 10→B: 10→B: 20", and the results of "A: 10→B: 10→D: 10" and "A: 10→B: 10→B: 20→C: 20" are held as the communication path information.

Then, after all VALUEs to the KEY "B: 20" are processed, the processing from step C1 downward is performed with "C: 20" that is judged to be capable of communicating as a KEY to be inspected (see FIG. 13 (e)). In this example, when "A: 20" and "D: 20" are selected, the processing shifts to step C10 and it is determined that communication from the KEY "C: 20" to its VALUE is possible. Thus, communication path information in which the VALUE determined that communication is possible is added to "A: 10→B: 10→B: 20→C: 20" is generated and held for every VALUE. At the end of this processing, as the communication path information, the results of "A: 10→B: 10→D: 10", "A: 10→B: 10→B: 20→C: 20→A: 20" and "A: 10→B: 10→B: 20→C: 20→D: 20" are held.

Then, after all VALUEs to the KEY "C: 20" are processed, the processing from step C1 downward is performed with "A: 20" that is judged to be capable of communicating as a KEY to be inspected (see FIG. 13 (f)). When a VALUE of the KEY "A: 20" is selected, the processing does not shift to step C10. Therefore, the processing in respect of the path of "A: 10→B: 10→B: 20→C: 20→A: 20" is completed.

Similarly, the processing from step C1 downward is performed with "D: 20" that is judged to be capable of communicating as a KEY to be inspected (see FIG. 13 (g)). When a VALUE of the KEY "D: 20" is selected, the processing does not shift to step C10. Therefore, the processing in respect of the path of "A: 10→B: 10→B: 20→C: 20→D: 20" is also completed.

As a result of the processing such as the above, the respective communication path information showing the VLAN-ID of the apparatus and its communication order is stored. The VLAN communication inspection means 140 makes the output device 230 output each generated communication path information. In this example, as illustrated in FIG. 14. "A: 10→B: 10→D: 10". "A: 10→B: 10→B: 20→C: 20→A: 20" and "A: 10→B: 10→B: 20→C: 20→D: 20" are outputted.

Note that, an exemplary aspect of outputting each communication path includes an exemplary aspect of making a display unit display, however, the communication path information may be outputted as a file. Also, it may make the screen display a figure of network constitution that expresses the communication range and the communication path visually.

For example, the output device 230 outputs an inspection result of the VLAN communication inspection means 140 using a display unit or the like. Here, with regard to an output form of the inspection result, it may be displayed in a result display screen mounted on a system of the present invention, and it may be outputted as a file.

Also, a screen displaying a figure of network constitution that expresses the communication range and the communication path visually may be outputted based on the output result of the VLAN communication inspection means 140. FIG. 15 is an example of such a screen. With reference to the switch connection constitution information in FIG. 4, the VLAN communication inspection means 140 makes a device display a block diagram showing the respective apparatus name, which is shown to be connected in the switch connection constitution information, as shown in FIG. 5. Further, a connection port shown to be connected to every block showing the apparatus name in the switch connection constitution information is displayed around the block. And, an image showing that the connection ports shown to be connected in the switch connection constitution information are joined by a line is displayed. Furthermore, the VLAN communication inspection means 140 makes the device display an arrow pointing toward the apparatus name in order of the path indicated by the communication path information. As a result, the screen shown in FIG. 15 is displayed.

Next, effects of the first exemplary embodiment of the present invention will be described. According to the first exemplary embodiment of the present invention, in managing VLAN setting of the network, it is possible to check easily a communication range and a communication path of every VLAN in a network having a plurality of communication paths because of a redundant switch configuration. That is, when a network administrator designates an apparatus name and a VLAN-ID, it is possible to check which apparatus the apparatus having the VLAN-ID can communicate to, and it is also possible to check which path is used for enabling communication. The reason is because, the forwarding address of the packet can be identified using the VLAN communication enabled/disabled hash table 360 by checking the VLAN of the destination switch that can communicate with the VLAN of the transmission source switch based on the characteristic of packet transferring of the redundancy apparatus; and the order of the apparatuses which transfer a packet can be known by repeating inspection while discovering the forwarding address apparatus of the packet, thereby a communication range and a communication path to the VLAN of an arbitrary switch can be identified. Accordingly, through the whole network to be inspected, correctness in the config setting of the VLAN communication can be confirmed easily. That is, it can be ensured easily whether the result obtained through the network administrator specifies an apparatus name and a VLAN-ID agrees with the result that the network administrator assumes.

Second Exemplary Embodiment

A constitution of a second exemplary embodiment of the present invention is a constitution exemplified in FIG. 1 as well as the constitution of the first exemplary embodiment, and the second exemplary embodiment will be described with reference to FIG. 1 as follows. However, the VLAN communication inspection means 140 further performs other processing as well as the processing described in the first exemplary embodiment. The operations of the other constituent components are similar to those of the first exemplary embodiment. Therefore, an explanation is omitted.

In the second exemplary embodiment, processing shown in FIGS. 16 and 17 is added to the course of the processing described in the first exemplary embodiment (processing shown in FIGS. 10 and 11). The processing shown in FIGS. 16 and 17 is processing that is added to specify a communication range and a communication path of the VLAN when a failure occurs on any switch on the network (processing of VLAN communication inspection for a case of a failure occurring).

In the above-mentioned first exemplary embodiment, it is premised that all switches on the network operate normally. In the second exemplary embodiment, by adding the processing of VLAN communication inspection for a case of a failure occurring, a communication range and a communication path of the VLAN can be known when a failure occurs on an arbitrary switch. Accordingly, the result can be utilized for a simulation assuming a packet transmission test at the network construction.

The VLAN communication inspection system 100 of the second exemplary embodiment also comprises an input device (not shown) to which an apparatus name and a VLAN-ID are inputted by a network administrator or a designer. And, the VLAN communication inspection means 140 identifies a communication available range from a switch having the VLAN-ID inputted by the input device (not shown). Also, an apparatus name of a switch supposed to have a failure is inputted to the VLAN communication inspection means 140 through the input device (not shown). However, an apparatus name of a switch supposed to have a failure may not be inputted. When the apparatus name of the switch supposed to have a failure is inputted through the input device, the VLAN communication inspection means 140 stores the apparatus name to a storage device included in the VLAN communication inspection system 100 (for example, the VLAN communication inspection table storage device 130).

Then, an operation of the VLAN communication inspection means 140 will be described. The VLAN communication inspection means 140 performs, in the course of the processing described in the first exemplary embodiment (processing shown in FIGS. 10 and 11), the VLAN communication inspection processing for a case of a failure occurring. The processing described in the first exemplary embodiment will be omitted. FIG. 16 and FIG. 17 are illustrations showing examples of the VLAN communication inspection processing for a case of a failure occurring.

At first, after a KEY (a combination of an apparatus name and a VLAN-ID) to be a start point of a communication path is designated by the network administrator, the VLAN communication inspection means 140 selects one value of a non-inspected VALUE from the VLAN communication enabled/disabled hash table 360 (step C1, see FIG. 10) as described in the first exemplary embodiment. After step C1, the VLAN communication inspection means 140 determines whether a failure occurring switch is specified or not (step D0, see FIG. 16). The failure occurring switch is a switch supposed to have a failure by a network administrator or a designer. When an apparatus name of the failure occurring switch is stored in a storage device (for example, the VLAN communication inspection table storage device 130), the VLAN communication inspection means 140 judges that the failure occurring switch is specified; and if an apparatus name of the failure occurring switch is not stored, the VLAN communication inspection means 140 judges that the failure occurring switch is not specified. When the failure occurring switch is not specified (No of step D0), the processing shifts to step C2 (see FIG. 10).

Note that, the number of apparatus names inputted and stored as an apparatus name of the failure occurring switch may not be limited to one, and may be plural.

When the failure occurring switch is specified (Yes of step C0), the VLAN communication inspection means 140 determines whether the VALUE to be inspected selected in step C1 is the failure occurring switch (step D1). That is, it is judged whether the apparatus name included in the VALUE to be inspected is the same as the apparatus name stored as the apparatus name of the failure occurring switch. When the VALUE to be inspected is the failure occurring switch (Yes of step D1), communication to the VALUE to be inspected cannot be performed. Accordingly, the processing shifts to step C12 shown in FIG. 11. Also, when the VALUE to be inspected is not the failure occurring switch, the processing shifts to step C2 shown in FIG. 10.

When it is judged to be Yes in step C8, it is determined whether a failure occurring switch is specified (step E0, see FIG. 17). The processing of step E0 is similar to the processing of step D0. When a failure occurring switch is not specified (No of step E0), the processing shifts to step E2. When a failure occurring switch is specified (Yes of step E0), the VLAN communication inspection means 140 confirms whether other apparatus making redundancy in combination with the apparatus of the VALUE to be inspected is the failure occurring switch specified by the network administrator or the designer (step E1). That is, among the apparatus names of two switches of a pair making redundancy described in the redundant apparatus table 350, it is judged whether the apparatus name that is not the apparatus name of the VALUE to be inspected agrees with the apparatus name of the failure occurring switch. When the other apparatus making redundancy in combination with the apparatus of the VALUE to be inspected is a failure occurring apparatus (Yes of step E1), the apparatus of the VALUE to be inspected is to communicate instead of the failure occurring switch. Therefore, the processing shifts to step C10 (see FIG. 11). Also, the other apparatus making redundancy in combination with the apparatus of the VALUE to be inspected is not a failure occurring apparatus, the VLAN communication inspection means 140 judges whether the VALUE to be inspected is a master device or not (step E2). The judgment of step E2 is conducted like step C11.

When the apparatus of the VALUE to be inspected is a master device (Yes of step E2), a packet is transferred through the apparatus of the VALUE to be inspected. Accordingly, the processing shifts to step C10 shown in FIG. 11. On the other hand, when the apparatus of the VALUE to be inspected is a backup device (No of step E2), the apparatus of the VALUE to be inspected is impossible of communication. Thus, the processing shifts to step C12 shown in FIG. 11.

Also, when a failure occurring switch is not specified, the processing is conducted similarly to the processing of the first exemplary embodiment. Therefore, an operation in a case that a failure occurring switch is not specified is similar to the operation of the first exemplary embodiment.

Then an example of a series of processing of the VLAN communication inspection means 140 of the second exemplary embodiment is shown.

Figure 18:
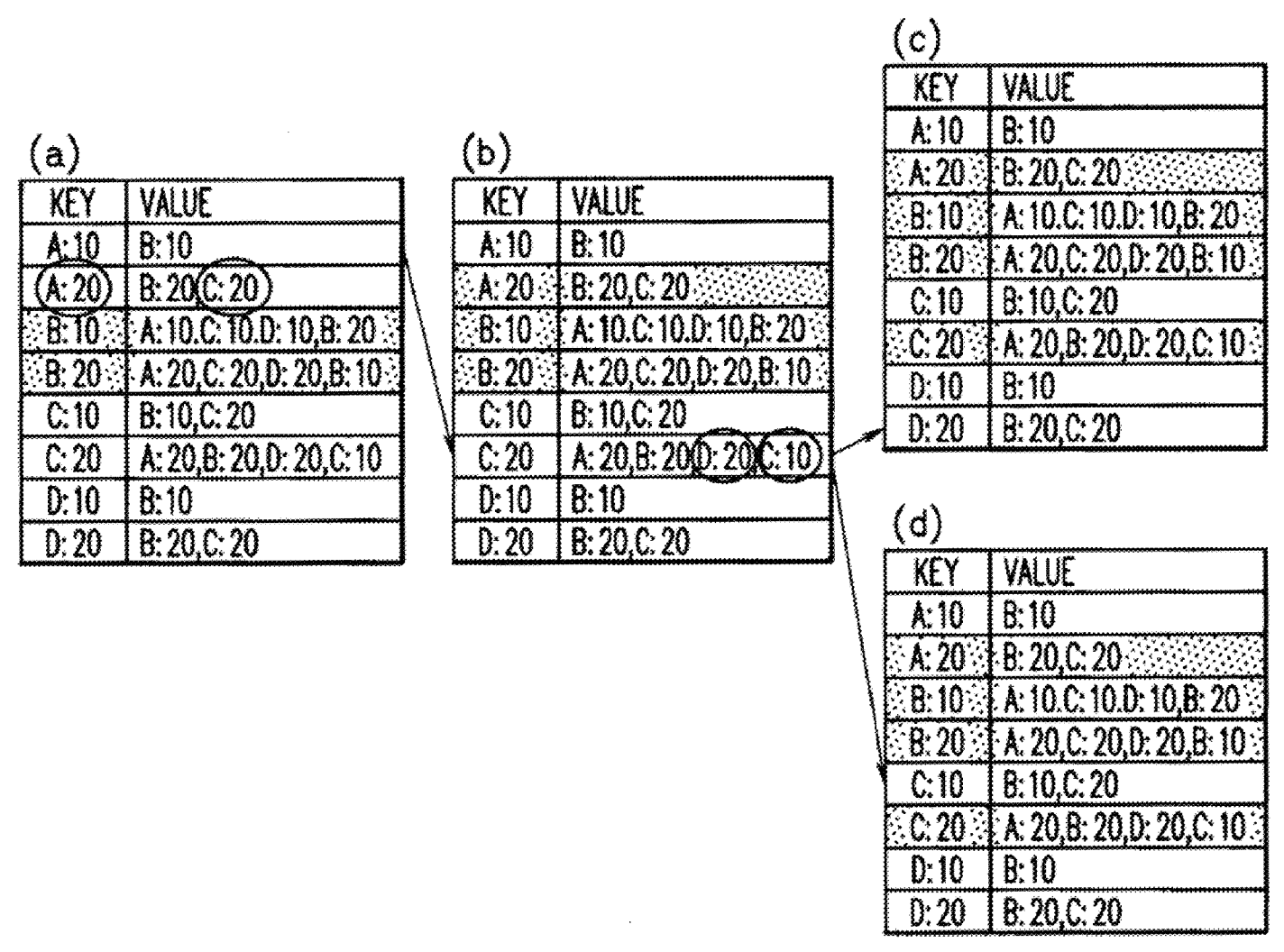

FIG. 18 is an illustration showing an example of the processing for specifying a communication range and a communication path. Each table of FIG. 18 (a) to FIG. 18 (d) shows the course to check the communication range and the communication path having a start point of "VLAN-ID=20 of the apparatus A" when "VLAN-ID=20 of the apparatus A" is specified by the network administrator. Also, in this example, it is exemplarily described with a case that "B" is inputted as an apparatus name of the failure occurring switch. Plural failure occurring switches may be specified as had already described. In FIG. 12, KEYs including "B" specified as the failure occurring switch and VALUES of the KEYs are shown in halftone dot meshing. Also, it is also shown in halftone dot meshing about the KEY and VALUE that completed the processing from step C1 downward. Further, the KEY and VALUE existing on the communication path are enclosed with a circle.

FIG. 19 is an illustration showing an example of the result of the communication range and the communication path of the VLAN specified by the VLAN communication inspection means 140.

When "VLAN-ID=20 of the apparatus A" is specified by the network administrator, the VLAN communication inspection means 140 performs the processing from step C1 downward (processing shown in FIGS. 10, 11, 16 and 17) and 11 with "A: 20" as a KEY to be inspected (see FIG. 18 (a)). In this example, "B: 20" exists as a VALUE for "A: 20", but the switch B is the failure occurring switch. Therefore, when "B: 20" is selected, the processing does not shift to step C10. Also, if "C: 20" is selected as the VALUE, the processing shifts to step C10 and it is determined that communication is possible from "A: 20" to "C: 20". Thus, a result of "A: 20→C: 20" is held.

Then, the processing from step C1 downward (processing shown in FIGS. 10, 11, 16 and 17) is performed with "C: 20" that is judged to be capable of communicating as a KEY to be inspected (see FIG. 18 (b)).

In this example, "B: 20" exists as a VALUE for "C: 20", but the switch B is the failure occurring switch. Therefore, when "B: 20" is selected, the processing does not shift to step C10. In this example, when "D: 20" and "C: 10" are selected, the processing shifts to step C10 and it is determined that communication from "C: 20" to the VALUE is possible. Accordingly, the VLAN communication inspection means 140 generates communication path information in which the VALUE determined that communication is possible is added to the communication path information having the KEY at its tail. The VLAN communication inspection means 140 holds the communication path information for every VALUE. In this example, as the communication path information, the results of "A: 20→C: 20→D: 20" and "A: 20→, C: 20→C: 10" are held.

Then, after all VALUEs to the KEY "C: 20" are processed, the processing from step C1 downward (processing shown in FIGS. 10, 11, 16 and 17) is performed with "D: 20" that is judged to be capable of communicating as a KEY to be inspected (see FIG. 18 (c)). There has already existed "B: 20" as the VALUE to the KEY, however, when "B: 20" is selected, the processing does not shift to step C10 as described above. Also, when other VALUE to "D: 20" is selected, the processing does not shift to step C10. Thus, the processing in respect of the communication path of "A: 20→, C: 20→D: 20" is completed.

Similarly, the processing from step C1 downward (processing shown in FIGS. 10, 11, 16 and 17) is performed with "C: 10" that is judged to be capable of communicating as a KEY to be inspected (see FIG. 18 (d)). Even in this case, when every VALUE to the KEY "C: 10" is selected, the processing does not shift to step C10. Thus, the processing in respect of the communication path of "A: 20→C: 20→C: 10" is completed.

Then, the VLAN communication inspection means 140 makes the output device 230 output each generated communication path information (see FIG. 19).

Next, effects of the second exemplary embodiment of the present invention will be described. According to the second exemplary embodiment of the present invention, in managing VLAN setting of the network, it is possible to check easily a communication range and a communication path of the VLAN on the supposition that a failure occurs on the switch on the network. The reason is because, when the VLAN of the destination switch that can communicate with the VLAN of the transmission source switch is checked using the VLAN communication enabled/disabled hash table 360, the processing (FIG. 16 and FIG. 17) to prevent the failure occurring switch from being included in the communication path is also performed. Accordingly, through the whole network to be inspected, correctness in the config setting on the supposition that a failure occurs in the switch on the network can be confirmed easily. It can be ensured easily whether the result obtained through the network administrator specifies a failure occurring switch or a start point of communication agrees with the result that the network administrator assumes.

Third Exemplary Embodiment

FIG. 20 is a block diagram showing a constitution example of a third exemplary embodiment of the present invention. An explanation about constituent components similar to those of the first exemplary embodiment is omitted with reference to symbols that are the same as those in FIG. 1. The VLAN communication inspection system 100 of the third exemplary embodiment further comprises connection port information acquisition means 410, a connection port information storage device 420 and connection port identification means 430 as well as the VLAN communication information storage device 110, the VLAN communication inspection table generating means 120, the VLAN communication inspection table storage device 130, and the VLAN communication inspection means 140.

The connection port information acquisition means 410 extracts a VLAN-ID to be set in the connection port of each switch using the VLAN communication information memorized to the VLAN communication information storage device 110, generates information showing the VLAN-ID being set every each connection port of each switch (a connection port list table), and stores the information to the connection port information storage device 420. The connection port information storage device 420 is a storage device storing the connection port list table. It is described later about the connection port list table in detail. Note that, the connection port information storage device 420 and the VLAN communication inspection table storage device 130 may be realized by the same storage device.

The connection port identification means 430 identifies a connection port of the switch that can communicate from the specified switch by use of a connection port list table stored in the connection port information storage device 420 and a result of the VLAN communication inspection means 140 (i.e., communication path information such as "A: 10→B: 10→, . . . "). And, the connection port identification means 430 makes the output means 230 output each identified connection port.

For example, the connection port information acquisition means 410 and the connection port identification means 430 are realized by a CPU operated by a program. The VLAN communication inspection table generating means 120, the VLAN communication inspection means 140, the connection port information acquisition means 410 and the connection port identification means 430 may be realized by the same CPU. For example, the program is stored in a program storage device (not shown) included in the VLAN communication inspection system 100 as described in the first exemplary embodiment. The CPU reads the program, and, according to the program, operates as the VLAN communication inspection table generating means 120, the VLAN communication inspection means 140, the connection port information acquisition means 410 and the connection port identification means 430.

Then, an operation of the third exemplary embodiment will be described.

At first, a connection port list table generated by the connection port information acquisition means 410 and an operation of the connection port information acquisition means 410 are described. FIG. 21 is an illustration showing an example of the connection port list table. The connection port list table is information showing a VLAN-ID set in every connection port of each switch. A connection port list table 440 generated by the connection port information acquisition means 410 is recorded to the connection port information storage device 420. Here, an execution timing of operation that the connection port information acquisition means 410 generates the connection port list table 440 and the connection port information storage device 420 stores the connection port list table 440 may be set prior to or after an execution timing of operation that the VLAN communication inspection table generating means 120 generates the VLAN communication enabled/disabled hash table 360 and the VLAN communication inspection table storage device 130 stores the VLAN communication enabled/disabled hash table 360. Hereinafter, the connection port list table 440 will be described in detail.

As shown in FIG. 21, the connection port list table 440 is generated by use of the VLAN communication information of each switch, and it has the VLAN-ID to be set in the connection port of each switch. In the connection port list table 440, the connection port of each switch is associated with the VLAN-ID set in the connection port. Herein, the connection port of each switch is noted as "apparatus name: slot number/ connection port number". The slot is a board of the switch mounting the plural connection ports. For example: the first line of the connection port list table 440 of FIG. 21 represents that "VLAN-ID=10, 20 are set in the connection port 1/1 of the apparatus A". The VLAN communication inspection table generating means 120 may include the connection port information acquisition means 410.

The connection port information acquisition means 410 generates the connection port list table 440 as described below. At first, the connection port information acquisition means 410 extracts, from the VLAN communication information, a command to set the VLAN-ID in the connection port of the switch. Because this command is described in a predetermined description form with a predetermined character string, the connection port information acquisition means 410 should extract the command of the predetermined description form including the predetermined character string. For example, an example of such a command includes "set VLAN portbase 1/1 10" (see FIG. 2). This command means that "VLAN-ID=10 is set in the connection port 1/1". The connection port information acquisition means 410 extracts, from such a command included in the VLAN communication information, a connection port (in the example, it is 1/1) and a VLAN-ID (in the example, it is 10). Further, the connection port information acquisition means 410 extracts an apparatus name from the VLAN communication information of the switch, which is the same with the VLAN communication information from which the command is extracted, and generates a character string by combining the apparatus name and the connection port (apparatus name: slot number/connection port number). Then, the character string is associated with the extracted VLAN-ID and described in the connection port list table 440. The connection port information acquisition means 410 performs the above-described processing until all commands to set the VLAN-ID in the connection port of the switch are extracted from the VLAN communication information.

Next, an operation of the connection port identification means 430 will be described. The connection port identification means 430 identifies the connection port (the connection port which can communicate) of all switches within the communication range of the VLAN from the switch designated by the network administrator, using the connection port list table 440 stored in the connection port information storage device 420 and a communication range result of the VLAN outputted by the VLAN communication inspection means 140. The connection port identification means 430 makes the output device 230 output the identified connection port. As for the VLAN communication inspection means 140, similarly to the first exemplary embodiment, a switch to be a start point is designated according to a combination of the VLAN-ID and the apparatus name by the network administrator. And, the communication path starting from the switch is specified similarly to the first exemplary embodiment. Then, the connection port identification means 430 identifies the connection port of all switches within the communication range of the VLAN.

FIG. 22 is a flow chart showing an example of processing that the connection port identification means 430 identifies the connection port of all switches within the communication range of the VLAN. At first, the connection port identification means 430 selects, among the communication range result of the VLAN (i.e., the communication path information) generated by the VLAN communication inspection means 140, one VLAN-ID (a set of an apparatus name and a VLAN-ID) of any apparatus (step F1). For example, when the communication path information as shown in FIG. 14 is generated. "A: 10" or the like is selected. Herein, a case of selecting "A: 10" will be exemplarily described.

Subsequently, the connection port identification means 430 extracts, from the connection port list table 440 stored to the connection port information storage device 420, all connection ports in which the VLAN-ID of the apparatus selected in step F1 is set (step F2). For example, the connection port identification means 430 extracts the connection ports of the switch of the apparatus name, the apparatus name is included in the set of the apparatus name and the VLAN-ID selected in step F1. Then, the connection port identification means 430 further extracts, from the connection ports, the connection port in which the VLAN-ID is set, the VLAN-ID is included in the set of the apparatus name and the VLAN-ID selected in step F1. For example, it is assumed that the connection port list table 440 in FIG. 21 is generated, and "A: 10" is selected in step F1. When the connection port corresponding to the apparatus name A (i.e., the connection port of the switch of the apparatus name A) is extracted, the connection ports of "A: 1/1", "A: 1/2", and "A: 1/3" described in the first line to third line shown in FIG. 21 are extracted. Furthermore, when the connection port in which the VLAN-ID "10" is set is extracted from them, the connection ports of "A: 1/1" and "A: 1/2" of the first and second lines shown in FIG. 21 are extracted.

After step F2, the connection port identification means 430 confirms whether inspection to the all communication range result of the VLAN of the communication inspection means 140 is completed (step F3). That is, it is determined whether all sets of the apparatus name and the VLAN-ID are selected from the communication path information generated by the VLAN communication inspection means 140. If an unselected set of the apparatus name and the VLAN-ID remains in the communication path information (No of the step F3), the processing shifts to step F1 and the processing from step F1 downward is repeated. If all sets of the apparatus name and the VLAN-ID included in the communication path information are selected (Yes of the step F3), the processing is repeated.

The group of connection ports extracted in step F2 before completing the above-mentioned processing is the connection port capable of communicating of all switches within the communication range of the VLAN. The connection port identification means 430 makes the output device 230 output this group of connection ports. For example, a group of character strings such as "A: 1/1" representing the connection port is displayed on the output device 230 which is a display unit.

In the third exemplary embodiment, a group of connection ports of each apparatus is output. In the first and the second exemplary embodiments, the communication path information showing the communication order from the start point is output. However, in the output result of the third exemplary embodiment, the order of the connection port of each apparatus is not a matter, and all connection ports extracted in step F2 should be output.

The exemplary aspect of outputting this group of connection ports is not limited to display. For example, it may be outputted as a file.

Also, a screen expressing the connection port visually (a communication propriety elaborating screen) may be outputted based on the processing result (the group of connection ports of the apparatus) derived from the connection port identification means 430. FIG. 23 is an illustration showing an example of such a screen. The screen shown in FIG. 23 exemplifies a screen displaying communication propriety of the packet in a connection port unit that is identified by the connection port identification means 430. Among the processing results derived from the connection port identification means 430, FIG. 23 shows a case of the connection port of the switch A. Thus, the connection port may be displayed every switch. Also, in a communication propriety elaborating screen 1010, the apparatus name of the switch comprising the displayed connection port may be displayed.

The connection port identification means 430 may make the output device 230 display the communication propriety elaborating screen 1010 shown in FIG. 23. The connection port identification means 430 arranges a character string showing each connection port (such as 1/1), and displays an aspect of displaying (for example, a displaying color) in every state of the connection port separately. The aspect of displaying is changed based on whether it is a wired port in the example shown in FIG. 23. Also, the connection port communicatable between only the same VLANs, the connection port communicatable between only the different VLANs, the connection port communicatable among all VLANs, and the connection port that cannot communicate are classified and displayed in different colors.

A wired port 1020 is a connection port connecting to other switch, i.e., a connection port to which a lead such as an LAN cable is inserted. In the example shown in FIG. 23, the wired port 1020 is displayed with a double frame rectangle. The other connection ports that are not displayed with the double frame rectangle are not wired ports. Note that, in this example, a case to display the wired port with a double frame rectangle, however, the wired port may be displayed with other aspect (for example, a bold line frame rectangle).

A connection port 1030 communicatable between the same VLANs is a connection port that can communicate only in the VLAN same as the VLAN of the switch that a network administrator or a designer wants to check. The connection port 1030 communicatable between only the same VLANs is displayed, for example, with blue-colored.

"The VLAN of the switch that a network administrator or a designer wants to check" is a VLAN indicated by the VLAN-ID inputted from the network administrator in order to specify the start point.

A connection port 1040 communicatable between only the different VLANs means a connection port that can communicate only in the VLAN that is different from the VLAN of the switch that a network administrator or a designer wants to check. The connection port 1040 communicatable between only the different VLANs is displayed, for example, with orange-colored.

A connection port 1050 communicatable among all VLANs means a connection port that can communicate both in the same as or different from the VLAN of the switch that a network administrator or a designer wants to check. The connection port 1050 communicatable among all VLANs is displayed, for example, with green-colored.

A connection port 1060 that cannot communicate means a connection port which cannot communicate with the VLAN of the switch that a network administrator or a designer wants to check. The connection port 1060 that cannot communicate is displayed, for example, with red-colored.

Here, the colors for representing the connection port 1030 communicatable between only the same VLANs, the connection port 1040 communicatable between only the different VLANs, the connection port 1050 communicatable among all VLANs, and the connection port 1060 that cannot communicate are not limited to the colors exemplified above. Also, a network administrator or a designer may change a color to distinguish the connection ports freely. Also, the connection ports may be displayed by other aspect of displaying rather than distinguishing by colors.

A communication propriety elaborating table is made to generate the communication propriety elaborating screen 1010 shown in FIG. 23. FIG. 24 is an illustration showing an example of the communication propriety elaborating table. The communication propriety elaborating table is information showing whether the connection port of each switch included in the communication path information generated by the VLAN communication inspection table generating means 120 can communicate in the same VLANs or not, and can communicate in the different VLANs or not. That is, the connection port of each switch is associated with information showing it can communicate in the same VLANs and information it can communicate in the different VLANs. Here, the connection port identification means 430 will be described so as to generate a communication propriety elaborating table 1090, but other means may generate the communication propriety elaborating table 1090.

The connection port identification means 430 generates the communication propriety elaborating table 1090 using the communication path information generated by the VLAN communication inspection table generating means 120 and the connection port list table. As follows, processing to generate the communication propriety elaborating table 1090 will be described. Also, herein, it will be exemplary described with a case that the connection port list table shown in FIG. 25 (*a*) is generated by the connection port information acquisition means 410 and the communication range result (communication path information) shown in FIG. 25 (*b*) is generated by the VLAN communication inspection means 140.

FIG. 26 is a flow chart showing an example of processing to generate the communication propriety elaborating table 1090. At first, the connection port identification means 430 selects one VLAN-ID of each apparatus described in the communication path information (step K1). For example, "A: 10" is selected from the communication path information shown in FIG. 25 (*b*).

Then, the connection port identification means 430 extracts the connection port in which the VLAN-ID of the apparatus selected in step K1 is set from the connection port list table (step K2). An operation of step K2 is similar to the operation of step F2. For example, when "A: 10" is selected in step K1, the communication ports of the apparatus A (the first line "A: 1/1" and the second line "A: 1/2") are extracted from the connection port list table in FIG. 25 (*a*), and the connection port in which the VLAN-ID "10" is set is further extracted from the list. As a result, "A: 1/1" and "A: 1/2" are extracted.

Then, the connection port identification means 430 confirms whether the VLAN-ID of the apparatus selected in step K1 is the same as the VLAN-ID of the apparatus that a network administrator or a designer specifies (step K3). When the VLAN-ID of the apparatus selected in step K1 is the same as the VLAN-ID of the apparatus that the network administrator or the designer specifies (Yes of step K3), the connection port identification means 430 describes a character string representing "communication is possible" (it is noted as "○" herein) as information to show whether the connection port extracted on step K2 can communicate in the same VLANs (step K4).

On the other hand, when the VLAN-ID of the apparatus selected in step K1 is different from the VLAN-ID of the apparatus that the network administrator or the designer specifies (No of step K3), the connection port identification means 430 describes a character string representing "communication is possible" (it is noted as "○" herein) as information to show whether the connection port extracted on step K2 can communicate in the different VLANs (step K5).

For example, the VLAN-ID of the apparatus selected in step K1 is "A: 10" and the generated communication path information is information of the communication path starting with "VLAN-ID=10 of the apparatus A" inputted by the network administrator. Therefore, since the VLAN-IDs are the same, the processing shifts to step K4. And, as shown in FIG. 24, "○" representing "communication is possible" is described respectively in the column of "COMMUNICATABLE BETWEEN THE SAME VLANS" for "A: 1/1" and "A: 1/2" of the "CONNECTION PORT OF APPARATUS" in the communication propriety elaborating table 1090.

After step K4 or step K5, the connection port identification means 430 judges whether all VLAN-IDs of each apparatus described in the communication path information are selected (step K6). If the VLAN-ID (a set of an apparatus name and a VLAN-ID) of the apparatus that is not selected in step K1 is left (No of step K6), the processing shifts to step K1, and the processing from step K1 downward is repeated. If all VLAN-IDs of the apparatus are selected (Yes of step K6), the processing shifts to step K7.

In step K7, if there exists a non-entered column in the communication propriety elaborating table 1090, the connection port identification means 430 enters a character string representing communication impossibility (it is noted as "X" herein) and completes the processing. That is, if any information is not described in the communication propriety elaborating table 1090 as the information representing whether the connection port is communicatable in the same VLANs or the information representing whether the connection port is communicatable in the different VLANs, a character string representing communication impossibility is described in the blank column.

After generating the communication propriety elaborating table 1090, the connection port identification means 430 classifies the processing result shown in FIG. 22 (the communicatable connection ports of all switches within the communication range of the VLAN) and displays it as shown in FIG. 23. FIG. 27 is a flow chart showing an example of processing to classify the connection ports. At first, the connection port identification means 430 selects any one line from the communication propriety elaborating table 1090 (step L1). Here, "one line" means a one line of information shown in FIG. 24 and more specifically, refers to a combination including a connection port, the information representing whether the connection port is communicatable in the same VLANs, and the information representing whether the connection port is communicatable in the different VLANs. For example, the connection port identification means 430 selects information corresponding to the first line of the communication propriety elaborating table 1090 ("A: 1/1", "○" representing that the connection port is communicatable in the same VLANs, and "X" representing that the connection port is not communicatable in the different VLANs).

Then, the connection port identification means 430 confirms whether there exits "○" in the column of "COMMUNICATABLE BETWEEN THE SAME VLANS" of the line which is selected in step L1 (step L2). That is, it is judged whether "○" meaning communication possibility in the same VLANs is included in the information selected in step L1. If the information selected in step L1 includes "○" meaning communication possibility in the same VLANs (Yes of step L2), the processing shifts to step L3. On the other hand, if "X" meaning communication impossibility in the same VLANs is included (No of step L2), the processing shifts to step L4.

When it is judged to be Yes in step L2, the connection port identification means 430 confirms whether there exits "○" in the column of "COMMUNICATABLE BETWEEN DIFFERENT VLANS" of the line which is selected in step L1 (step L3). That is, it is judged whether "○" meaning communication possibility in the different VLANs is included in the information selected in step L1. If the information selected in step L1 includes "○" meaning communication possibility in the different VLANs (Yes of step L3), the connection port selected in step L1 corresponds to the connection port 1050 which can communicate both in the same VLANs and different VLANs. Accordingly, the connection port is displayed with green-colored (step L5). On the other hand, if the information includes "X" meaning communication impossibility in the different VLANs (No of step L3), the connection port selected in step L1 corresponds to the connection port 1030 communicatable between only the same VLANs. Accordingly, the connection port is displayed with blue-colored (step L6).

For example, when the first line of the communication propriety elaborating table 1090 in FIG. 24 is selected, since "X" meaning communication impossibility in the different VLANs is included, it is found that the selected connection port is the connection port 1030 which can communicate between only the same VLANs. Accordingly, a rectangle frame of the connection port "1/1" of the apparatus A in the communication propriety elaborating screen 1010 is displayed with blue-colored.

When it is judged to be No in step L2, the connection port identification means 430 confirms whether there exits "○" in the column of "COMMUNICATABLE BETWEEN DIFFERENT VLANS" of the line which is selected in step L1 (step L4). That is, it is judged whether "○" meaning communication possibility in the different VLANs is included in the information selected in step L1. If the information selected in step L1 includes "○" meaning communication possibility in the different VLANs (Yes of step L4), the connection port selected in step L1 corresponds to the connection port 1040 which can communicate between only the different VLANs. Accordingly, the connection port is displayed with orange-colored (step L7).

On the other hand, if the information includes "X" meaning communication impossibility in the different VLANs (No of step L4), the connection port selected in step L1 corresponds to the connection port 1060 that cannot communicate. Accordingly, a rectangle frame of the connection port is displayed with red-colored (step L8).

For example, when the fifth line of the communication propriety elaborating table 1090 in FIG. 24 is selected, since "X" meaning communication impossibility in the same VLANs and "○" meaning communication possibility in the different VLANs are included, a rectangle frame of the connection port "1/1" of the apparatus C in the communication propriety elaborating screen is displayed with orange-colored.

After steps L5, L6, L7, and L8, the connection port identification means 430 confirms whether inspection for all lines described in the communication propriety elaborating table 1090 is completed (step L9). If a non-selected line is left (No of step L9), the processing shifts to step L1, and the processing from step L1 downward is repeated. If all lines of the communication propriety elaborating table 1090 are selected, the processing is completed.

Also, the third exemplary embodiment is described with a case that the VLAN communication inspection means 140 operates similarly to the first exemplary embodiment, however, the operation of the VLAN communication inspection means 140 may be similar to that of the second exemplary embodiment. And, the communicatable connection ports of all switches within the communication range of the VLAN may be derived from the communication path information that the VLAN communication inspection means 140 generates by processing described in the second exemplary embodiment.

An effect of the third exemplary embodiment to perform the present invention is described. According to the third exemplary embodiment of the present invention, in managing VLAN setting of the network, it is possible to confirm easily a connection port of a switch which can communicate to any VLAN. That is, each connection port of each switch within the range that is possible to communicate from a specified start point can be confirmed easily. The reason is because, by converting the communication range result of the VLAN represented by an apparatus name and a VLAN-ID into a connection port communicatable with the apparatus name using the connection port list table 440, all connection ports of the switches within the communication range of the VLAN can be specified. Thereby, the communication propriety of the packet can be confirmed for each connection port of switch easily. That is, it can be confirmed easily whether it agrees with the result that the network administrator assumes.

Fourth Exemplary Embodiment

FIG. 28 is a block diagram showing a constitution example of a fourth exemplary embodiment of the present invention. An explanation about constituent components similar to those of the first exemplary embodiment is omitted with reference to symbols that are the same as those in FIG. 1. However, the VLAN communication inspection means 140 generates communication path information when a communication network is normal and also generates communication path information when a failure occurs on any switch. It is described below about this operation. The VLAN communication inspection system 100 of the fourth exemplary embodiment further includes a VLAN communication inspection result storage device 510 and a communication range identity checking means 520 as well as the VLAN communication information storage device 110, the LAN communication inspection table generating means 120, the VLAN communication inspection table storage device 130, and the VLAN communication inspection means 140.

The VLAN communication inspection system 100 of the fourth exemplary embodiment also comprises an input device (not shown) to which an apparatus name and a VLAN-ID are inputted by a network administrator or a designer. Also, an apparatus name of a failure occurring switch is inputted to the VLAN communication inspection means 140 through the input device (not shown), and the VLAN communication inspection means 140 stores the apparatus name to an storage device (for example, the VLAN communication inspection table storage device 130). In the second exemplary embodiment, when an apparatus name of a failure occurring switch is not specified, the VLAN communication inspection means 140 performs an operation similar to that of the first exemplary embodiment. In the fourth exemplary embodiment, it is premised that a network administrator inputs an apparatus name of a failure occurring switch previously. The VLAN communication inspection means 140 generates communication path information by performing the processing shown in FIGS. 10 and 11 similarly to the first exemplary embodiment, without depending on the inputted apparatus name of the failure occurring switch. This communication path information is communication path information when any switch works normally. Further, similarly to the second exemplary embodiment, by referring to the inputted apparatus name of the failure occurring switch, the VLAN communication inspection means 140 performs the processing shown in FIG. 10, FIG. 11. FIG. 16 and FIG. 17 to generate communication path information in the failure occurring. Communication path information of the VLAN when the switch on the network works normally and communication path information of the VLAN when a failure occurs on the specified switch are generated. The VLAN communication inspection means 140 stores two kinds of generated communication path information to the VLAN communication inspection result storage device 510.

The VLAN communication inspection result storage device 510 is a storage device storing a communication range (two kinds of communication path information) of the VLAN that is a result checked by the VLAN communication inspection means 140.

Using the communication range of the VLAN stored in the VLAN communication inspection result storage device 510, the communication range identity checking means 520 checks whether a communication range of the VLAN when the switch on the network works normally is the same as a communication range of the VLAN when a failure occurs on the switch on the network. That is, it is judged whether communication path information of the VLAN when the switch on the network works normally agrees with communication path information of the VLAN when a failure occurs on the specified switch. This inspection is performed to confirm whether the network redundancy, which must perform exchanging a packet even when a failure occurs on an apparatus relaying the terminals on the network in the same way as time when the network operates normally, is executed properly. The output device 230 outputs a result of the communication range identity checking means 520.

For example, the communication range identity checking means 520 is implemented by a CPU working by a program. The VLAN communication inspection table generating means 120, the VLAN communication inspection means 140 and the communication range identity checking means 520 may be implemented by the same CPU. As described in the first exemplary embodiment, the program is stored to, for example, a program storage device (not shown) included in the VLAN communication inspection system 100. The CPU reads the program, and, according to the program, it works as the VLAN communication inspection table generating means 120, the VLAN communication inspection means 140 and the communication range identity checking means 520.

Next, an operation of the fourth exemplary embodiment will be described.

At first, the VLAN communication inspection means 140 generates communication path information when all apparatuses on the network operate normally, and stores it to the VLAN communication inspection result storage device 510. The operation for generating the communication path information in the normalcy is similar to the first exemplary embodiment. Further, the VLAN communication inspection means 140 generates, by referring to an apparatus name of a failure occurring switch specified by a network administrator, communication path information in the failure occurring similarly to the second exemplary embodiment, and stores it to the VLAN communication inspection result storage device 510. Note that, in the fourth exemplary embodiment, it is premised that the apparatus name of the failure occurring switch is inputted by the network administrator. Therefore, to generate the communication path information in the failure occurring, the processing may skip step D0 shown in FIG. 16 and shift to step D1. Likewise, the processing may skip step E0 shown in FIG. 17 and shift to step E1.

After the VLAN communication inspection means 140 generates two kinds of communication path information, the communication range identity checking means 520 checks the identity with a VLAN communication range in the normalcy and a VLAN communication range in the failure occurring using the redundant apparatus table 350 memorized to the VLAN communication inspection table storage device 130, and the communication path information in the normalcy and the communication path information in the failure occurring stored to the VLAN communication inspection result storage device 510. As follows, a processing procedure of the communication range identity checking means 520 will be described.

FIG. 29 is a flow chart showing an example of processing for checking the identity with the communication path information in the failure occurring and the communication path information in the normalcy. At first, using the redundant apparatus table 350 memorized to the VLAN communication inspection table storage device 130, the communication range identity checking means 520 excludes an switch to be a failure occurring apparatus from the communication path information in the failure occurring and the communication path information in the normalcy memorized to the VLAN communication inspection result storage device 510 (step G1). For example, if, in the redundant apparatus table 350 (see FIG. 5), the switches B and C are shown to make redundancy, a set of the apparatus name B and the VLAN-ID (for example, "B: 10") is excluded from each communication path information. Likewise, a set of the apparatus name C and the VLAN-ID (for example, "C: 10") is excluded from each communication path information. Then, the communication range identity checking means 520 compares two kinds of communication path information (the communication path information in the failure occurring and the communication path information in the normalcy) from which the switch becoming a failure occurring apparatus is excluded, and judges whether both are the same (step G2). When both are the same (Yes of step G2), it is judged that the communication ranges are the same both in the normalcy and in the failure occurring (step G3). If both are different (No of step G2), the communication ranges are judged to be different in the normalcy and in the failure occurring (step G4).

The communication range identity checking means 520 makes the output device 230 output whether the communication ranges are the same in the normalcy and in the failure occurring. For example, it is displayed.

FIG. 30 is an illustration showing an example of a series of processing of the communication range identity checking means 520. The following description will be given with a case that the redundant apparatus table 350 shown in FIG. 5 is generated. It is assumed that communication path information 610 shown in FIG. 30 as the communication path information in the normalcy is generated by the VLAN communication inspection means 140, and stored to the VLAN communication inspection result storage device 510. Likewise, it is assumed that communication path information 620 shown in FIG. 30 as the communication path information in the failure occurring is generated by the VLAN communication inspection means 140, and stored to the VLAN communication inspection result storage device 510. The communication path information 620 is communication path information when the switch B is specified as a failure occurring switch.

The communication range identity checking means 520 judges that the apparatuses B and C are redundant apparatuses with reference to the redundant apparatus table 350 in FIG. 5, and excludes a result about the apparatus B and a result about the apparatus C from the communication path information 610 and the communication path information 620, respectively (step G1). That is, a set of the apparatus B and the VLAN-ID and a set of the apparatus C and the VLAN-ID are excluded. The result derived from this processing performed on the communication path information 610 is communication path information 630 (see FIG. 30). Likewise, the result derived from this processing performed on the communication path information 620 is communication path information 640 (see FIG. 30).

The communication range identity checking means 520 judges whether two communication path information 630 and 640 after the processing of step G1 are the same (step G2). In this example, the communication path information 630 and 640 are the same, thus it is judged that the communication range in the normalcy is the same as the communication range in the failure occurring (step G3).

The communication range identity checking means 520 makes the output device 230 output a checking result of the identity with the VLAN communication range in the failure occurring and the VLAN communication range in the normalcy.

The communication range identity checking means 520 makes the output device 230, such as a display unit, display the checking result. For example, a comment such as "the communication range results are the same both in the normalcy and in the failure of the network" or "the communication range results are different in the normalcy and in the failure of the network" is displayed. As long as the content is substantially the same, the wordings are not limited in particular. Also, such a checking result may be outputted as a file. Also, when the communication path information are different in the normalcy and in the failure of the network, a set of the apparatus name and the VLAN-ID which included in only one communication path information may be displayed with the comment. If such displaying is performed, the network administrator can confirm which part of the communication path does not agree with in the normalcy and in the failure of the network. Also, a screen showing such a VLAN-ID on a figure of network constitution visually may be displayed.

Then, an effect of the fourth exemplary embodiment to perform the present invention is described. According to the fourth exemplary embodiment of the present invention, in managing VLAN setting of the network, it is possible to confirm easily an identity of a communication range of the VLAN when the apparatus on the network operates normally and a communication range of the VLAN when a failure occurs on the apparatus on the network. The reason is because a communication range of the VLAN when the apparatus on the network operates normally is compared with a communication range of the VLAN when a failure occurs on the apparatus on the network by the communication range identity checking means 520, thereby the difference of each communication range can be identified. Thus, the identity of the communication on the config setting in the normalcy and in the failure of the network due to the redundancy of the apparatus can be confirmed easily. That is, it can be confirmed easily whether it agrees with the result that the network administrator assumes.

Fifth Exemplary Embodiment

FIG. 31 is a block diagram showing a constitution example of a fifth exemplary embodiment of the present invention. An explanation about constituent components similar to those of the third exemplary embodiment is omitted with reference to symbols that are the same as those in FIG. 20. However, the VLAN communication inspection means 140 generates communication path information when a communication network is normal and also generates communication path information when a failure occurs on any switch. This point is similar to the fourth exemplary embodiment. Also, the connection port identification means 430 identifies a connection port of the switch that can communicate from a specified switch, whereas the connection port identification means 430 identifies a connection port that can communicate at the normalcy and a connection port when a failure occurs on any switch on the network system, respectively.

The VLAN communication inspection system 100 of the fifth exemplary embodiment further comprises a connection port identification result storage device 710 and connection port identity checking means 720 as well as the VLAN communication information storage device 110, the VLAN communication inspection table generating means 120, the VLAN communication inspection table storage device 130, the VLAN communication inspection means 140, the connection port information acquisition means 410, the connection port information storage device 420, and the connection port identification means 430.

In the fifth exemplary embodiment, similarly to the fourth exemplary embodiment, it is premised that a network administrator inputs an apparatus name of a failure occurring switch previously. That is, the VLAN communication inspection system 100 of the fifth exemplary embodiment also comprises an input device (not shown) to which an apparatus name and a VLAN-ID are inputted by a network administrator or a designer. Also, an apparatus name of a failure occurring switch is inputted to the VLAN communication inspection means 140 through the input device (not shown), and the VLAN communication inspection means 140 stores the apparatus name to a storage device (for example, the VLAN communication inspection table storage device 130).

The VLAN communication inspection means 140 generates communication path information of the VLAN when the switch on the network works normally and communication path information of the VLAN when a failure occurs on the switch specified by the network administrator. This VLAN communication inspection means 140 is similar to that of the fourth exemplary embodiment. The VLAN communication inspection means 140 outputs two kinds of the generated communication path information to the connection port identification means 430.

The connection port identification means 430 identifies, using the communication path information in the normalcy generated by the VLAN communication inspection means 140, a communicatable connection port of the switch within the range communicatable from the specified switch. This processing is similar to the processing of the connection port identification means 430 described in the third exemplary embodiment. Also, the connection port identification means 430 identifies similarly, using the communication path information in the failure occurring generated by the VLAN communication inspection means 140, a communicatable connection port of the switch within the range communicatable from the specified switch. That is, in this exemplary embodiment, the connection port identification means 430 identifies, using each two kinds of communication path information generated by the VLAN communication inspection means 140, a communicatable connection port of the switch within the range communicatable from the specified switch; and the connection port identification means 430 stores it to the connection port identification result storage device 710. Information showing a connection port identified using the communication path information in the normalcy is represented as connection port information of a switch within the VLAN communication range in the normalcy. Information showing a connection port identified using the communication path information in the failure occurring is represented as connection port information of a switch within the VLAN communication range in the failure occurring.

The connection port identification result storage device 710 stores the information of the connection port of the switch within the communication range of the VLAN, which is a result of the connection port identification means 430. That is, the connection port identification result storage device 710 is to store the connection port information of the switch within the VLAN communication range in the normalcy and the connection port information of the switch within the VLAN communication range in the failure occurring.

Using the connection port information of the switch within the VLAN communication range (two kinds of the connection port information described above) stored to the connection port identification result storage device 710 and the connection port table 340 stored to the VLAN communication inspection table storage device 130, the connection port identity checking means 720 checks whether the connection port of the switch within the VLAN communication range when the switch on the network works normally is the same as the connection port of the switch within the VLAN communication range when a failure occurs on the switch on the network. The output device 230 outputs a result of the connection port identity checking means 720.

The connection port identity checking means 720 is implemented, for example, by a CPU working by a program. The VLAN communication inspection table generating means 120, the VLAN communication inspection means 140, the connection port identification means 430 and the connection port identity checking means 720 may be implemented by the same CPU. The program is stored, for example, to a program storage device (not shown) included in the VLAN communication inspection system 100. The CPU reads the program, and, according to the program, it works as the VLAN communication inspection table generating means 120, the VLAN communication inspection means 140, the connection port identification means 430 and the connection port identity checking means 720.

Next, an operation of the fifth exemplary embodiment will be described.

At first, the VLAN communication inspection means 140 generates communication path information in the normalcy and communication path information in the failure occurring respectively using the VLAN communication enabled/disabled hash table 360 memorized to the VLAN communication inspection table storage device 130. The operation to generate these two kinds of communication path information is similar to that of the fourth exemplary embodiment.

Subsequently, the connection port identification means 430 generates connection port information of a switch within the VLAN communication range in the normalcy from the communication path information in the normalcy using the connection port list table 440. This processing is the processing of steps F1 to F3 described in the third exemplary embodiment (see FIG. 22). Further, the connection port identification means 430 generates connection port information of a switch within the VLAN communication range in the failure occurring from the communication path information in the failure occurring using the connection port list table 440. In this case, the processing of steps F1 to F3 (cf. FIG. 22) should be performed to the communication path information in the failure occurring. The connection port identification means 430 stores the connection port information of the switch within the VLAN communication range in the normalcy and the connection port information of the switch within the VLAN communication range in the failure occurring to the connection port identification result storage device 710.

Then, the connection port identity checking means 720 checks the identity with the connection port of the VLAN communication range in the normalcy and the connection port of the VLAN communication range in the failure occurring using two kinds of connection port information (the connection port information of the switch within the VLAN communication range in the normalcy and the connection port information of the switch within the VLAN communication range in the failure occurring) memorized to the connection port identification result storage device 710. As follows, a processing procedure of the connection port identity checking means 720 will be described.

FIG. 32 is a flow chart showing an example of the identity check processing with the connection port within the VLAN communication range in the normalcy and the connection port within the VLAN communication range in the failure occurring. At first, the connection port identity checking means 720 refers to adjacent port information included in the connection port table 340 memorized to the VLAN communication inspection table storage device 130. The adjacent port information is information to show which connection port of which switch is connected, and, in other words, it shows a connection port connecting the apparatuses each other. And, the connection port identity checking means 720 excludes information of the connection port connecting the apparatuses from the connection port information of a switch within the VLAN communication range in the normalcy. Similarly, the connection port identity checking means 720 excludes information of the connection port connecting the apparatuses from the connection port information of a switch within the VLAN communication range in the failure occurring (step H1).

For example, the adjacent port information such as "A: 1/1-B: 1/1" is included in the connection port table 340 in FIG. 5, and the connection port such as "A: 1/1" or "B: 1/1" as a connection port connecting the apparatuses each other is shown. In this case, the connection port identity checking means 720 excludes the above information of the connection port such as "A: 1/1" or "B: 1/1" from the connection port information of the switch within the VLAN communication range in the normalcy and the connection port information of the switch within the VLAN communication range in the failure occurring, respectively.

Then, the connection port identity checking means 720 compares the connection port information of the switch within the VLAN communication range in the normalcy after having excluded the information of the connection port connecting the apparatuses with the connection port information of the switch within the VLAN communication range in the failure occurring after having excluded the information of the connection port connecting the apparatuses, and judges whether both are the same (step H2). If both are the same (Yes of step H2), it is judged that the communicatable connection port in the normalcy is the same as the communicatable connection port in the failure occurring (step H3). If both are different (No of step H2), it is judged that the communicatable connection port in the normalcy is different from the communicatable connection port in the failure occurring (step H4).

The connection port identity checking means 720 makes the output device 230 output whether the communicatable connection ports are the same in the normalcy and in the failure occurring. For example, it is displayed.

FIG. 33 is an illustration showing an example of a series of processing of the connection port identity checking means 720. The following description will be given with a case that the connection port table 340 in FIG. 5 is generated. It is assumed that connection port information 810 shown in FIG. 33 is generated as the connection port information of the switch within the VLAN communication range in the normalcy by the connection port identification means 430, and stored to the connection port identification result storage device 710. Likewise, it is assumed that connection port information 820 shown in FIG. 33 is generated as the connection port information of the switch within the VLAN communication range in the failure occurring by the connection port identification means 430, and stored to the connection port identification result storage device 710. This connection port information 820 is connection port information of a switch within the VLAN communication range when the switch B is specified as a failure occurring switch.

The connection port table 340 shown in FIG. 5 includes the adjacent port information such as "A: 1/1-B: 1/1", The connection port identity checking means 720 refers to the connection port connecting the apparatuses indicated by each adjacent port information. The connection ports "A: 1/1, B: 1/1, A: 1/2, C: 1/2, B: 1/8, C: 1/8, B: 1/2, D: 1/2, C: 1/1, D: 1/1" are shown as the connection port connecting the apparatuses in the connection port table 340 shown in FIG. 5, thus, the connection port identity checking means 720 refers to these connection ports. And, the connection port identity checking means 720 excludes information of the above connection ports connecting the apparatuses from the connection port information 810 of the switch within the VLAN communication range in the normalcy, and also excludes information of the above connection ports connecting the apparatuses front the connection port information 820 of the switch within the VLAN communication range in the failure occurring (step H1).

The result derived front excluding the information of the connection port connecting the apparatuses from the connection port information 810 of the switch within the VLAN communication range in the normalcy is information 830 of the connection port in the normalcy. Likewise, the result derived from excluding the information of the connection port connecting the apparatuses from the connection port information 820 of the switch within the VLAN communication range at the failure occurring is information 840 of the connection port when a failure occurs on the switch B. The connection port identity checking means 720 compares the information 840 of the connection port when a failure occurs on the switch B with the information 830 of the connection port in the normalcy, and judges whether all connection ports indicated by each information agree with each other (step H2). As shown in FIG. 33, each connection port in the information 830 of the connection port in the normalcy agrees with each connection port in the information 840 of the connection port when a failure occurs on the switch B. Therefore, it is judged that the communicatable connection ports are the same in the normalcy and in the failure occurring (step H3).

The connection port identity checking means 720 makes the output device 230 output a judging result of the identity with the communicatable connection port in the normalcy and the communicatable connection port in the failure occurring.

The connection port identity checking means 720 makes the output device 230, such as a display unit, display the judging result. For example, a comment such as "the communication range results are the same both in the connection port in the normalcy of the network and in the connection port in the failure of the network" or "the communication range results are different in the connection port in the normalcy of the network and in the connection port in the failure of the network" is displayed. As long as the content is substantially the same, the wordings are not limited in particular. Also, a judging result such as exemplified comment may be outputted as a file. When the communicatable connection ports are different in the normalcy and in the failure, the communication port included in only either of the information 830 of the connection port in the normalcy and the information 840 of the connection port in the failure occurring may be shown. If such displaying is performed, the network administrator can confirm the difference between the communicatable connection port in the normalcy and the communicatable connection port in the failure occurring easily. Also, a screen expressing the connection ports of the different apparatuses on a figure of network constitution visually may be displayed.

Then, an effect of the fifth exemplary embodiment to perform the present invention is described. According to the fifth exemplary embodiment of the present invention, in managing VLAN setting of the network, it is possible to confirm easily an identity of a connection port in the VLAN communication range when the apparatus on the network operates normally and a connection port in the VLAN communication range when a failure occurs on the apparatus on the network. The reason is because the connection port identity checking means 720 compares the connection port within the VLAN communication range when the apparatus on the network operates normally with the connection port within the VLAN communication range when a failure occurs on the apparatus on the network, thereby the difference of each connection port within respective communication range can be identified. Thus, the identity of the communication in connection port unit on the config setting in the normalcy and in the failure of the network due to the redundancy of the apparatus can be confirmed easily. That is, it can be confirmed easily whether it agrees with the result that the network administrator assumes.

Sixth Exemplary Embodiment

FIG. 34 is a block diagram showing a constitution example of a sixth exemplary embodiment of the present invention. An explanation about constituent components similar to those of the first exemplary embodiment is omitted with reference to symbols that are the same as those in FIG. 1. The VLAN communication inspection system 100 of the sixth exemplary embodiment further includes filtering information acquisition means 910, a filtering information storage device 920 and filtering communication propriety checking means 930 as well as the VLAN communication information storage device 110, the VLAN communication inspection table generating means 120, the VLAN communication inspection table storage device 130, and the VLAN communication inspection means 140.

VLAN communication information does not need to include information about a filtering rule in the above mentioned first to fifth exemplary embodiments. In contrast, in the sixth and following seventh exemplary embodiments, the VLAN communication information includes information that can identify a filtering rule in the presence of a filtering rule corresponding to the connection port. For example, the VLAN communication information includes descriptions of a line beginning with the character string "set filter profile", and a line beginning with "set filter in-port" or "set filter out-port" shown in FIG. 2.

The filtering information acquisition means 910 extracts a description showing a filtering rule corresponding to the connection port from the VLAN communication information memorized to the VLAN communication information storage device 110, generates a filtering table, and stores it to the filtering information storage device 920. The filtering information storage device 920 is a storage device for storing a filtering table generated by the filtering information acquisition means 910. The filtering table will be described later with reference to FIG. 35.

The filtering communication propriety checking means 930 identifies a VLAN-ID of a switch that refuses communication for a part by filtering using the filtering table memorized to the filtering information storage device 920, the subnet address table 320 memorized to the VLAN communication information storage device 110, and the communication path information generated by the VLAN communication inspection means 140, and deletes the identified VLAN-ID from the communication path information generated by the VLAN communication inspection means 140. Concretely, a path from the VLAN of the switch refusing communication downward is deleted from the communication path information generated by the VLAN communication inspection means 140. The filtering communication propriety checking means 930 makes the output device 230 output this communication path information to which the deletion is performed. For example, it is displayed.

Next, an operation of the sixth exemplary embodiment will be described. At first, the filtering table and an operation of the filtering information acquisition means 910 will be described. FIG. 35 is an illustration showing an example of the filtering table. A filtering table 940 is information showing a filtering rule to be set in the connection port of each switch. The filtering rule includes a condition part and an execution part. The condition part establishes a transmission source IP address and a destination IP address, and the execution part establishes whether communication is permitted or refused when a packet is consistent with the condition part. The filtering table includes an apparatus name and a connection port of the switch and the filtering rule to be set in the connection port of the switch. And, the filtering rule includes a transmission source IP address, a destination IP address and information showing the access propriety. Thus, in the filtering table shown in FIG. 35, the apparatus name of the switch is associated with the connection port of the switch, the transmission source IP address included in the filtering rule, the destination IP address, and the information showing the access propriety. The information showing the access propriety shows either authorization or refusal of the communication. For example, the description of the first line of the filtering table 940 in FIG. 35 means that "a filtering rule to refuse communication from the transmission source IP address=10. 10. 10. 0/24 to the destination IP address=20. 20. 20. 0/24 is set in the connection port 1/2 of the apparatus B". When all IP addresses are designated as a transmission source IP address, the description of "ANY" may be used as an IP address. Likewise, when all IP addresses are designated as a destination IP address, the description of "ANY" may be used as an IP address.

The filtering information acquisition means 910 generates the filtering table 940 with reference to a description about the filtering ride included in the VLAN communication information, and stores it to the filtering information storage device 920. FIG. 36 is a flow chart showing the processing of generating the filtering table by the filtering information acquisition means 910. At first, the filtering information acquisition means 910 extracts a packet filtering rule to be set in the connection port of the switch from the VLAN communication information memorized to the VLAN communication information storage device 110 (step S21). Because the filtering rule is described in a predetermined description form with a predetermined character string, the filtering information storage device 920 should extract such a description described in the predetermined description form with such a predetermined character string from the VLAN communication information. For example, a description such as "set filter profile 1 block src-ip 10. 10. 10. 1255. 255. 255. 0" shown in FIG. 2 is extracted.

Furthermore, the filtering information acquisition means 910 extracts a connection port and an apparatus name to which the filtering rule extracted in step S21 is set from the VLAN communication information, and describes the apparatus name, the connection port, and the filtering rule extracted in step S21 to the filtering table 940 by associating with each other (step S22). For example, the last number of "1" in the description of "set filter in-port fe 4/1 10 1" in FIG. 2 indicates the number of "1 (the number described before "block")" assigned to the description of "set filter profile 1 block src-ip 10.10. 10. 1 255. 255. 255. 0". Thus, it is understood that "set filter in-port fe 4/1 10 1" and "set filter profile 1 block src-ip 10. 10. 10. 1 255. 255. 255. 0" are associated each other. And, the connection port of 4/1 is described in the former description. Moreover, the filtering rule is described in the latter description. Thus, the filtering information acquisition means 910 associates this connection port with this filtering rule. Also, the apparatus name is extracted from the VLAN communication information from which the filtering rule and the connection port are extracted in step S21 and the filtering table exemplified in FIG. 35 is generated by associating the apparatus name, the connection port, and the filtering rule each other. Note that, in FIG. 35, only one set accompanying the apparatus name, the connection port, and the filtering rule is shown. However, when the filtering rule is set in a plurality of connection ports, the filtering information acquisition means 910 generates the filtering table including a plurality of sets accompanying the apparatus name, the connection port, and the filtering rule.

A execution timing for the operation that the filtering information acquisition means 910 generates the filtering table 940 and stores the filtering table 940 to the filtering information storage device 920 may be set before or after the operation that the VLAN communication inspection table generating means 120 generates the VLAN communication enabled/disabled hash table 360 and stores the VLAN communication enabled/disabled hash table 360 to the VLAN communication inspection table storage device 130.

The filtering information acquisition means 910 and the VLAN communication inspection table generating means 120 may be implemented by the same device. For example, they may be implemented by the same CPU as had already described. Also, the VLAN communication inspection table storage device 130 storing the VLAN communication enabled/disabled hash table 360 and the filtering information storage device 920 storing the filtering table 940 may be implemented by the same storage device.

Then, an operation of the filtering communication propriety checking means 930 is described in detail. The filtering communication propriety checking means 930 identifies a VLAN becoming impossible of communication by the filtering rule using the filtering table 940 memorized to the filtering information storage device 920, the subnet address table 320 memorized to the VLAN communication information storage device 110, and the communication path information outputted by the VLAN communication inspection means 140. The filtering communication propriety checking means 930 deletes a part after the point established by the VLAN of the switch judged to be impossible of communication from the communication path information outputted by the VLAN communication inspection means 140.

FIG. 37 is a flow chart showing an example of the processing that the filtering communication propriety checking means 930 identifies the VLAN becoming impossible of communication by the filtering rule. The following example will be described with a case that the filtering table 940 in FIG. 35 is generated as a filtering table, and the subnet address table 320 in FIG. 5 is generated as a subnet address table. Also, in this example, it is assumed that the communication path information shown in FIG. 14 is generated by the VLAN communication inspection means 140. At first, the filtering communication propriety checking means 930 selects a non-inspected filtering rule from the filtering table 940 (step I1). Here, the non-inspected filtering rule is a filtering rule that is not selected in step I1, and is still not regarded as an object for steps after step I1. For example, the filtering communication propriety checking means 930 selects the apparatus name, the connection port, and the filtering rule (specifically, the transmission source IP address, the destination IP address, the information showing the access propriety) in the first line of the filtering table 940 shown in FIG. 35.

Then, the filtering communication propriety checking means 930 determines whether the information showing the access propriety in the filtering rule selected in step I1 shows "refusal" (step I2). When "refusal" is shown (Yes of the step I2), the processing shifts to step I3. On the other hand, when "permission" is shown (No of the step I2), the filtering rule selected in step I1 does not make communication impossible on the communication path derived by the VLAN communication inspection means 140. In this case, the processing shifts to step I7. When the information of the first line of the filtering table 940 in FIG. 35 is selected in step I1, as "refusal" is shown as the access propriety, the processing shifts to step I3.

When the information showing the access propriety indicates "refusal", the filtering communication propriety checking means 930 converts the transmission source IP address and the destination IP address of the filtering rule showing "refusal" into a transmission source VLAN-ID and a destination VLAN-ID using the subnet address table 320 (see FIG. 5) (step I3). The transmission source VLAN-ID is a VLAN-ID of the transmission source of the packet, and the destination VLAN-ID is a VLAN-ID of the destination of the packet. If the transmission source IP address of the filtering rule showing "refusal" corresponds to the subnet address described in the subnet address table 320, the filtering communication propriety checking means 930 converts the transmission source IP address into the VLAN-ID corresponding to the subnet address. Likewise, if the destination IP address of the filtering rule showing "refusal" corresponds to the subnet address described in the subnet address table 320, the destination IP address is converted into the VLAN-ID corresponding to the subnet address.

For example, in the first line of the filtering table 940 shown in FIG. 35, the transmission source IP address indicates "10. 10. 10. 0/24". The VLAN-ID corresponding to this IP address is VLAN-ID=10 according to the subnet address table 320 shown in FIG. 5. Thus, the transmission source IP address "10. 10. 10. 0/24" is converted into "VLAN-ID=10". Likewise, the destination IP address of the first line of the filtering table 940 indicates "20. 20. 20. 0/24", and the VLAN-ID corresponding to this IP address is "VLAN-ID=20" according to the subnet address table 320, thus, the destination IP address "20. 20. 20. 0/24" is converted into "VLAN-ID=20". Thereby, the content meaning "set the filtering rule to refuse the communication from the transmission source IP address=10. 10. 10. 0/24 to the destination IP address=20. 20. 20. 0/24 in the connection port 1/2 of the apparatus B" in the first line of the filtering table 940 can be rearranged for a meaning to "refuse the communication from the transmission source VLAN-ID=10 to the destination VLAN-ID=20 in the connection port 1/2 of the apparatus B".

After step I3, the filtering communication propriety checking means 930 retrieves a communication path which is to be refused to communicate from the communication path information generated by the VLAN communication inspection means 140 using the filtering rule in which the transmission source IP address and the destination IP address are converted into the corresponding VLAN-IDs (step I4). It is understood whether a communication from which VLAN of which switch to which VLAN is refused by the apparatus name and the connection port selected in step I1 and the contents of the filtering rule converted in step I3. For example, if, as a result of conversion, the content to "refuse the communication from the transmission source VLAN-ID=10 the destination VLAN-ID=20 in the connection port 1/2 of the apparatus B" is obtained, it is understood that the communication from "B: 10" to "B: 20" is refused. That is, in the communication of "an apparatus name: a transmission source VLAN-ID→an apparatus name: a destination VLAN-ID", the communication to the destination VLAN is refused. The filtering communication propriety checking means 930 retrieves this communication point from the communication path information. Therefore, the filtering communication propriety checking means 930 retrieves the communication of "B: 10→B: 20" from the communication path information. The communication path of "B: 10→B: 20" which is to be refused to communicate is retrieved from the communication path information shown in FIG. 14. In this example, the communication of "B: 10→B: 20" is retrieved from the communication path information of "A: 10→B: 10→B: 20→C: 20→A: 20" of the second line and "A: 10→B: 10→B: 20→C: 20→D: 20" of the third line of the FIG. 14.

After step I4, the filtering communication propriety checking means 930 determines whether the communication path to be refused to communicate is retrieved from the communication path information (step I5). When it succeeds (Yes of step I5), the VLAN communication becoming impossible of communication by the filtering rule is understood. Thus, the filtering communication propriety checking means 930 deletes the communication path after the communication point from the communication path information (step I6), and then the processing shifts to step I7. On the other hand, if the communication to be retrieved does not exist in the communication path information, it is understood that there is not any point refusing the communication on the communication path information derived from the VLAN communication inspection means 140, thus, the processing shifts to step I7.

In the processing of retrieving in step I4, the communication of "B: 10→B: 20" is retrieved from the communication path information of "A: 10→B: 10→B: 20→C: 20→A: 20" of the second line and "A: 10→B: 10→B: 20→C: 20→D: 20" of the third line of the FIG. 14. And, the VLAN communication of "B: 10→B: 20" cannot be performed. Therefore, the filtering communication propriety checking means 930 deletes the path after the communication of "B: 10→B: 20" from "A: 10→B: 10→B: 20→C: 20→A: 20" of the second line, and leaves "A: 10→B: 10". Similarly, the filtering communication propriety checking means 930 deletes the path after the communication of "B: 10→B: 20" from "A: 10→B: 10→B: 20→C: 20→D: 20" of the third line, and leaves "A: 10→B: 10". Thus, in this example, the communication path information after step I7 becomes as shown in FIG. 38.

When a part of the communication path is deleted in step I7, the information pieces showing the same communication path may be repeated, or the information showing one communication path may include the information showing other communication path. When the information pieces showing the same communication path are repeated, only one of those may be left. For example, in a result shown in FIG. 38, the information pieces showing "A: 10→B: 10" are repeated, thus only one information showing "A: 10→B: 10" is left and the reminder may be deleted. Also, when the information showing one communication path includes the information showing other communication path, the information showing the included communication path may be deleted. For example, in a result shown in FIG. 38, "A: 10→B: 10" is included in "A: 10→B: 10→D: 10". Therefore, "A: 10→B: 10→D: 10" is left and "A: 10→B: 10" included in it may be deleted.

The filtering communication propriety checking means 930 confirms whether the inspection is completed to all filtering rules of the filtering table 940 (step I7). That is, it is determined whether all filtering rules of the filtering table 940 are finished with selection in step I1. If there is a filtering rule that is not selected in step I1 (No of step I7), the processing shifts to step I1, and processing from step I1 downward is repeated. If all filtering rules are finished with selection in step I1 (Yes of step I7), the processing is finished.

After the processing of steps I1 to I7 is performed to the communication path information generated by the VLAN communication inspection means 140, the filtering communication propriety checking means 930 makes the output device 230 output the processed communication path information. For example, it makes the output device 230, such as a display unit, display the result. Also, it may not be displayed, and it may be outputted as a file. Further, a screen expressing the communication range and the communication path on a figure of network constitution visually may be displayed.

Then, an effect of the sixth exemplary embodiment to perform the present invention is described. According to the sixth exemplary embodiment of the present invention, in managing VLAN setting of the network, it is possible to confirm easily a communication range of a VLAN while considering a VLAN communication becoming impossible by a filtering rule. The reason is because if the filtering communication propriety checking means 930 inspects a presence of the VLAN communication becoming impossible by the filtering rule among the VLAN communication range result outputted by the VLAN communication inspection means 140 and detects it, the filtering communication propriety checking means 930 can delete it and output the final VLAN communication range result.

In the sixth exemplary embodiment, the VLAN communication inspection means 140 may work similarly to the second exemplary embodiment. Also, in the third to fifth exemplary embodiments, the VLAN communication inspection system 100 may include the filtering information acquisition means 910, the filtering information storage device 920, and the filtering communication propriety checking means 930. In the third exemplary embodiment, the filtering communication propriety checking means 930 should perform the above-mentioned operation (steps I1 to I7) to the communication path information generated by the VLAN communication inspection means 140, and the connection port identification means 430 should perform the processing to the communication path information processed by the filtering communication propriety checking means 930. In the fourth exemplary embodiment, the filtering communication propriety checking means 930 should perform the above-mentioned operation (steps I1 to I7) to respective communication path information in the normalcy and communication path information in the failure occurring that are generated by the VLAN communication inspection means 140, and the communication range identity checking means 520 should perform the processing to two kinds of communication path information processed by the filtering communication propriety checking means 930. In the fifth exemplary embodiment, the filtering communication propriety checking means 930 should perform the above-mentioned operation (steps I1 to I7) to respective communication path information in the normalcy and communication path information in the failure occurring that are generated by the VLAN communication inspection means 140, and connection port identification means 430 should performs the processing to the communication path information processed by the filtering communication propriety checking means 930.

Seventh Exemplary Embodiment

FIG. 39 is a block diagram showing a constitution example of a seventh exemplary embodiment of the present invention. An explanation about constituent components similar to those of the first exemplary embodiment is omitted with reference to symbols that are the same as those in FIG. 1. The VLAN communication inspection system 100 of the seventh exemplary embodiment further includes the filtering information acquisition means 910, the filtering information storage device 920, and table correcting means 950 as well as the VLAN communication information storage device 110, the VLAN communication inspection table generating means 120, the VLAN communication inspection table storage device 130, and the VLAN communication inspection means 140.

In the seventh exemplary embodiment, similarly to the sixth exemplary embodiment, the VLAN communication information includes information that can identify a filtering rule in the presence of a filtering rule corresponding to the connection port. For example, the VLAN communication information includes descriptions of a line beginning with a character string "set filter profile", and a line beginning with "set filter in-port" or "set filter out-port" shown in FIG. 2.

The filtering information acquisition means 910 and the filtering information storage device 920 are the same as those described in the sixth exemplary embodiment, thus an explanation will be omitted.

As described in the first exemplary embodiment, the VLAN communication inspection table generating means 120 generates the routing table 310, the subnet address table 320, the VLAN-ID table 330, the connection port table 340 and the redundant apparatus table 350, and further generates the VLAN communication enabled/disabled hash table 360 using these tables. The VLAN communication inspection table generating means 120 stores these generated tables to the VLAN communication inspection table storage device 130.

The table correcting means 950 identifies a VLAN-ID of a switch refusing communication for a part by filtering using the filtering table 940 memorized to the filtering information storage device 920, and the subnet address table 320 and the VLAN communication enabled/disabled hash table 360 memorized to the VLAN communication inspection table storage device 130, and deletes the identified VLAN-ID of the switch from the VLAN communication enabled/disabled hash table 360, thereby corrects the communication enabled/disabled hash table 360 stored to the VLAN communication inspection table storage device 130. The table correcting means 950 corrects the VLAN communication enabled/disabled hash table 360 among the tables generated by the VLAN communication inspection table generating means 120.

Then, an operation will be described.

FIG. 40 is a flow chart showing an example of the processing that the table correcting means 950 identifies the VLAN becoming impossible of communication by the filtering rule. At first, the table correcting means 950 selects a non-inspected filtering rule from the filtering table 940 (stop J1). Here, the non-inspected filtering rule is a filtering rule that is not selected in step J1, and is still not regarded as an object for steps after step J1. Then, the table correcting means 950 determines whether the information showing the access propriety in the filtering rule selected in step J1 shows "refusal" (step J2). When "refusal" is shown (Yes of step J2), the processing shifts to step J3. On the other hand, when "permission" is shown (No of step J2), the processing shifts to step J7.

When the information showing the access propriety indicates "refusal", the table correcting means 950 converts a transmission source IP address and a destination IP address of the filtering rule showing "refusal" into a transmission source VLAN-ID and a destination VLAN-ID using the subnet address table 320 (see FIG. 5) (step J3). The processing of the above-mentioned steps J1 to 13 is similar to the processing of steps I1 to I3 in the sixth exemplary embodiment.

Then, the table correcting means 950 retrieves a VLAN that has a set of the transmission source VLAN-ID and the apparatus name selected in step J1 as a KEY and a set of the destination VLAN-ID and the apparatus name selected in step J1 as a VALUE, from the VLAN communication enabled/disabled hash table 360 generated by the VLAN communication inspection table generating means 120 (step J4). That is, the table correcting means 950 judges whether there exists a VALUE having the destination VLAN-ID and the apparatus name selected in step J1 in the VALUEs that has a set of the transmission source VLAN-ID and the apparatus name selected in step J1 as a KEY.

For example, it is assumed that the apparatus name, the connection port, and the filtering rule shown in the first line of the filtering table 940 of FIG. 35 are selected in step J1; and the transmission source IP address shown in the first line of the filtering rule of the filtering table 940 of FIG. 35 is converted into "VLAN-ID=10" and the destination IP address is converted into "VLAN-ID=20" in step J3. The selected information represents that "the connection port 1/2 of the apparatus B refuses the communication from the transmission source VLAN-ID=10 to the destination VLAN-ID=20" through this conversion. The table correcting means 950 reads, using "B: 10" having the selected apparatus name B and the transmission source VLAN-ID=10 as a KEY, each VALUE of the KEY. The table correcting means 950 determines whether there exists "B: 20" having the selected apparatus name B and the destination VLAN-ID=20 in the VALUEs.

Then, the table correcting means 950 confirms whether there exists a matched VLAN that is determined in step J4 (step J5). That is, it is judged whether there exists a VALUE having the destination VLAN-ID and the apparatus name selected in step J1 in the VALUEs that have a set of the transmission source VLAN-ID and the apparatus name selected in step J1 as a KEY. If there exists a VALUE having the destination VLAN-ID and the apparatus name selected in step J1 in the VALUEs (Yes of step J5), the VALUE is deleted (step J6). For example, in the example above, when "B: 20" is included in the VALUEs of the KEY "B: 10", the table correcting means 950 deletes the VALUE "B: 20".

If a VALUE having the destination VLAN-ID and the apparatus name selected in step J1 is not included in the VALUEs (No of step J5), it means that the VLAN communication becoming impossible by the filtering rule does not exist in the VLAN communication enabled/disabled hash table 360. In this case, the processing shifts to step J7.

The table correcting means 950 confirms whether the inspection is completed to all filtering rules of the filtering table 940 (step J7). That is, it is determined whether all filtering rules of the filtering table 940 are finished with selection in step J1. If there is a filtering rule that is not selected in step J (No of step J7), the processing shifts to step J1, and processing from step J1 downward is repeated. If all filtering rules are finished with selection in step J1 (Yes of step J7), the processing is finished. The processing of this step J7 is similar to the processing of step I7 in the sixth exemplary embodiment.

The table correcting means 950 stores, to the VLAN communication inspection table storage device 130, the VLAN communication enabled/disabled hash table 360 from which the VLAN becoming impossible of communication by the filtering rule is deleted.

The VLAN communication inspection means 140 performs the processing using the VLAN communication enabled/disabled hash table 360 that is corrected by the table correcting means 950.

In this exemplary embodiment, an effect like the sixth exemplary embodiment can be obtained.

The VLAN communication inspection system 100 of the second to sixth exemplary embodiments may also include the filtering information acquisition means 910, the filtering information storage device 920, and the table correcting means 950. Further, the processing may be performed using the VLAN communication enabled/disabled hash table 360 corrected by the table correcting means 950.

In each exemplary embodiment, although a case using the VLAN communication enabled/disabled hash table 360 is described, this table does not need to be a hash table. However, because a VALUE corresponding to the specified KEY can be identified fast, it is desirable to adopt a hash table.

Industrial Applicability

The present invention can be applied to a system to perform a network management, or a management of VLAN setting and a simulation for software.

BRIEF DESCRIPTION OF THE DRAWINGS

FIG. 1 is a block diagram showing a constitution example of a first exemplary embodiment of the present invention;

FIG. 2 is an illustration showing an example of the config file of the switch;

FIG. 3 is an illustration showing an example of the config file of the switch;

FIG. 4 is an illustration showing an example of the switch connection constitution information;

FIG. 5 is an illustration showing an example of various tables generated by the VLAN communication inspection table generating means;

FIG. 12 is an illustration showing an example of the processing that the VLAN communication checking means specifies the communication range and the communication path of the VLAN;

FIG. 13 is an illustration showing an example of the processing that the VLAN communication checking means specifies the communication range and the communication path of the VLAN;

FIG. 14 is an illustration showing an example of the output result of the communication path information;

FIG. 18 is an illustration showing an example of the processing to specify the communication range and the communication path;

FIG. 23 is an illustration showing an example of the communication propriety elaborating screen;

FIG. 24 is an illustration showing an example of the communication propriety elaborating table;

FIG. 25 is an illustration showing an example of the connection port list table and the communication path information;

FIG. 28 is a block diagram showing a constitution example of a fourth exemplary embodiment of the present invention;

FIG. 32 is a flow chart showing an example of the processing for checking an identity of the connection port within the VLAN communication range in the normalcy and the connection port within the VLAN communication range in the failure occurring;

FIG. 38 is an illustration showing an example of the communication path information after step I7;

FIG. 39 is a block diagram showing a constitution example of a seventh exemplary embodiment of the present invention.

Figure 6:
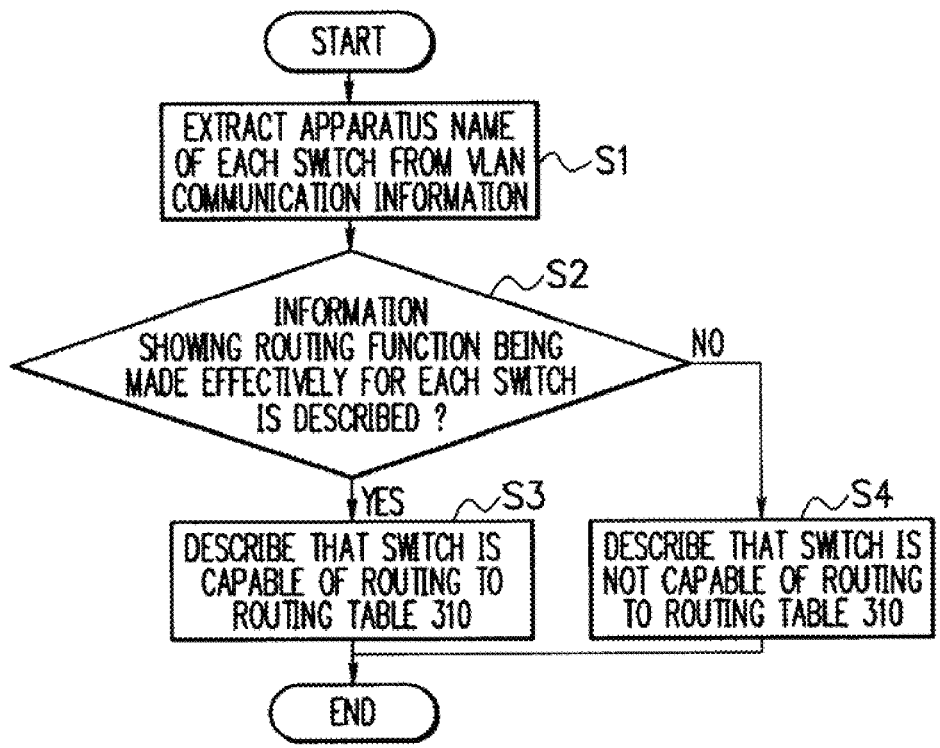
FIG. 6 is a flow chart showing the processing to generate the routing table.
Figure 7:
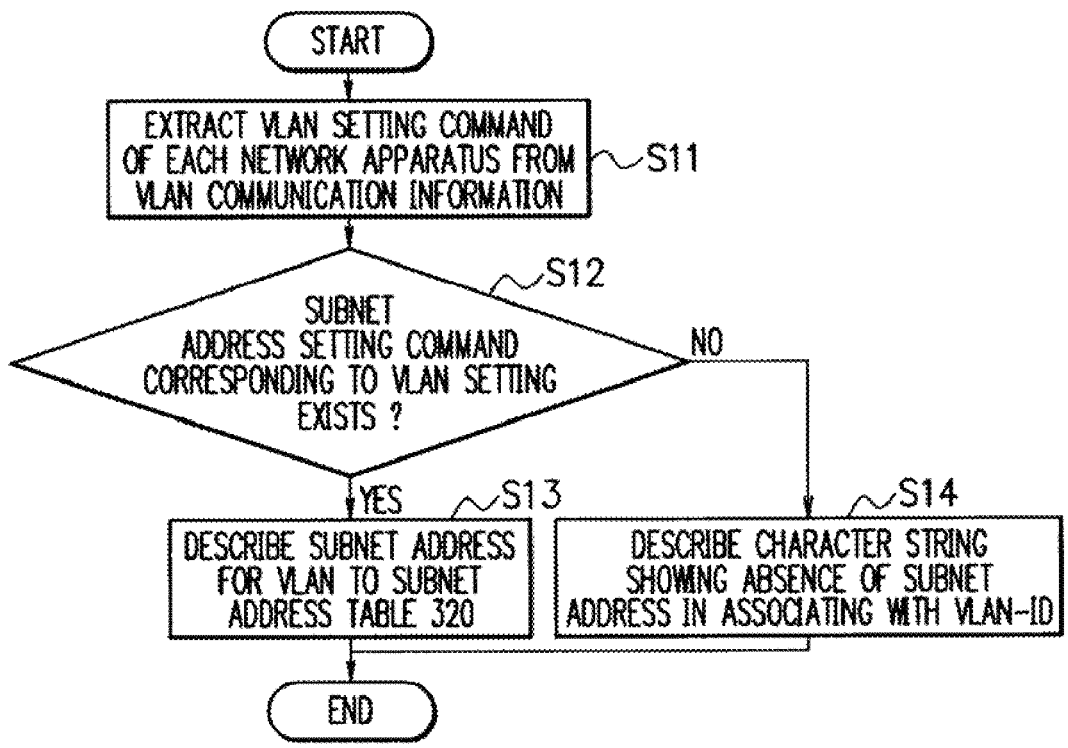
FIG. 7 is a flow chart showing the processing to generate the subnet address table.
Figure 8:
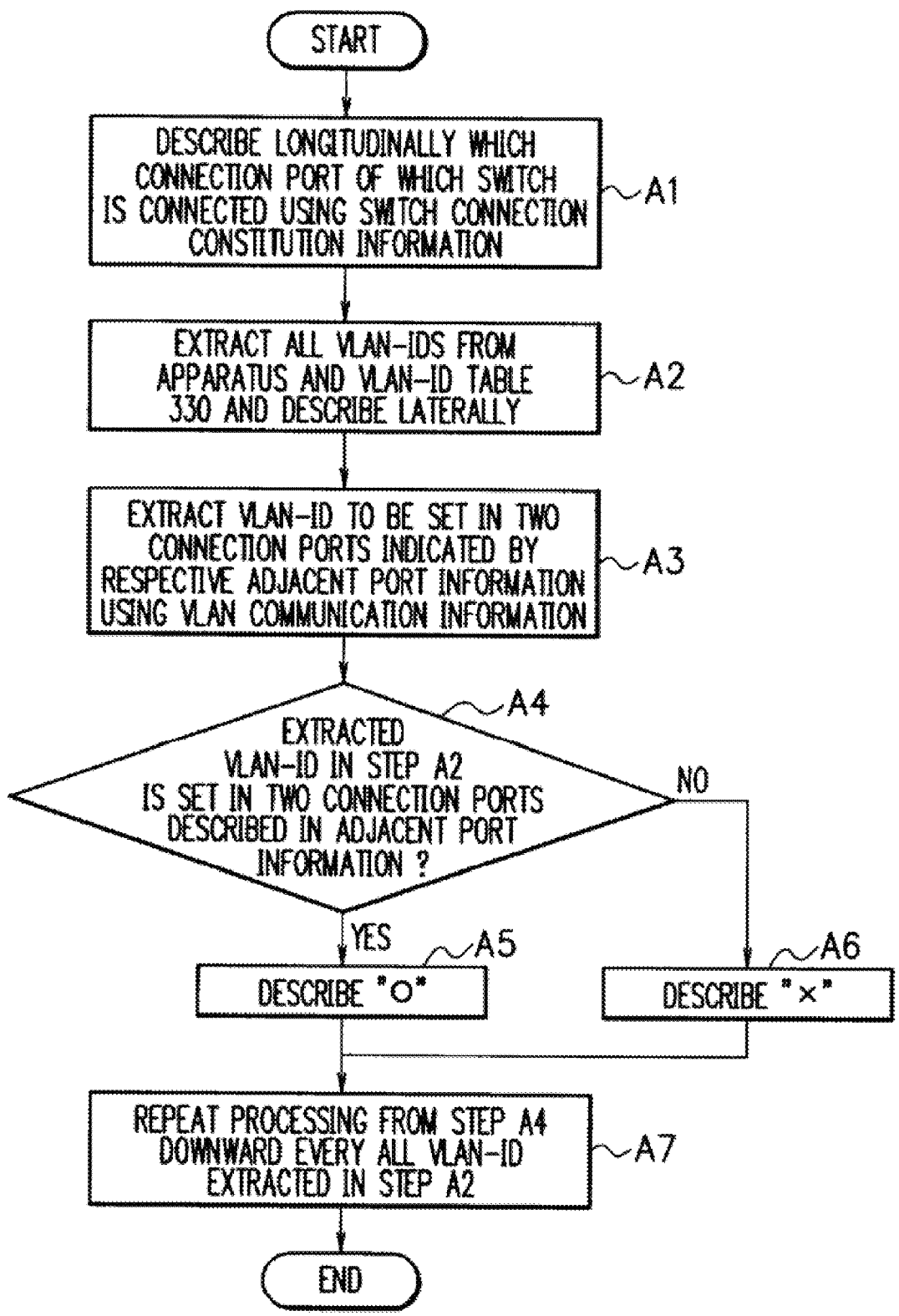
FIG. 8 is a flow chart showing an example of the processing to generate the connection port table.
Figure 9:
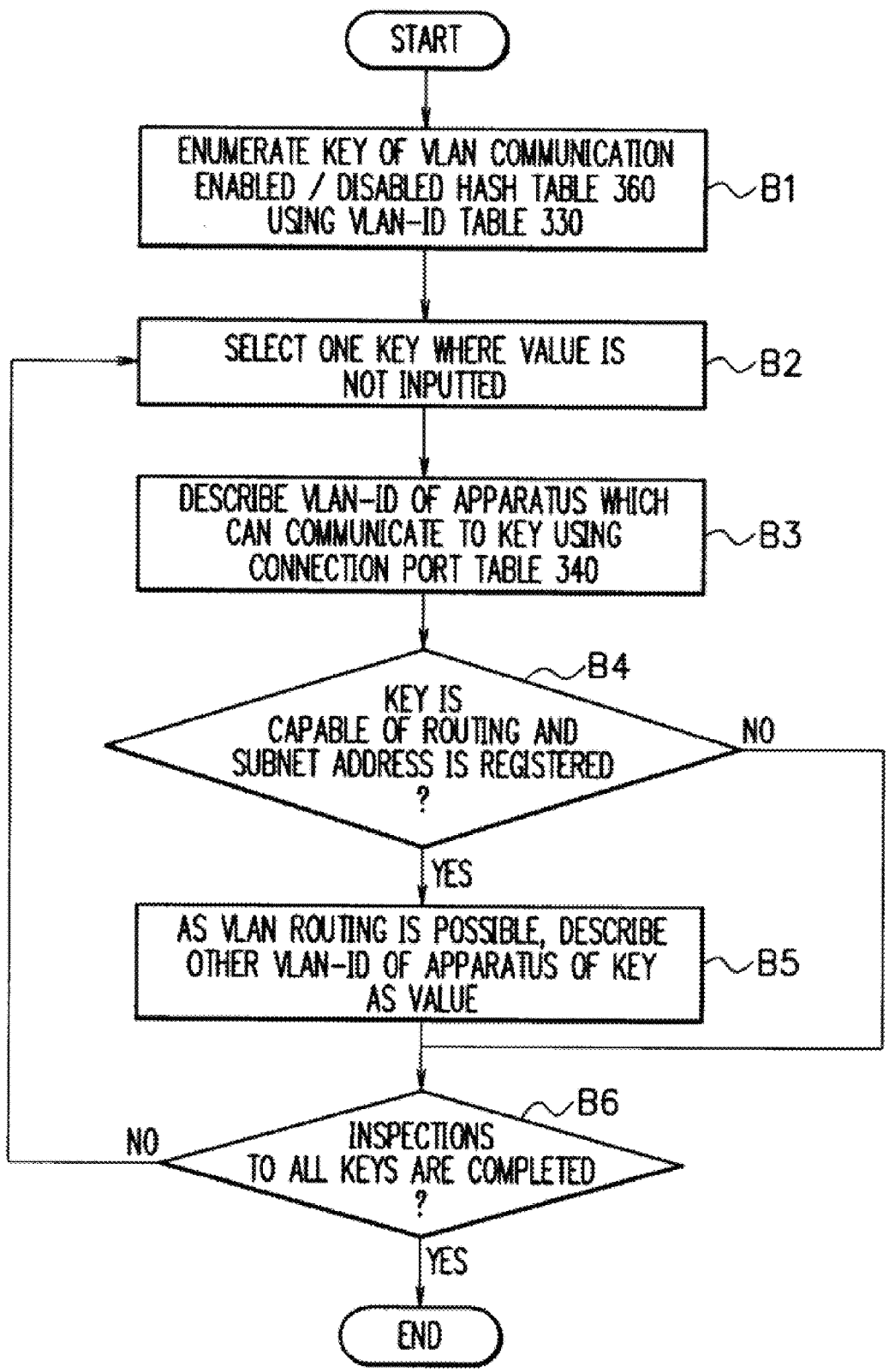
FIG. 9 is a flow chart showing an example of the processing to generate the VLAN communication propriety hash table.
Figure 10:
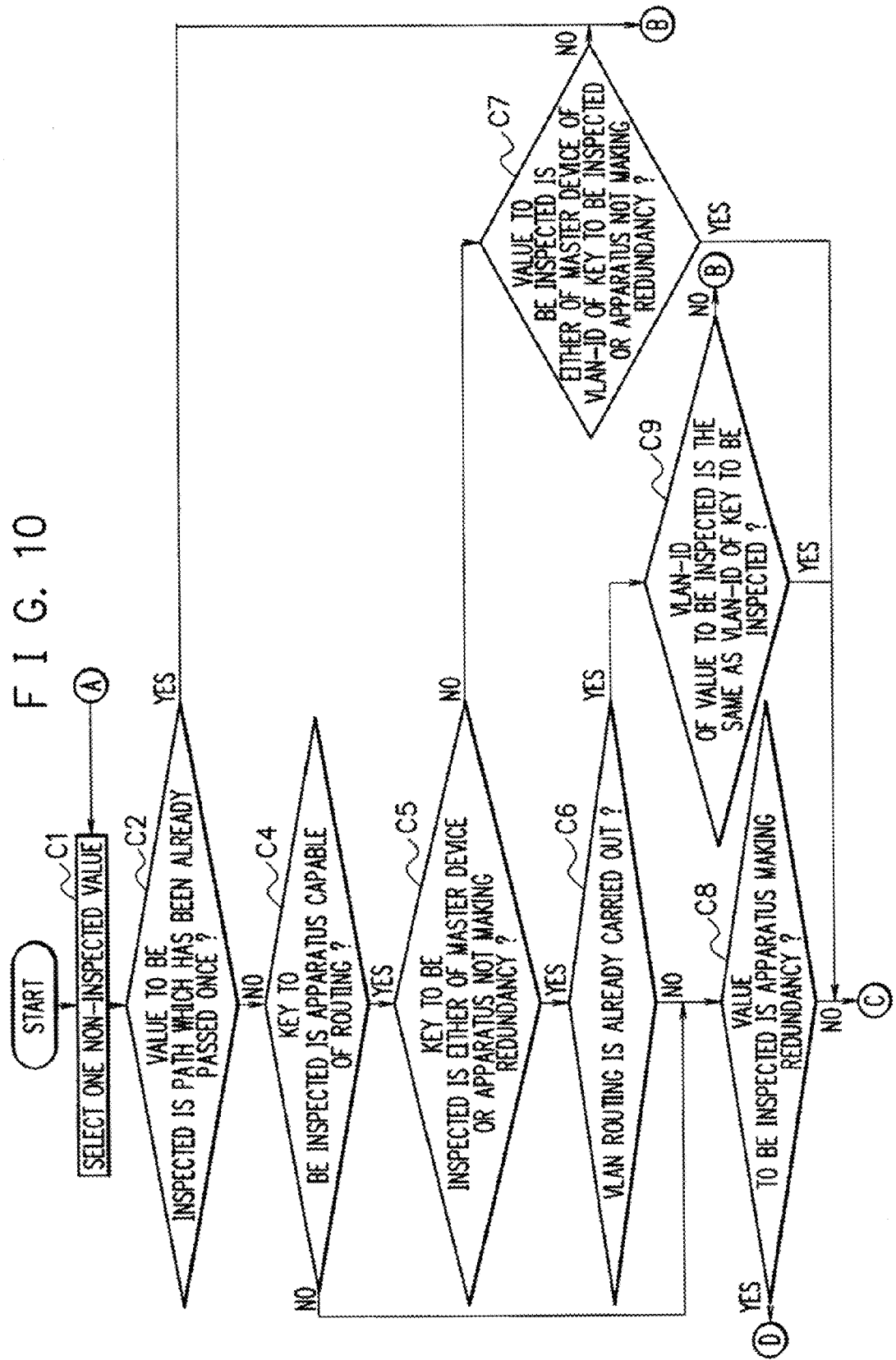
FIG. 10 is a flow chart showing an example of the processing that the VLAN communication checking means specifies a communication range and a communication path of the VLAN.
Figure 11:
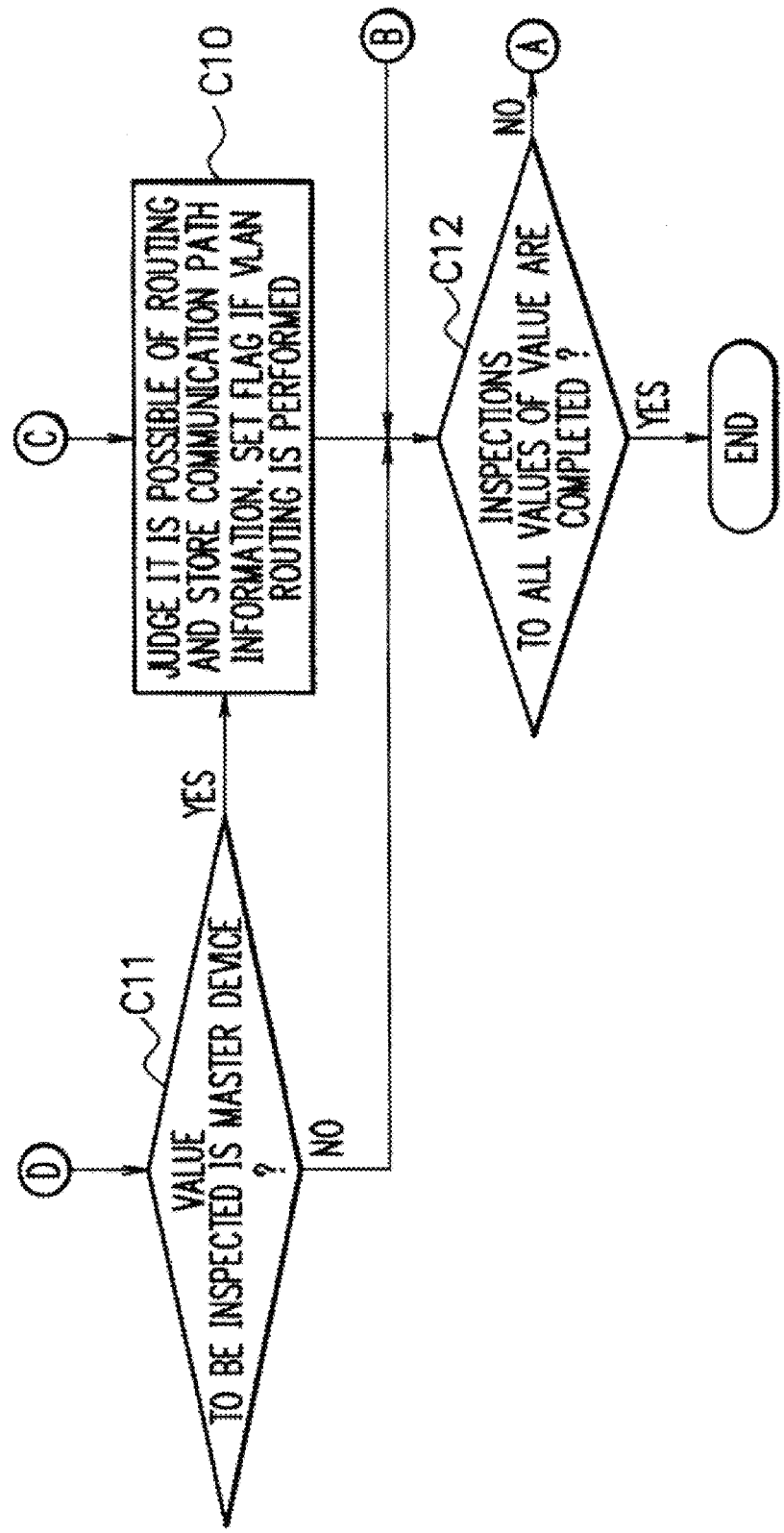
FIG. 11 is a flow chart showing an example of the processing that the VLAN communication checking means specifics the communication range and the communication path of the VLAN.
Figure 15:
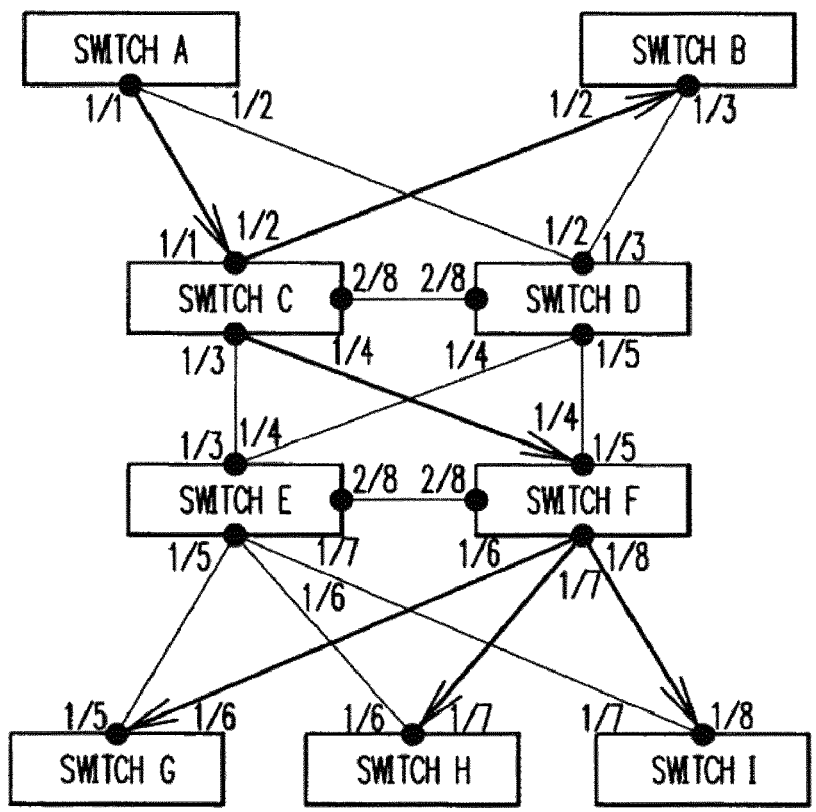
FIG. 15 is an illustration showing an example of the output screen of the communication path.
Figure 16:
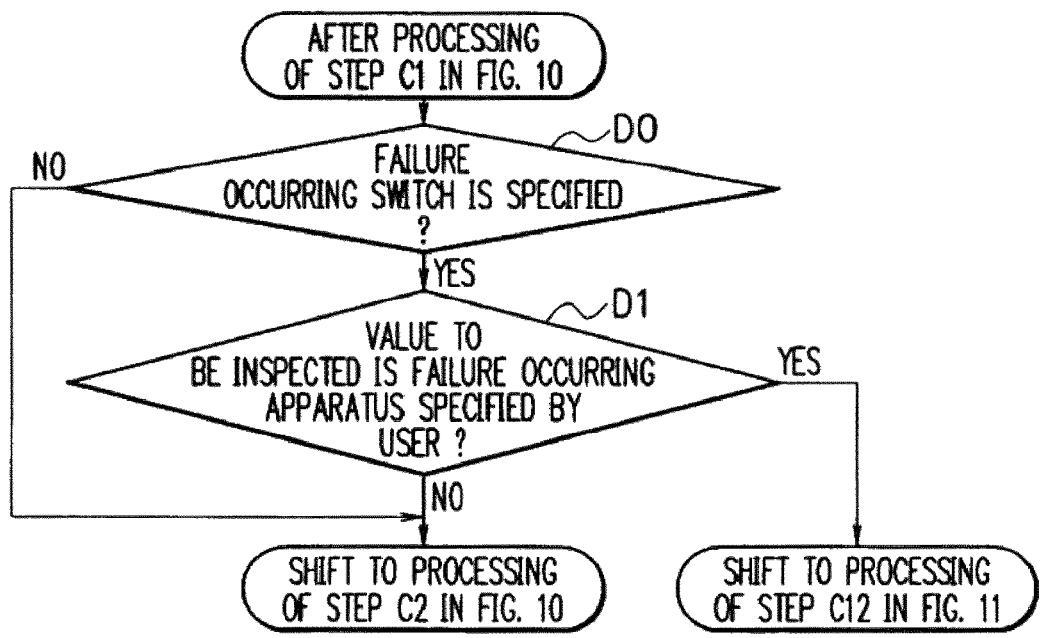
FIG. 16 is an illustration showing the processing that is added to specify the communication path in the failure occurring.
Figure 17:
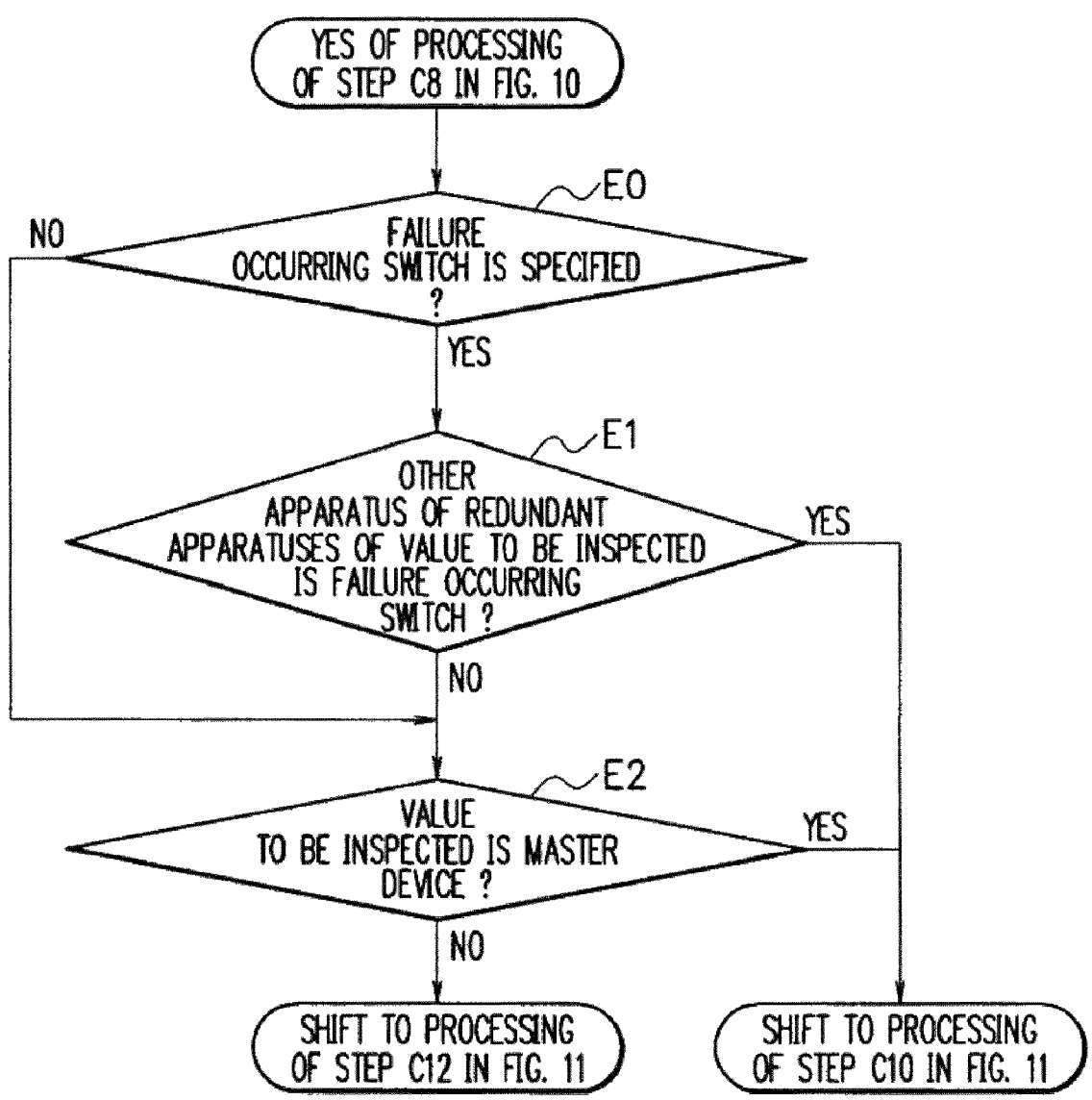
FIG. 17 is an illustration showing the processing that is added to specify the communication path in the failure occurring.
Figures 19, 20:
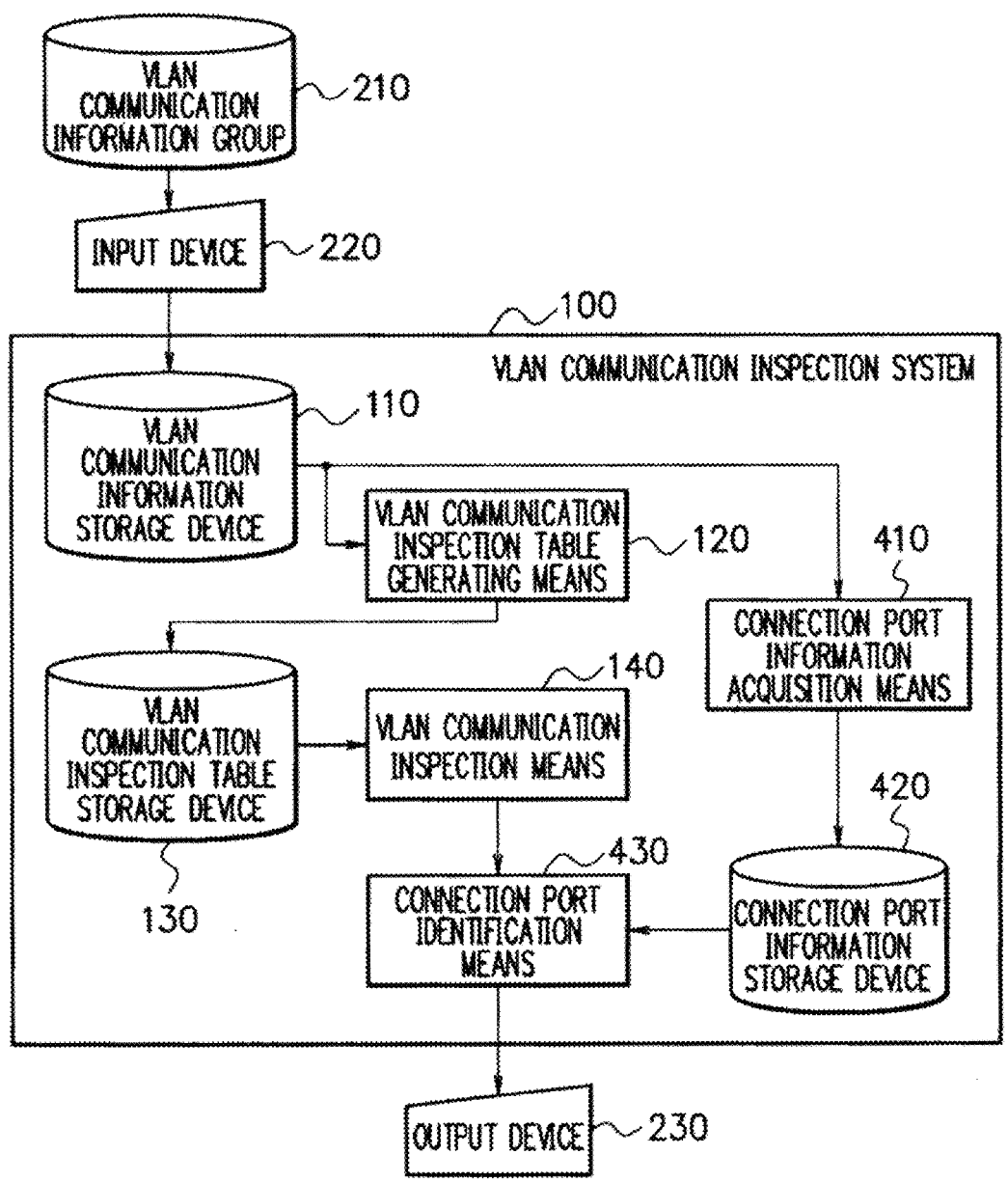
FIG. 19 is an illustration showing an example of the specified result of the communication range and the communication path.
FIG. 20 is a block diagram showing a constitution example of a third exemplary embodiment of the present invention.
Figures 21, 22:
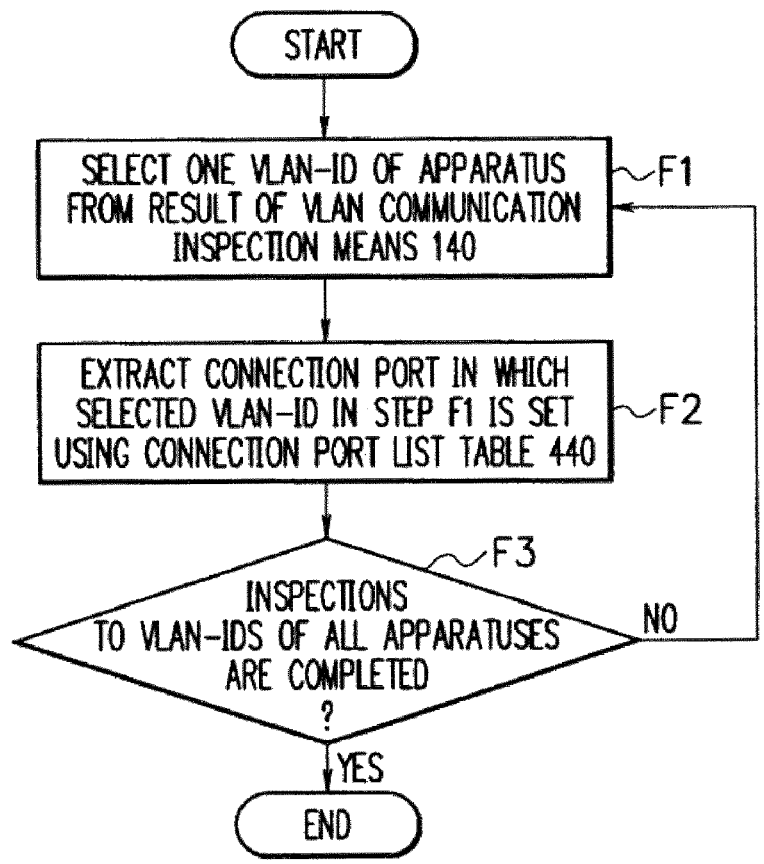
FIG. 21 is an illustration showing an example of the connection port list table.
FIG. 22 is a flow chart showing an example of the processing to identify the connection port of all switches within the communication range of the VLAN.
Figure 26:
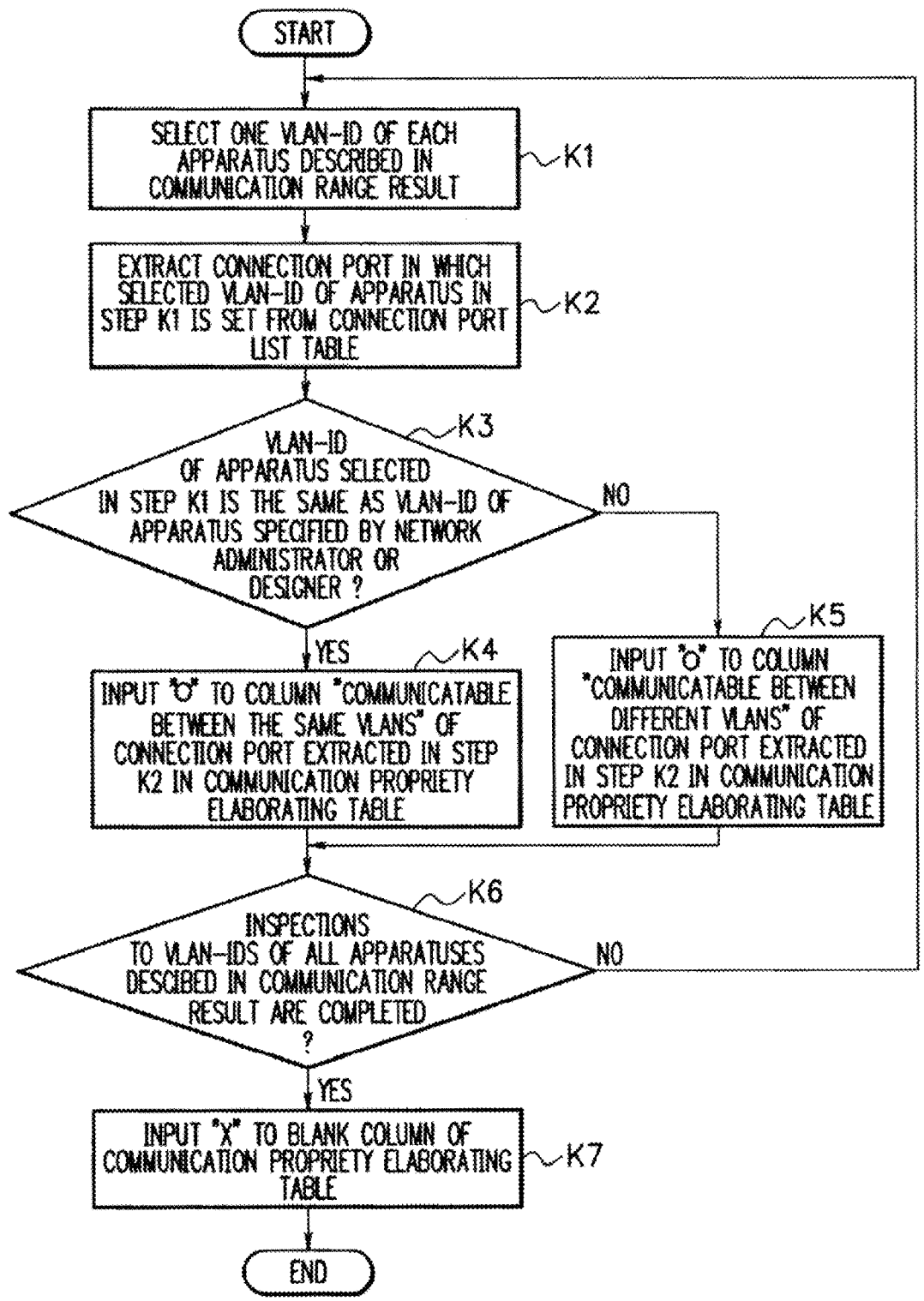
FIG. 26 is a flow chart showing an example of the processing to generate the communication propriety elaborating table.
Figure 27:
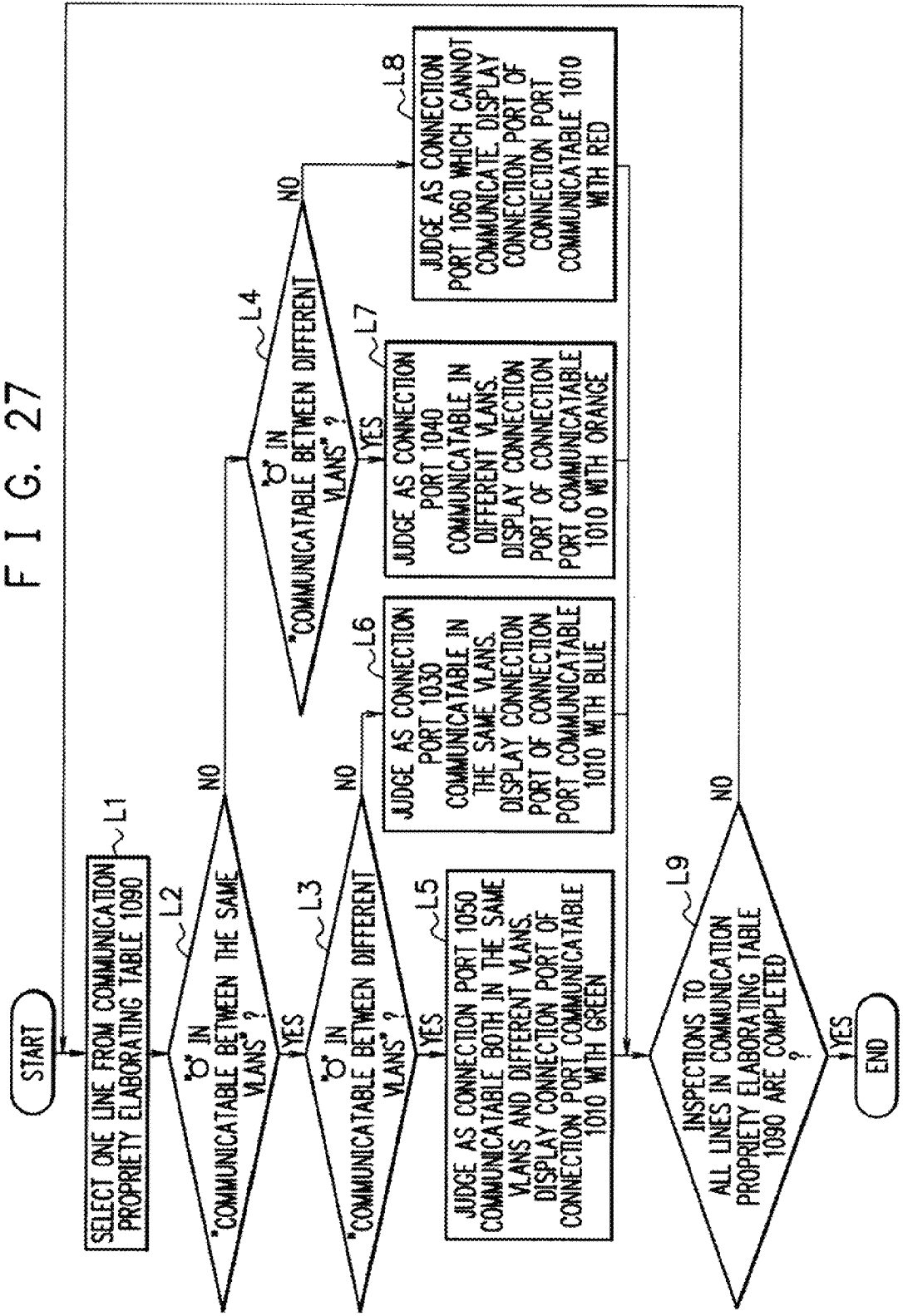
FIG. 27 is a flow chart showing an example of the processing to classify the connection port.
Figure 29:
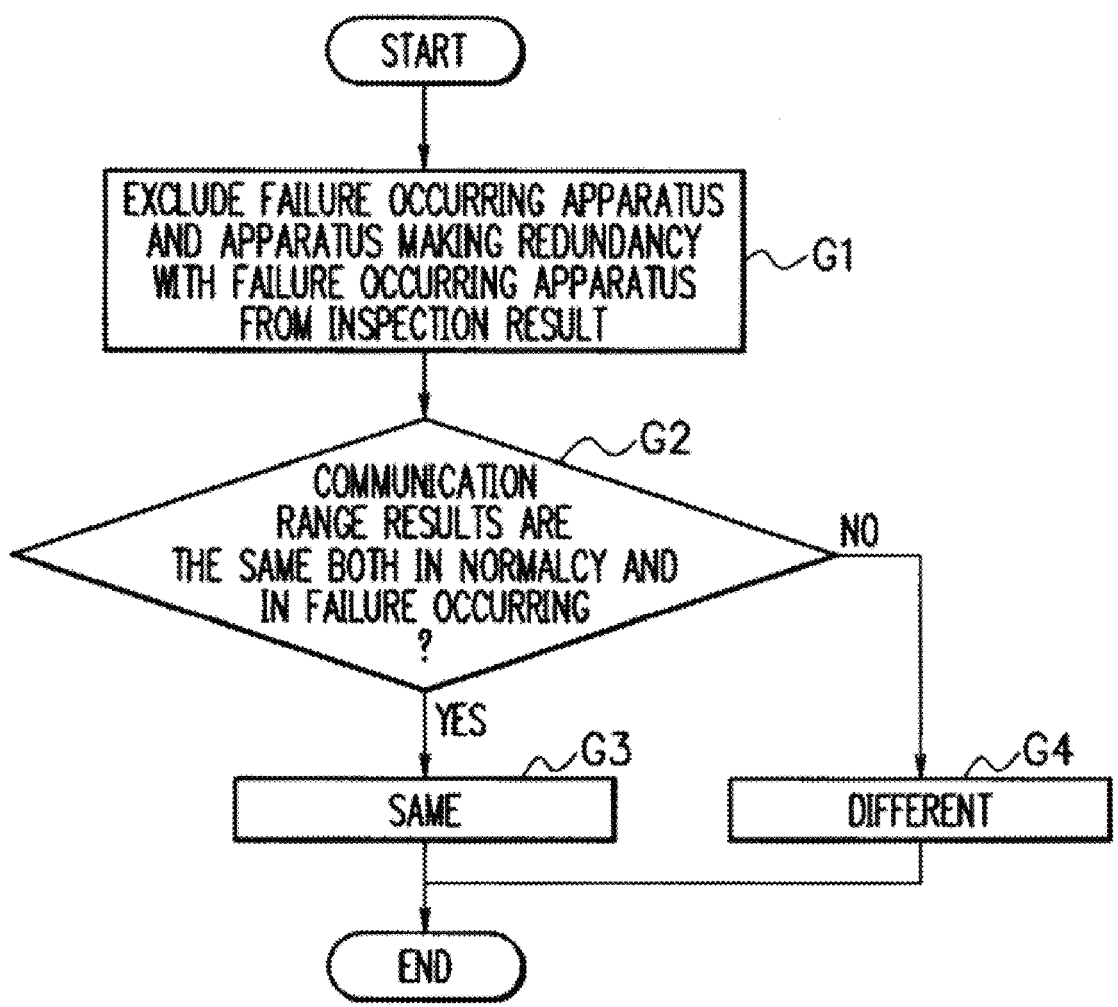
FIG. 29 is a flow chart showing an example of the processing for checking an identity of the communication path information in the failure occurring and the communication path information in the normalcy.
Figure 30:
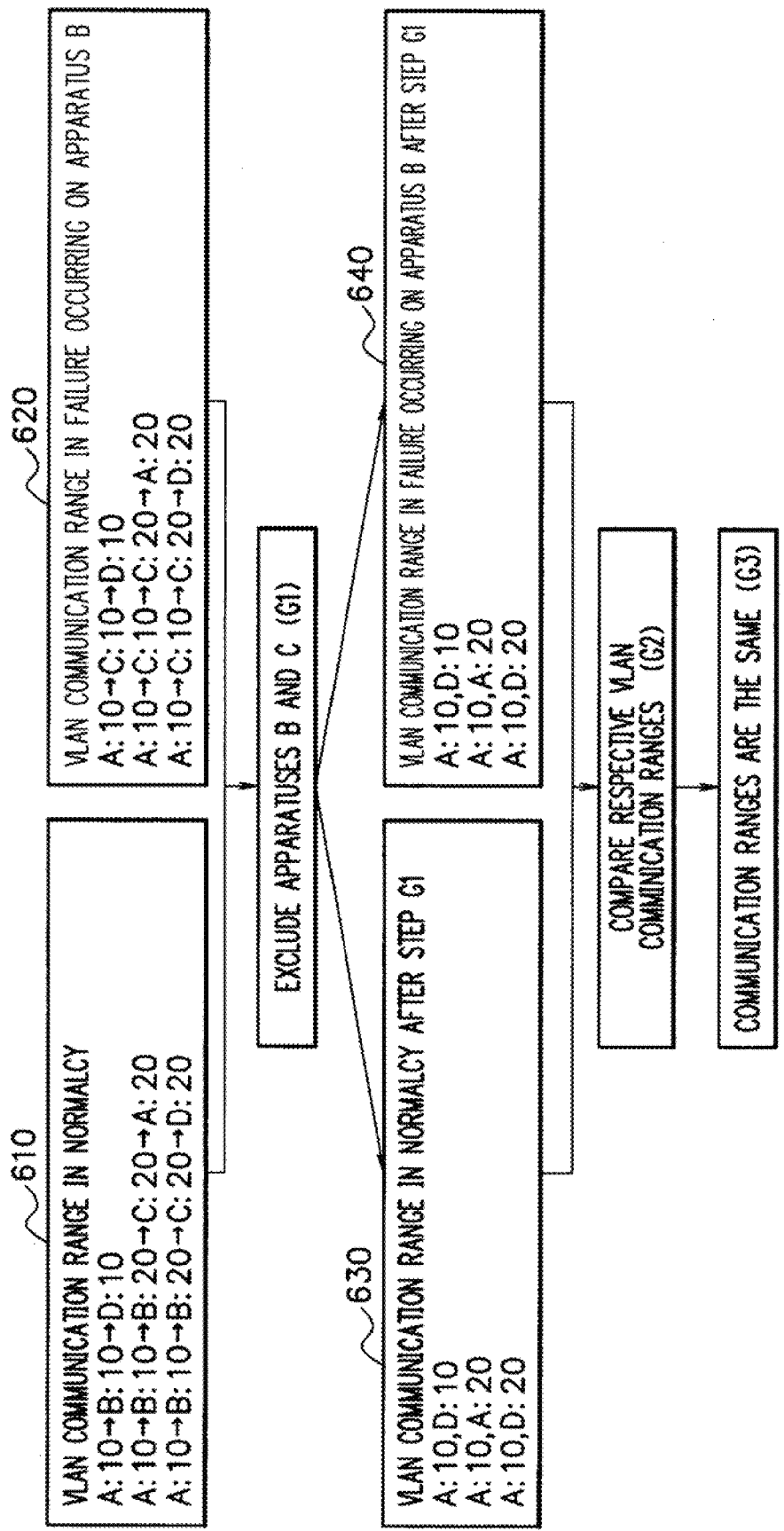
FIG. 30 is an illustration showing an example of a series of processing of the communication range identity checking means.
Figure 31:
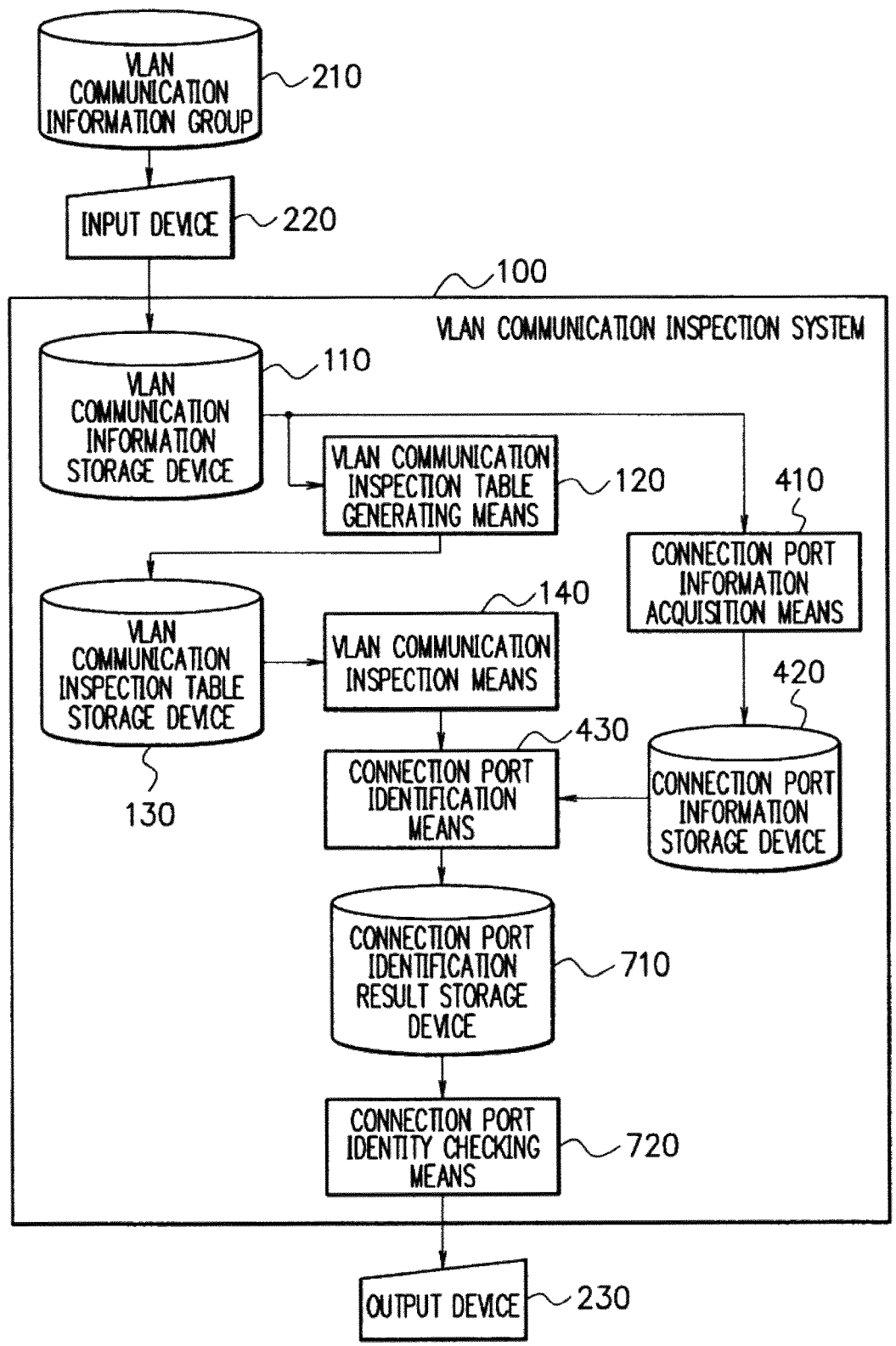
FIG. 31 is a block diagram showing a constitution example of a fifth exemplary embodiment of the present invention.
Figure 33:
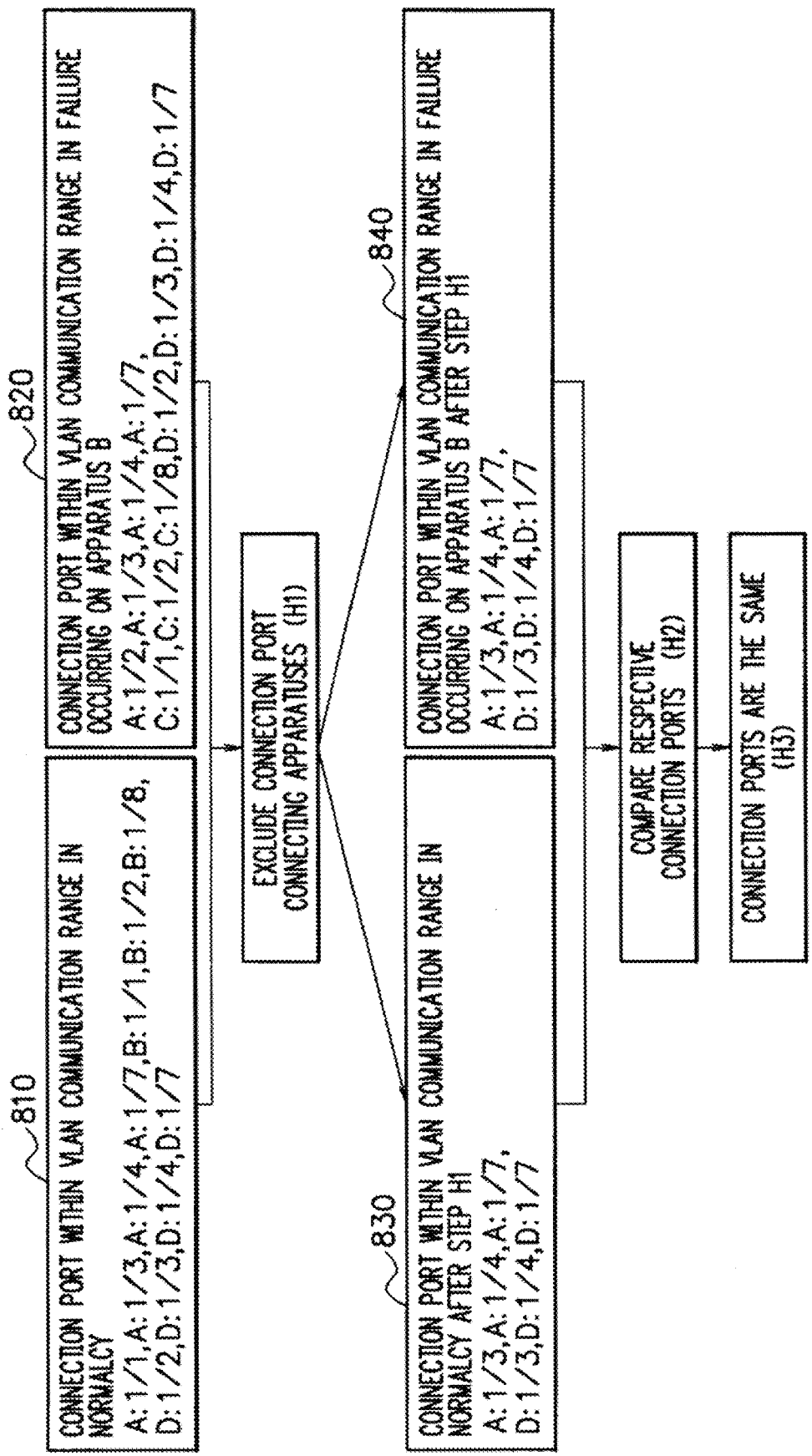
FIG. 33 is an illustration showing an example of a series of processing of the connection port identity checking means.
Figures 34, 35:
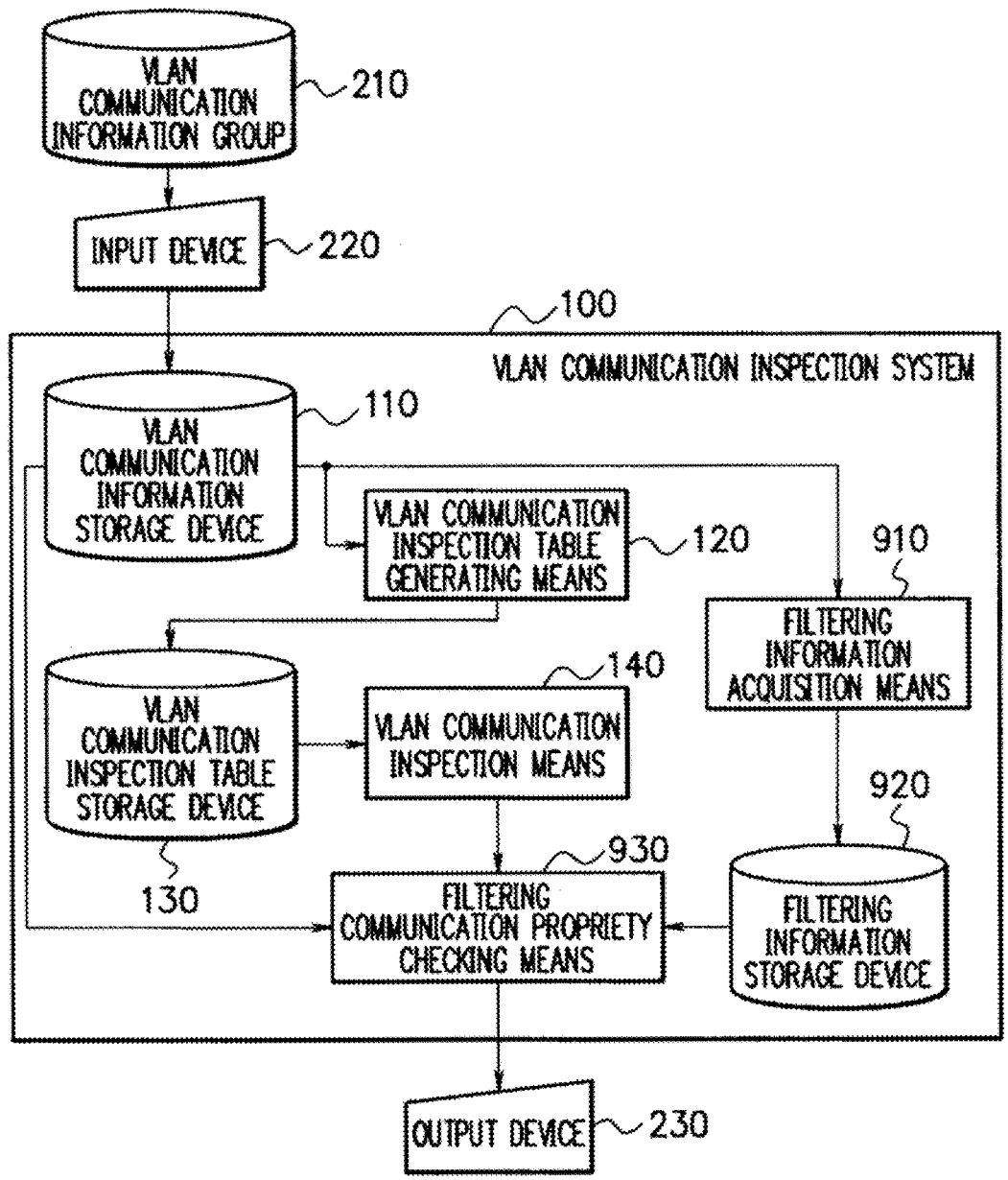
FIG. 34 is a block diagram showing a constitution example of a sixth exemplary embodiment of the present invention.
FIG. 35 is an illustration showing an example of the filtering table.
Figure 36:
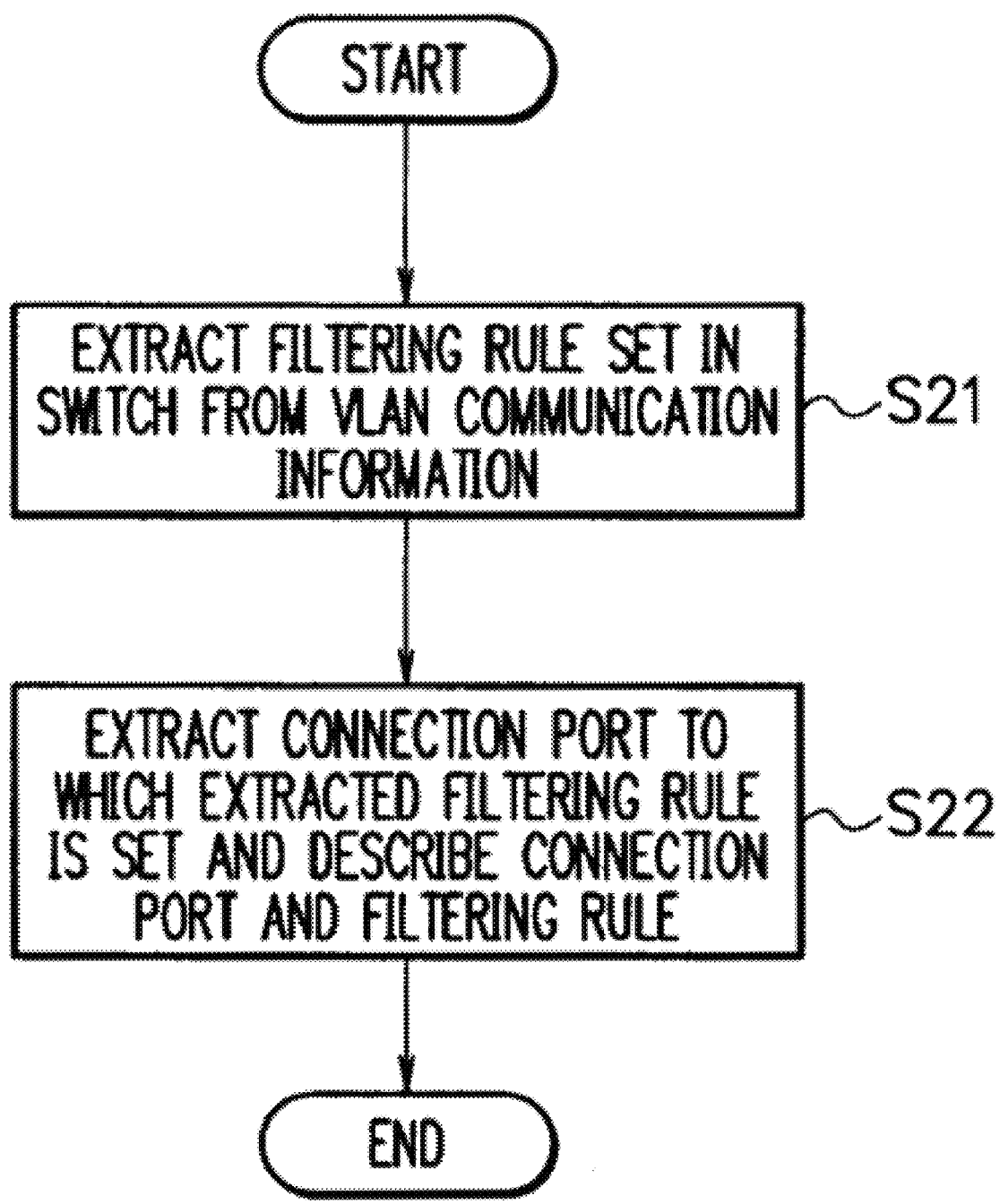
FIG. 36 is a flow chart showing the processing to generate the filtering table.
Figure 37:
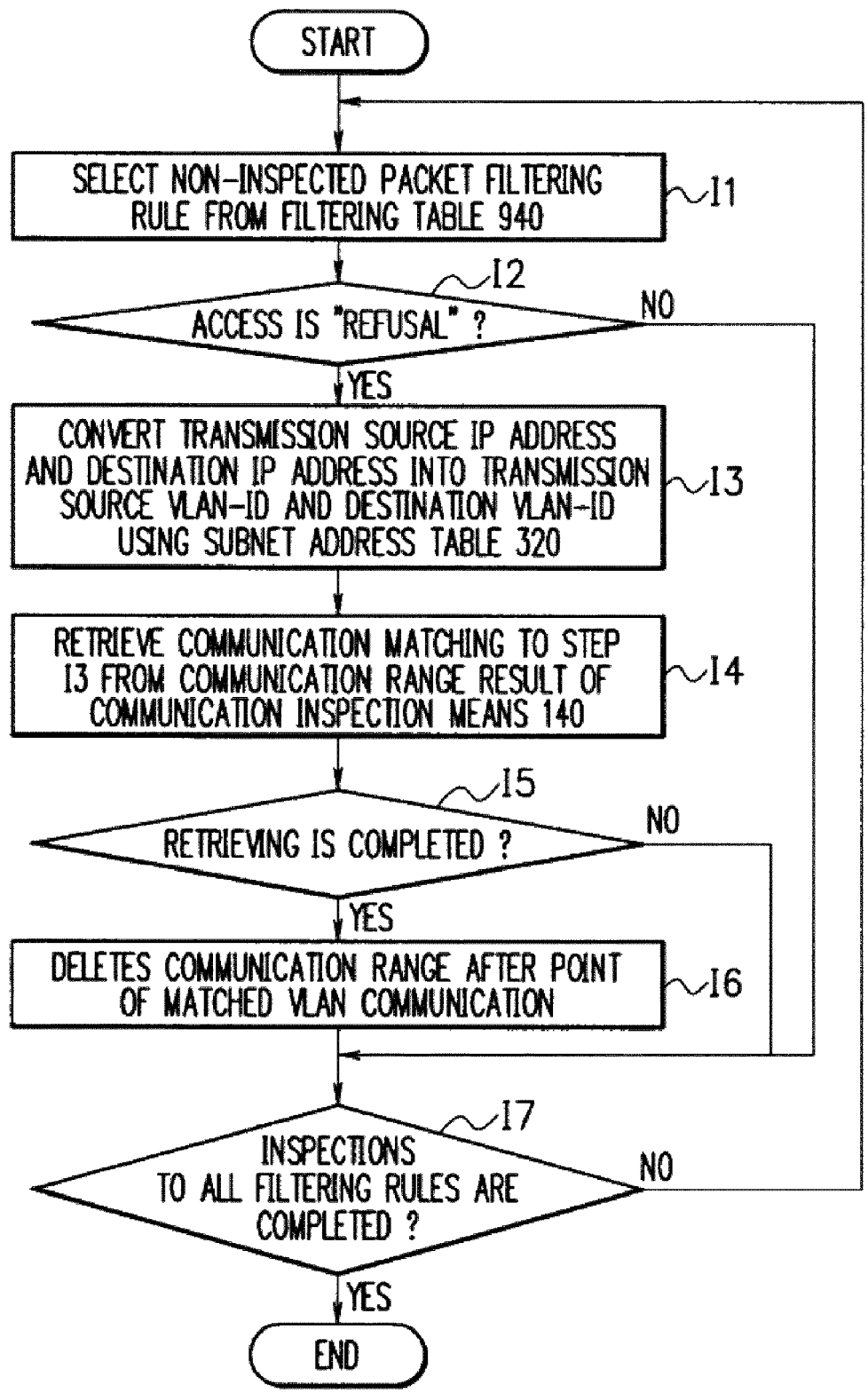
FIG. 37 is a flow chart showing an example of the processing to identify the VLAN becoming impossible of communication by the filtering rule.
Figure 40:
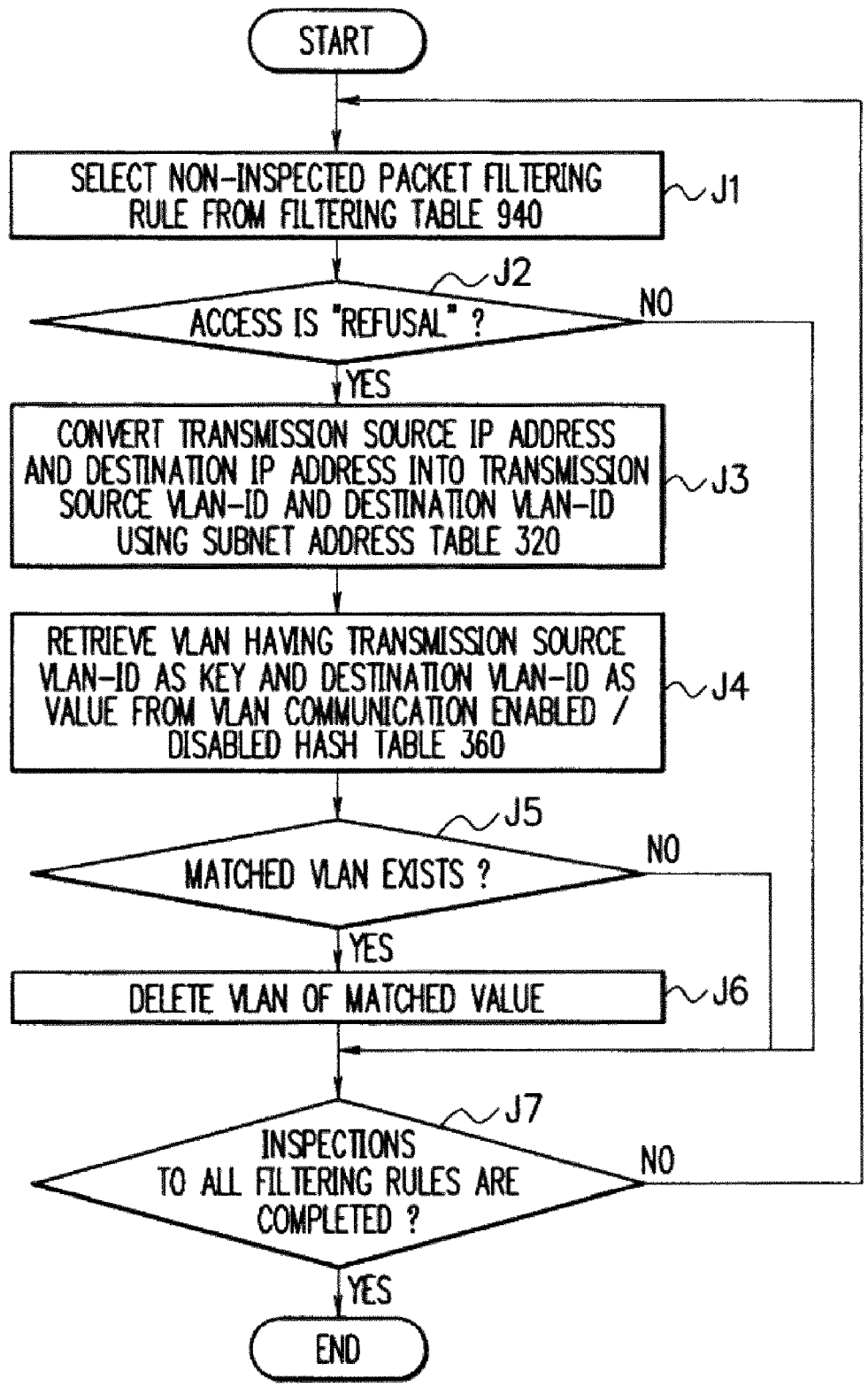
FIG. 40 is a flow chart showing an example of the processing to identify the VLAN becoming impossible of communication by the filtering rule.

Description of Symbols
100 VLAN communication inspection system
110 VLAN communication information storage device
120 VLAN communication inspection table generating means
130 VLAN communication inspection table storage device
140 VLAN communication checking means
210 VLAN communication information group
220 Input means
230 Output device
410 Connection port information acquisition means
420 Connection port information storage device
430 Connection port identification means
520 Communication range identity checking means
720 Communication port identity checking means
910 Filtering information acquisition means
920 Filtering information storage device
930 Filtering communication propriety checking means
950 Table correcting means

The invention claimed is:

1. A VLAN communication inspection system for checking a range that can communicate from a transmission source when an apparatus and a VLAN becoming the transmission source are specified, comprising:

an inputting unit to which an apparatus name and a VLAN-ID that is identification information for identifying the VLAN of the apparatus becoming the transmission source are inputted;

a VLAN communication inspection table storing unit that stores
a routing table showing a correspondence with an apparatus name of an apparatus and a routing propriety of the apparatus,
a redundant apparatus table showing apparatus names of two apparatuses making redundancy and one of the two apparatus becoming a master device every VLAN-ID, and
a VLAN communication propriety table in which an apparatus having a VLAN-ID is set as a key and an apparatus having a VLAN-ID which can communicate from the apparatus is set as a value and, each key and each value are shown as a group of an apparatus name and a VLAN-ID; and a VLAN communication inspecting unit that generates communication path information having the groups of an apparatus name and a VLAN-ID in order, the communication path information is information showing a range that can communicate from the apparatus represented by the VLAN-ID and the apparatus name inputted to the inputting unit, wherein the VLAN communication inspecting unit comprises a value selecting unit that determines a VLAN-ID and an apparatus name as a key and selecting one value from values corresponding to the key;

a passage path judging unit that judges whether the communication path information has already included the value selected by the value selecting unit;

a routing propriety judging unit that judges whether the apparatus represented by the key is capable of routing with reference to the routing table when it is judged that the communication path information does not include the selected value;

a key judging unit that judges whether the apparatus represented by the key is 0 of a master device or an apparatus not making redundancy of the VLAN-ID represented by the key with reference to the redundant apparatus table when it is judged that the apparatus represented by the key is capable of routing by the routing propriety judging unit;

a routing of VLANs judging unit that judges whether there is a point corresponding to routing between the VLANs in the communication path information that is being made when it is judged that the apparatus represented by the key is either of a master device or an apparatus not making redundancy;

a value judging unit that judges whether the apparatus represented by the selected value is a master device of the VLAN-ID represented by the key when it is judged that the apparatus represented by the key is neither a master device nor a apparatus not making redundancy by the key judging unit;

a redundancy judging unit that judges whether the apparatus represented by the selected value is an apparatus making redundancy with reference to the redundant apparatus table when it is judged that the apparatus represented by the key is not capable of routing by the routing propriety judging unit, or when it is judged that there is not a point corresponding to routing between the VLANs by the routing of VLANs judging unit;

a VLAN-ID identity judging unit that judges whether the VLAN-ID represented by the key agrees with the VLAN-ID represented by the value when it is judged that there is a point corresponding to routing between the VLANs by the routing of VLANs judging unit;

a master judging unit that judges whether the apparatus represented by the selected value is a master device of the VLAN-ID represented by the key and an ID judging unit that judges whether the apparatus of the key to be inspected is the same with the apparatus of the value to be inspected and the VLAN-ID of the key is different from the VLAN-ID of the value when it is judged that the apparatus represented by the selected value is an apparatus making redundancy by the redundancy judging unit;

a path adding unit that adds the selected value to the communication path information when it is judged that the apparatus represented by the selected value is a master device by the value judging unit, or when it is judged that the VLAN-IDs agree with each other by the VLAN-ID identity judging unit, or when it is judged that the apparatus represented by the selected value is not an apparatus making redundancy by the redundancy judging unit, or when it is judged that the apparatus represented by the selected value is a master device by the master judging unit, or when it is judged that the apparatus of the key to be inspected is the same with the apparatus of the value to be inspected and the VLAN-ID of the key is different from the VLAN-ID of the value by the ID judging unit; and setting a predetermined flag to a state showing that there is a point corresponding to routing between the VLANs when the apparatus name represented by the key is the same with the apparatus name represented by the value and the VLAN-ID represented by the key is different from the VLAN-ID represented by the value; and a non-selected value presence judging unit that judges whether there is a non-selected value in values corresponding to the key when it is judged that the communication path information includes the selected value by the passage path judging unit, or when it is judged that the apparatus represented by the selected value is not a master device by the value judging unit, or when it is judges that the VLAN-IDs do not agree with each other by the VLAN-ID identity judging unit, or when it is judged that the apparatus represented by the selected value is not a master device by the master judging unit and it is judged that the apparatus of the key to be inspected is the same with the apparatus of the value to be inspected and the VLAN-ID of the key is not different from the VLAN-ID of the value by the ID judging unit, wherein the value selecting unit selects one value from non-selected values when there is non-selected values in values corresponding to the key, and the value selecting unit sets the VLAN-ID and the apparatus name inputted to the inputting unit as a key; when selecting all values corresponding to the key, sets a value added to the communication path information among the values corresponding to the key as a new key and selects one value from values corresponding to the new key.

2. The VLAN communication inspection system according to claim 1 further comprising a failure occurring apparatus inputting unit that inputs an apparatus name of a failure occurring apparatus supposed to have a failure, wherein the VLAN communication inspecting unit comprises a failure occurring apparatus name judging unit that judges whether the apparatus name represented by the value selected by the value selecting unit is the apparatus name of the failure occurring apparatus when the apparatus name of the failure occurring apparatus is inputted to the failure occurring apparatus inputting unit; and a backup device failure judging unit that judges, when the apparatus name of the failure occurring apparatus is inputted to the failure occurring apparatus inputting unit and it is judged that the apparatus represented by the selected value is an apparatus making redundancy by the redundancy judging unit, whether an apparatus making redundancy with the apparatus represented by the selected value is a failure occurring apparatus, the passage path judging unit judges, when it is judged that the apparatus name represented by the value selected by the value selecting unit is not the apparatus name of the failure occurring apparatus by the failure occurring apparatus name judging unit, whether the communication path information has already included the value selected by the value selecting unit, the master judging unit judges, when it is judged that the apparatus making redundancy with the apparatus represented by the selected value is not the failure occurring apparatus by the backup device failure judging unit, whether the apparatus represented by the selected value is a master device of the VLAN-ID represented by the key and the ID judging unit judges whether the apparatus of the key to be inspected is the same with the apparatus of the value to be inspected and the VLAN-ID of the key is different from the VLAN-ID of the value, the path adding unit adds the selected value to the communication path information when it is judged that the apparatus making redundancy with the apparatus represented by the selected value is not the failure occurring apparatus by the backup device failure judging unit; and sets a predetermined flag to a state showing that there is a point corresponding to routing between the VLANs when the apparatus name represented by the key is the same with the apparatus name represented by the value and the VLAN-ID represented by the key is different from the VLAN-ID represented by the value, the non-selected value presence judging unit judges whether there is a non-selected value in values corresponding to the key when it is judged that the apparatus name represented by the value selected by the value selecting unit is the apparatus name of the failure occurring apparatus by the failure occurring apparatus name judging unit.

3. The VLAN communication inspection system according to claim 1 further comprising a connection port table storing unit that stores a connection port table showing a VLAN-ID set in each connection port of each apparatus; and a connection port identification unit that selects groups of an apparatus name and a VLAN-ID included in the communication path information sequentially, and identifies connection port information of an apparatus corresponding to the apparatus name and the VLAN-ID of the selected group with reference to the connection port table.

4. The VLAN communication inspection system according to claim 1 wherein the VLAN communication inspecting unit does not perform judgments by the failure occurring apparatus name judging unit and by the backup device failure judging unit assuming that the apparatus name of the failure occurring apparatus is not inputted to the failure occurring apparatus inputting unit and generates communication path information in the normalcy; and performs judgments by the failure occurring apparatus name judging unit and by the backup device failure judging unit using the apparatus name of the failure occurring apparatus inputted to the failure occurring apparatus inputting unit and generates communication path information in the failure occurring; and the VLAN communication inspecting unit comprises a communication range identity inspecting unit that judges an identit of the communication path information in the normalcy and the communication path information in the failure occurring.

5. The VLAN communication inspection system according to claim 3 wherein the VLAN communication inspecting unit does not perform judgments by the failure occurring apparatus name judging unit and by the backup device failure judging unit assuming that the apparatus name of the failure occurring apparatus is not inputted to the failure occurring apparatus inputting unit and generates communication path information in the normalcy; and performs judgments by the failure occurring apparatus name judging unit and by the backup device failure judging unit using the apparatus name of the failure occurring apparatus inputted to the failure occurring apparatus inputting unit and generates communication path information in the failure occurring;

the connection port identification unit identifies connection port information based on the communication path information in the normalcy and the communication path information in the failure occurring; and the connection port identification unit comprises connection port identity inspecting unit for judging an identity of the connection port information identified based on the communication path information in the normalcy and the connection port information identified based on the communication path information in the failure occurring.

6. The VLAN communication inspection system according to claim 1 further comprising a screen displaying unit that displays each apparatus name included in the communication path information; and outputs a screen displaying an arrow pointing from an apparatus name to other apparatus name in order of a path indicated by the communication path information.

7. The VLAN communication inspection system according to claim 3 further comprising a screen displaying unit that displays connection port information every each apparatus; and outputs a screen establishing a displaying aspect of the connection port information depending on possibility or impossibility of communication with the transmission source.

8. The VLAN communication inspection system according to claim 1, wherein the VLAN communication inspection table storing unit stores a subnet address table showing a correspondence with a VLAN-ID and a subnet address set in the VLAN-ID and comprises a filtering information storing unit that stores a filtering table showing a correspondence with an apparatus name of an apparatus, a connection port of the apparatus, and a filtering rule set in the connection port; and a communication path correcting unit that deletes a path after a point where communication is interrupted from the communication path information generated by the VLAN communication inspecting unit, the filtering rule specifies a transmission source address and a destination address as a condition and determines whether packet communication matching with the condition is permitted, the communication path correcting unit comprises an extracting unit that extracts a filtering rule and an apparatus name corresponding to the filtering rule from the filtering table;

a converting unit that converts an transmission source address and a destination address of the condition specified by the filtering rule to a VLAN-ID corresponding to the subnet address respectively with reference to the subnet address table when the extracted filtering rule determines refusal of the communication; and a deleting unit that deletes, when a path from the group of the VLAN-ID converted from the transmission source address and the apparatus name extracted by the extracting unit to the group of the VLAN-ID converted from the destination address and the apparatus name is shown in the communication path information, a path after the corresponding path from the communication path information.

9. The VLAN communication inspection system according to claim 1, wherein the VLAN communication inspection table storing unit stores a subnet address table showing a correspondence with a VLAN-ID and a subnet address set in the VLAN-ID and comprises a filtering information storing unit that stores a filtering table showing a correspondence with an apparatus name of an apparatus, a connection port of the apparatus, and a filtering rule set in the connection port; and a table correcting unit that deletes a value representing an apparatus that cannot communicate with the apparatus represented by the key from values of the VLAN communication propriety table, the filtering rule specifies a transmission source address and a destination address as a condition and determines whether packet communication matching with the condition is permitted, the table correcting unit comprises
an extracting unit that extracts a filtering rule and an apparatus name corresponding to the filtering rule from the filtering table;
a converting unit that converts an transmission source address and a destination address of the condition specified by the filtering rule to a VLAN-ID corresponding to the subnet address respectively with reference to the subnet address table when the extracted filtering rule determines refusal of the communication; and
a value deleting unit that determines the group of the VLAN-ID converted from the transmission source address and the apparatus name extracted by the extracting unit as a key; and deletes, when a value matching with the group of the VLAN-ID converted from the destination address and the apparatus name is included in values corresponding to the key, the value.

10. The VLAN communication inspection system according to claim 1, wherein the VLAN communication inspection table storing unit stores the subnet address table showing a correspondence with a VLAN-ID and a subnet address set in the VLAN-ID; a VLAN-ID table showing a correspondence with an apparatus name of each apparatus and a VLAN-ID set in the apparatus; and the connection port table showing VLAN communication propriety between connection ports connecting each apparatus every VLAN-ID; and comprises a VLAN communication propriety table generating .unit that generates the VLAN communication propriety table using information stored to the VLAN communication inspection table storing unit.

11. A VLAN communication inspection method applied to a VLAN communication inspection system that comprises an inputting unit to which an apparatus name and a VLAN-ID that is identification information for identifying the VLAN of the apparatus becoming the transmission source are inputted and a VLAN communication inspection table storing unit that stores a routing table showing a correspondence with an apparatus name of an apparatus and a routing propriety of the apparatus, a redundant apparatus table showing apparatus names of two apparatuses making redundancy and one of the two apparatus becoming a master device every VLAN-ID, and a VLAN communication propriety table in which an apparatus having a VLAN-ID is set as a key and an apparatus having a VLAN-ID which can communicate from the apparatus is set as a value and, each key and each value are shown as a group of an apparatus name and a VLAN-ID and generates communication path information having the groups of an apparatus name and a VLAN-ID in order, the communication path information is information showing a range that can communicate from the apparatus represented by the VLAN-ID and the apparatus name inputted to the inputting unit, the method comprising:

a value selecting step of determining a VLAN-ID and an apparatus name as a key and selecting one value from values corresponding to the key;
a passage path judging step of judging whether the communication path information has already included the value selected by the value selecting step;
a routing propriety judging step of judging whether the apparatus represented by the key is capable of routing with reference to the routing table when it is judged that the communication path information does not include the selected value;
a key judging step of judging whether the apparatus represented by the key is either of a master device or an apparatus not making redundancy of the VLAN-ID represented by the key with reference to the redundant apparatus table when it is judged that the apparatus represented by the key is capable of routing by the routing propriety judging step;
a routing of VLANs judging step of judging whether there is a point corresponding to routing between the VLANs in the communication path information that is being made when it is judged that the apparatus represented by the key is either of a master device or an apparatus not making redundancy;
a value judging step of judging whether the apparatus represented by the selected value is a master device of the VLAN-ID represented by the key when it is judged that the apparatus represented by the key is neither a master device nor an apparatus not making redundancy by the key judging step;
a redundancy judging step of judging whether the apparatus represented by the selected value is an apparatus making redundancy with reference to the redundant apparatus table when it is judged that the apparatus represented by the key is not capable of routing by the routing propriety judging step, or when it is judged that there is not a point corresponding to routing between the VLANs by the routing of VLANs judging step;
a VLAN-ID identity judging step of judging whether the VLAN-ID represented by the key agrees with the VLAN-ID represented by the value when it is judged that there is a point corresponding to routing between the VLANs by the routing of VLANs judging step;
a master judging step of judging whether the apparatus represented by the selected value is a master device of the VLAN-ID represented by the key and ID judging step of judging whether the apparatus of the key to be inspected is the same with the apparatus of the value to be inspected and the VLAN-ID of the key is different from the VLAN-ID of the value when it is judged that the apparatus represented by the selected value is an apparatus making redundancy by the redundancy judging step;
a path adding step of adding the selected value to the communication path information when it is judged that the apparatus represented by the selected value is a master device by the value judging step, or when it is judged that the VLAN-IDs agree with each other by the VLAN-ID identity judging step, or when it is judged that the apparatus represented by the selected value is not an apparatus making redundancy by the redundancy judging step, or when it is judged that the apparatus represented by the selected value is a master device of the VLAN-ID represented by the key by the master judging step, or when it is judged that the apparatus of the key to be inspected is the same with the apparatus of the value to be inspected and the VLAN-ID of the key is different from the VLAN-ID of the value by the master judging step, or when it is judged that the apparatus of the key to be inspected is the same with the apparatus of the value to be inspected and the VLAN-ID of the key is different from the VLAN-ID of the value by the ID judging step; and
setting a predetermined flag to a state showing that there is a point corresponding to routing between the VLANs when the apparatus name represented by the key is the same with the apparatus name represented by the value and the VLAN-ID represented by the key is different from the VLAN-ID represented by the value; and a non-selected value presence judging step of judging whether there is a non-selected value in values corresponding to the key when it is judged that the communication path information includes the selected value by the passage path judging step, or when it is judged that the apparatus represented by the selected value is not a master device by the value judging step, or when it is judges that the VLAN-IDs do not agree with each other by the VLAN-ID identity judging step, or when it is judged that the apparatus represented by the selected value is not a master device by the master judging step and it is judged that the apparatus of the key to be inspected is the same with the apparatus of the value to be inspected and the VLAN-ID of the key is not different from the VLAN-ID of the value by the ID judging step, wherein the value selecting step selects one value from non-selected values when there is non-selected values in values corresponding to the key, and the value selecting step sets the VLAN-ID and the apparatus name inputted to the inputting unit as a key; when selecting all values corresponding to the key, sets a value added to the communication path information among the values corresponding to the key as a new key and selects one value from values corresponding to the new key.

12. A storing medium for storing a VLAN communication inspection program mounted on a computer that comprises an inputting unit to which an apparatus name and a VLAN-ID that is identification information for identifying the VLAN of the apparatus becoming the transmission source are inputted and a VLAN communication inspection table storing unit that stores a routing table showing a correspondence with an apparatus name of an apparatus and a routing propriety of the apparatus, a redundant apparatus table showing apparatus names of two apparatuses making redundancy and one of the two apparatus becoming a master device every VLAN-ID, and a VLAN communication propriety table in which an apparatus having a VLAN-ID is set as a key and an apparatus having a VLAN-ID which can communicate from the apparatus is set as a value and, each key and each value are shown as a group of an apparatus name and a VLAN-ID and generates communication path information having the groups of an apparatus name and a VLAN-ID in order, the communication path information is information showing a range that can communicate from the apparatus represented by the VLAN-ID and the apparatus name inputted to the inputting unit, the program causes the computer to execute process comprising:

value selecting processing for determining a VLAN-ID and an apparatus name as a key and selecting one value from values corresponding to the key;

passage path judging processing for judging whether the communication path information has already included the value selected by the value selecting processing;

routing propriety judging processing for judging whether the apparatus represented by the key is capable of routing with reference to the routing table when it is judged that the communication path information does not include the selected value;

key judging processing for judging whether the apparatus represented by the key is either of a master device or an apparatus not making redundancy of the VLAN-ID represented by the key with reference to the redundant apparatus table when it is judged that the apparatus represented by the key is capable of routing by the routing propriety judging processing;

routing of VLANs judging processing for judging whether there is a point corresponding to routing between the VLANs in the communication path information that is being made when it is judged that the apparatus represented by the key is either of a master device or an apparatus not making redundancy;

value judging processing for judging whether the apparatus represented by the selected value is a master device of the VLAN-ID represented by the key when it is judged that the apparatus represented by the key is neither a master device nor an apparatus not making redundancy by the key judging processing;

redundancy judging processing for judging whether the apparatus represented by the selected value is an apparatus making redundancy with reference to the redundant apparatus table when it is judged that the apparatus represented by the key is not capable of routing by the routing propriety judging processing, or when it is judged that there is not a point corresponding to routing between the VLANs by the routing of VLANs judging processing;

VLAN-ID identity judging processing for judging whether the VLAN-ID represented by the key agrees with the VLAN-ID represented by the value when it is judged that there is a point corresponding to routing between the VLANs by the routing of VLANs judging processing;

master judging processing for judging whether the apparatus represented by the selected value is a master device of the VLAN-ID represented by the key and ID judging processing for judging whether the apparatus of the key to be inspected is the same with the apparatus of the value to be inspected and the VLAN-ID of the key is different from the VLAN-ID of the value when it is judged that the apparatus represented by the selected value is an apparatus making redundancy by the redundancy judging processing;

path adding processing for adding the selected value to the communication path information when it is judged that the apparatus represented by the selected value is a master device by the value judging processing, or when it is judged that the VLAN-IDs agree with each other by the VLAN-ID identity judging processing, or when it is judged that the apparatus represented by the selected value is not an apparatus making redundancy by the redundancy judging processing, or when it is judged that the apparatus represented by the selected value is a master device of the VLAN-ID represented by the master judging processing, or when it is judged that the apparatus of the key to be inspected is the same with the apparatus of the value to be inspected and the VLAN-ID of the key is different from the VLAN-ID of the value by the ID judging processing; and setting a predetermined flag to a state showing that there is a point corresponding to routing between the VLANs when the apparatus name represented by the key is the same with the apparatus name represented by the value and the VLAN-ID represented by the key is different from the VLAN-ID represented by the value;

non-selected value presence judging processing for judging whether there is a non-selected value in values corresponding to the key when it is judged that the communication path information includes the selected value by the passage path judging processing, or when it is judged that the apparatus represented by the selected value is not a master device by the value judging processing, or when it is judges that the VLAN-IDs do not agree with each other by the VLAN-ID identity judging processing, or when it is judged that the apparatus represented by the selected value is not a master device of the VLAN-ID represented by the key by the master judging processing and it is judged that the apparatus of the key to be inspected is the same with the apparatus of the value to be inspected and the VLAN-ID of the key is not different from the VLAN-ID of the value by the ID judging processing, wherein the value selecting processing selects one value from non-selected values when there is non-selected values in values corresponding to the key, and the value selecting processing sets the VLAN-ID and the apparatus name inputted to the inputting unit as a key; when selecting all values corresponding to the key, sets a value added to the communication path information among the values corresponding to the key as a new key and selects one value from values corresponding to the new key.

13. A VLAN communication' inspection system for checking a range that can communicate from a transmission source when an apparatus and a VLAN becoming the transmission source are specified, comprising:

inputting means to which an apparatus name and a VLAN-ID that is identification information for identifying the VLAN of the apparatus becoming the transmission source are inputted;

VLAN communication inspection table storing means for storing
 a routing table showing a correspondence with an apparatus name of an apparatus and a routing propriety of the apparatus,
 a redundant apparatus table showing apparatus names of two apparatuses making redundancy and one of the two apparatus becoming a master device every VLAN-ID, and
 a VLAN communication propriety table in which an apparatus having a VLAN-ID is set as a key and an apparatus having a VLAN-ID which can communicate from the apparatus is set as a value and, each key and each value are shown as a group of an apparatus name and a VLAN-ID; and VLAN communication inspecting means for generating communication path information having the groups of an apparatus name and a VLAN-ID in order, the communication path information is information showing a range that can communicate from the apparatus represented by the VLAN-ID and the apparatus name inputted to the inputting means, wherein the VLAN communication inspecting means comprises value selecting means for determining a VLAN-ID and an apparatus name as a key and selecting one value from values corresponding to the key;

passage path judging means for judging whether the communication path information has already included the value selected by the value selecting means;

routing propriety judging means for judging whether the apparatus represented by the key is capable of routing with reference to the routing table when it is judged that the communication path information does not include the selected value;

key judging means for judging whether the apparatus represented by the key is either of a master device or an apparatus not making redundancy of the VLAN-ID represented by the key with reference to the redundant apparatus table when it is judged that the apparatus represented by the key is capable of routing by the routing propriety judging means;

routing of VLANs judging means for judging whether there is a point corresponding to routing between the VLANs in the communication path information that is being made when it is judged that the apparatus represented by the key is either of a master device or an apparatus not making redundancy;

value judging means for judging whether the apparatus represented by the selected value is a master device of the VLAN-ID represented by the key when it is judged that the apparatus represented by the key is neither a master device nor a apparatus not making redundancy by the key judging means;

redundancy judging means for judging whether the apparatus represented by the selected value is an apparatus making redundancy with reference to the redundant apparatus table when it is judged that the apparatus represented by the key is not capable of routing by the routing propriety judging means, or when it is judged that there is not a point corresponding to routing between the VLANs by the routing of VLANs judging means;

VLAN-ID identity judging means for judging whether the VLAN-ID represented by the key agrees with the VLAN-ID represented by the value when it is judged that there is a point corresponding to routing between the VLANs by the routing of VLANs judging means;

master judging means for judging whether the apparatus represented by the selected value is a master device of the VLAN-ID represented by the key and ID judging means for judging whether the apparatus of the key to be inspected is the same with the apparatus of the value to be inspected and the VLAN-ID of the key is different from the VLAN-ID of the value when it is judged that the apparatus represented by the selected value is an apparatus making redundancy by the redundancy judging means;

path adding means for adding the selected value to the communication path information when it is judged that the apparatus represented by the selected value is a master device by the value judging means, or when it is judged that the VLAN-IDs agree with each other by the VLAN-ID identity judging means, or when it is judged that the apparatus represented by the selected value is not an apparatus making redundancy by the redundancy judging means, or when it is judged that the apparatus represented by the selected value is a master device by the master judging means, or when it is judged that the apparatus of the key to be inspected is the same with the apparatus of the value to be inspected and the VLAN-ID of the key is different from the VLAN-ID of the value by the ID judging means; and
 setting a predetermined flag to a state showing that there is a point corresponding to routing between the VLANs when the apparatus name represented by the key is the same with the apparatus name represented by the value and the VLAN-ID represented by the key is different from the VLAN-ID represented by the value; and non-selected value presence judging means for judging whether there is a non-selected value in values corresponding to the key when it is judged that the communication path information includes the selected value by the passage path judging means, or when it is judged that the apparatus represented by the selected value is not a master device by the value judging means, or when it is judges that the VLAN-IDs do not agree with each other by the VLAN-ID identity judging means, or when it is judged that the apparatus represented by the selected value is not a master device by the master judging means and it is judged that the apparatus of the key to be inspected is the same with the apparatus of the value to be inspected and the VLAN-ID of the key is not different from the VLAN-ID of the value by the ID judging means, wherein the value selecting means selects one value from non-selected values when there is non-selected values in values corresponding to the key, and the value selecting means sets the VLAN-ID and the apparatus name inputted to the inputting means as a key; when selecting all values corresponding to the key, sets a value added to the communication path information among the values corresponding to the key as a new key and selects one value from values corresponding to the new key.

* * * * *